(12) United States Patent
Young

(10) Patent No.: US 7,641,854 B2
(45) Date of Patent: Jan. 5, 2010

(54) MULTIFUNCTIONAL MULTIREACTOR CONTROL SYSTEM WITH DYNAMIC MULTIPLE PROTOCOLS, TEMPLATES AND DIGITAL NOTEBOOKS AND METHODOLOGY

(76) Inventor: Li Young, 553 Stony Brook Dr., Bridgewater, NJ (US) 08807

( * ) Notice: Subject to any disclaimer, the term of this patent is extended or adjusted under 35 U.S.C. 154(b) by 64 days.

(21) Appl. No.: 11/710,137

(22) Filed: Feb. 23, 2007

(65) Prior Publication Data
US 2007/0231223 A1 Oct. 4, 2007

Related U.S. Application Data

(63) Continuation-in-part of application No. 11/058,528, filed on Feb. 15, 2005, which is a continuation-in-part of application No. 10/827,754, filed on Apr. 20, 2004.

(51) Int. Cl.
*G01N 21/00* (2006.01)
(52) U.S. Cl. ...................................................... 422/62
(58) Field of Classification Search ..................... 422/62
See application file for complete search history.

(56) References Cited

U.S. PATENT DOCUMENTS

| | | | |
|---|---|---|---|
| 2,472,362 A | 6/1949 | Barnebey et al. |
| 2,739,221 A | 3/1956 | Morey |
| 2,894,881 A | 7/1959 | Wolston et al. |
| 3,143,167 A | 8/1964 | Vieth |
| 3,239,432 A | 3/1966 | Rhodes et al. |
| 3,473,387 A | 10/1969 | Meriam |
| 3,479,252 A | 11/1969 | Holm et al. |
| 4,019,365 A | 4/1977 | Woo |
| 4,030,314 A | 6/1977 | Strehler et al. |
| 4,043,762 A | 8/1977 | Olds |
| 4,117,881 A | 10/1978 | Williams et al. |
| 4,276,264 A | 6/1981 | Redikultsev et al. |
| 4,346,754 A | 8/1982 | Imig et al. |
| 4,480,682 A | 11/1984 | Kaneta et al. |
| 4,489,569 A | 12/1984 | Sitte |
| 4,502,531 A | 3/1985 | Petersen |
| 4,548,259 A | 10/1985 | Tezuka et al. |
| 4,563,883 A | 1/1986 | Sitte |
| 4,578,963 A | 4/1986 | Sitte |
| 4,667,730 A | 5/1987 | Zemp |
| 4,846,257 A | 7/1989 | Wallace et al. |
| 4,966,469 A | 10/1990 | Fraser et al. |

(Continued)

FOREIGN PATENT DOCUMENTS

EP 0 400 965 A2 5/1990

OTHER PUBLICATIONS

Parr Instruments Multiple Reactor System (MRS) Series 5000. Date Published Jan. 23, 2003.*

*Primary Examiner*—Walter D Griffin
*Assistant Examiner*—Bobby Ramdhanie
(74) *Attorney, Agent, or Firm*—Kenneth P. Glynn, Esq; Deirdra M. Meagher, Esq

(57) ABSTRACT

A system and a methodology for controlling multifunctional multireactor chemical synthesis instruments employ real time automatic controls, calculations, feedbacks and optional graphic tracking of parameters, process characteristics and events and offer templates for designing otherwise complex sequences for the bench chemist, physicist or biologist. Automatic lab notebook construction is also provided as well as remote monitoring and control options, warning alarms and shut down alarms.

30 Claims, 51 Drawing Sheets

U.S. PATENT DOCUMENTS

| | | |
|---|---|---|
| 5,123,477 A | 6/1992 | Tyler |
| 5,139,079 A | 8/1992 | Becraft et al. |
| 5,154,067 A | 10/1992 | Tomizawa et al. |
| 5,171,538 A | 12/1992 | Tremmel et al. |
| 5,176,202 A | 1/1993 | Richard |
| 5,203,203 A | 4/1993 | Bryan et al. |
| 5,337,806 A | 8/1994 | Trunner |
| 5,447,374 A | 9/1995 | Fraser et al. |
| 5,489,532 A | 2/1996 | Charm et al. |
| 5,689,895 A | 11/1997 | Sutherland et al. |
| 5,947,343 A | 9/1999 | Horstmann |
| 6,095,356 A | 8/2000 | Rits |
| 6,221,319 B1 * | 4/2001 | Johnson et al. ............. 422/186 |
| 6,502,456 B1 | 1/2003 | Chen |
| 6,615,914 B1 | 9/2003 | Young |
| 2003/0024801 A1 * | 2/2003 | Young ........................ 202/154 |

* cited by examiner

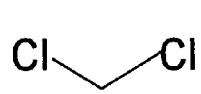 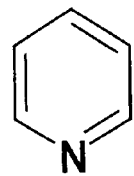 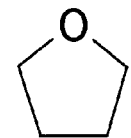
Dichloromethane(DCM)   Pyridine   Tetrahydrofuran(THF)
Figure 41

Control System

Protocol (Select Reactor, Repeat Protocol Creation for each Reactor 1 chemist select a template for desired procedure
2 instruction for setup operation
3 CPU list steps in sequences
4 chemist select steps and sequences
5 chemist input parameters of steps and sequences Operation 6 chemist start the procedures
7 CPU control temperature, stirring, inert protection, and record the processes
8 chemist monitor the processes
9 CPU generate the laboratory notebook
10 chemist manual overide
11 options: alarm, testing, reaction mixture transfer

Detail
— Present Value

| | | |
|---|---|---|
| Status | Heating | |
| Vessel | 100 | mL |
| Solution Temperature | 70 | °C |
| Reactor Temperature | 70 | °C |
| Temperature Control Time Passed | 1 h 10 m 20 | s |
| Temperature Control Time Remained | 1 h 49 m 40 | s |
| Inert Protection | OFF | |
| Stirring Speed | 7 | rps |
| Stirring Time Passed | 1 h 11 m 0 | s |
| Stirring Time Remained | 2 h 19 m 0 | s | e-Note    Exit

1011

Adding reactants, reagents, and solvents

Preparation   Reaction

| # | Compound | Dissolve with | Dilute with | Prep | Rxn |
|---|---|---|---|---|---|
| 1 | 2',4'-dichloroa | ☐ Dissolve with [  ] mL [       ] solvent | ☑ Dilute with [5.0] mL [ethanol] solvent | ● | ○ |
| 2 | sodium boroh | ☐ Dissolve with [  ] mL [       ] solvent | ☐ Dilute with [  ] mL [       ] solvent | ○ | ● |
| 3 |  | ☐ Dissolve with | ☐ Dilute with | ○ | ○ |
| 4 |  | ☐ Dissolve with | ☐ Dilute with | ○ | ○ |
| 5 |  | ☐ Dissolve with | ☐ Dilute with | ○ | ○ |
| 6 |  | ☐ Dissolve with | ☐ Dilute with | ○ | ○ |

Next   Cancel

Record of Procedure  (read only)

| Procedure 1: Preparation | | |
|---|---|---|
| Step 1.1 | Add Reactants, Reagents, and Solvents | |
| | a) | weight 10 g of 2',4'-dichloroacetophenone and subsequently add it into a rigorously dried 100mL round-bottomed flask containing a dry magnetic stirring bar |
| | b) | add 50mL of ethanol via syringe into the above mentioned flask. |

| Procedure 2: Set-up | | |
|---|---|---|
| Step 2.1 | Assemble Reaction Vessel | |
| | a) | install a long bracing-rod in the key hole corresponding to channel No. 3 |
| | b) | clip a tongs-clamp onto the neck of the round-bottomed prepared in step 1.1 |
| | c) | place the round-bottomed into the well corresponding to channel No. 3 |
| | d) | connect the tongs-clamp with the bracing-rod and turn the screw tight |
| | e) | fit a refluxing-stopper (REST) into the round-bottomed flask, using a sleeve or Teflon tape at the joint to ensure air-tight |
| | f) | use a piece of Bibby-clip to secure the REST and the flask |
| | g) | install insulation covers at the well corresponding to channel No. 3 |
| Step 2.2 | Install Temperature Probe | |
| | a) | insert a piece of thermocouple through a port of REST into the flask and ensure the tip of the thermocouple under the reaction mixture whilst not interfering with the stirring bar |
| | b) | insert the male plug of the thermocouple into the female jack locating at the slanting layer of PRO7 and corresponding to channel No. 3 |
| Step 2.3 | Connect Cooling Water | |
| | a) | use a piece of tube (OD. 5/32") to connect the quick-connector on the top of REST with the quick-connector locating at the third layer of PRO7 and corresponding to channel No. 3 |
| | b) | use another piece of tube (OD. 5/32") to connect the quick-connector on the side of REST with the quick-connector locating at the second layer of PRO7 and corresponding to channel No. 3 |
| | c) | turn cooling water on and ensure cooling water flow through the REST without leakage |
| Step 2.4 | Communicate with PC | |
| | a) | click "Start" button on the bottom-left corner of the home page of "PRO7 PIN 2007 — Bench" |
| | b) | select a communication port from the menu of "Selecting Communication Port" and then click to initiate communication |

Figure 49      1019

| | Stir Reaction Mixture |
|---|---|
| Step 2.5 | a) select a channel in the "Channel Information" page<br>b) click "Function" button in the frame of the channel selected<br>c) click "Enter" button in the frame of "Setup & Reaction" in "Function Selection" page<br>d) input stirring speed, __7__ rps, and time, __3__ hours and __30__ minutes; in the frame of "Stirring"<br>e) click "OK' button |

Figure 50

| Procedure 3: Reaction | |
|---|---|
| Step 3.1 | Add Solid Reactant |
| | a) wait till the reaction mixture become uniform |
| | b) weight 2.2g of sodium borohydride |
| | c) use a piece of powder funnel, add sodium borohydride from the side neck into the round-bottomed flask |
| Step 3.2 | Initiate Reaction Temperature Control |
| | a) input the reaction temperature, 70 °C , and time for temperature control, 3 hours and 0 minute, in "Temperature Setting" frame |
| | b) input the size information of the flask, 100mL, via the "Vessel" manual |
| | c) click "OK" button to start reaction temperature control |
| | d) click "Exit" button to return to "Channel Information" Page |
| Step 3.3 | Follow the Progress |
| | a) wait for 2 hours, then, pick small quantity, 0.5 mL, of reaction mixture via syringe from the round-bottomed flask |
| | b) dilute the reaction mixture, spot a TLC plate, develop the plate, check the retardation factor, and hence determine whether the reaction is complete |
| | c) if so, ready to terminate the computer control of stirring and temperature |
| | d) if not, repeat TLC analysis once every 10 minutes for at most 3 times |
| | e) after 3 attempts of TLC analyses, if the reaction is not complete, check the reagent and consider conducting the reaction again |
| Step 3.4 | Terminate Computer Control |
| | a) click "Function" button in the frame of "(CH 3)" in "Channel Information" page |
| | b) click "Enter" button in the frame of "Setup & Reaction" in "Function Selection" page |
| | c) click "STOP" button in "Stirring" frame to terminate stirring control |
| | d) click "STOP" button in "Reaction" frame and then "YES" button in the prompt dialogue window to terminate temperature control |

| Procedure 4: Work-up | | |
|---|---|---|
| Step 4.1 | Quench Reaction | |
| | a) | click "Function" button in the frame of "(CH 3)" in "Channel Information" page |
| | b) | click "Enter" button in the frame of "Rapid Cooling" in "Function Selection" page |
| | c) | check option button " _4°C_ " in "Rapid Cooling" page |
| | d) | click "Start" button to initiate rapid cooling, then, click "Exit" button to return to "Channel Information" page |
| | e) | wait till the temperature of the well corresponding to channel No. _3_ reach to _4_ °C |
| | f) | click "Function" button in the frame of "(CH 3)" in "Channel Information" page |
| | g) | click "Enter" button in the frame of "Setup & Reaction" in "Function Selection" page |
| | h) | input the reaction temperature, _0 °C_ , and the time for temperature control, _1_ hour and _0_ minute, in "Temperature Setting" frame |
| | i) | click "OK" button to start reaction temperature control |
| | j) | click "Exit" button to return to "Channel Information" page |
| | k) | wait till the temperature of reaction mixture reach to _0 °C_ |
| | l) | use a syringe with a long needle, inserting through a miniature septum on the top of REST, to slowly add _10_ mL water into the flask |
| | m) | click "Function" in the frame of "(CH 3)" in "Channel Information" page |
| | n) | click "Setup & Reaction" button in "Function Selection" page |
| | o) | click "STOP" in "Reaction" frame and "YES" button in the prompt dialogue window to terminate temperature control |
| | p) | wait till the mixture return to room temperature |
| Step 4.2 | Dismantle Reaction Vessel | |
| | a) | shut cooling water off |
| | b) | remove Bibby-clip and REST |

|  | Separate Crude Product |
| --- | --- |
| Step 4.3 | a) use a pipette to drop-wisely dispense appropriate amount of <u>6N HCl</u> to change the pH value of reaction mixture to <u>2~3</u><br>b) place a piece of filter paper on a Büchner funnel and moisture the paper with <u>ethanol</u> , then attach the funnel to a filter flask; clamp the flask to prevent tipping<br>c) detach the 100mL round-bottomed flask from the bracing rod and remove it out of the well, pour the reaction mixture into the funnel<br>d) filter the mixture with gravity, or employ vacuum to suck the mixture<br>e) wash the substance being filtered with <u>ethanol</u><br>f) transfer crude product from the filter flask to a 250mL round-bottomed flask<br>g) install the 250mL round-bottomed flask in a rotary evaporator to remove the solvent |

| Procedure 5: Purification | | |
|---|---|---|
| Step 5.1 | Isolate Compound | |
| | a) | dissolve the crude product in the 250mL round-bottomed flask with 20mL of EtOAc |
| | b) | pour the solution into a separatory funnel |
| | c) | wash the 250mL round-bottomed flask with 10mL of EtOAc, and then pour the solution into the separatory funnel |
| | d) | add 40 mL of EtOAc to the separatory funnel |
| | e) | added 40 mL of water to the separatory funnel |
| | f) | shake the separatory funnel and then place the funnel in a ring stack allowing layers to settle |
| | g) | use a 100mL Erlenmeyer flask to collect the aqueous solution in the bottom layer |
| | h) | use a 250mL Erlenmeyer flask to collect the EtOAc solution in the top layer |
| | i) | pour the aqueous solution back to the separatory funnel and subsequently add 40mL of EtOAc into the funnel |
| | j) | repeat steps f)~h) |
| | k) | add 3g of Na$_2$SO$_{4(s)}$ into the 250mL Erlenmeyer flask |
| | l) | filter the mixture in the 250mL Erlenmeyer flask and transfer the filtrate into a 250mL round-bottomed flask |
| | m) | install the 250mL round-bottomed flask in a rotary evaporator to remove the solvent |
| Step 5.2 | Vacuum-dry Compound and Calculate Yield | |
| | a) | dry compound in a vacuum oven to thoroughly remove all the solvent from the compound |
| | b) | weight the compound, calculate yield, and make the compound ready for characterization |

Figure 54

| Project |
|---|
| AKC-Q1-2007-0G |
| Keyword |
| reduction / sodium borohydride |
| Path |
| reduction 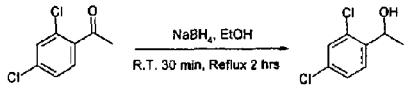 |
| Reference |
| 1. Schlesinger *et al.*, *J.Am. Chem. Soc.* 1953, *75*, 205. |
| 2. Ahmed, F. A.; Kenneth, G. C.; Bruce, D. H.; Cynthia, A. M.; Rekha, D. S.; *J. Org. Chem.* 1996, *61*, 3849 |

Reactant / Reagent

| | Name | eq | MW | mmole | amount | d (g/mL) |
|---|---|---|---|---|---|---|
| 1 | 2',4'-dichloroacetophenone | 1 | 189.04 | 52.9 | 10g | 1.32 |
| 2 | sodium borohydride | 1.1 | 37.82 | 58.17 | 2.2g | 1.07 |

Solvent

| | Name | Bp(°C) | MW | volume | d (g/mL) |
|---|---|---|---|---|---|
| 1 | ethanol | 78 | 46.06 | 70mL | 0.78 |

| Procedure | Template B |
|---|---|
| Channel | 3 |
| Reaction Parameter | |
| Stirring Speed | 7 rev/sec |
| Inert Protection | N/A |
| Temperature | 70 °C (reaction) |

| Bench Chemist | John K. Do | Date | 2007-01-10 |
|---|---|---|---|
| Principal Investigator | George L. Act | Date | 2007-01-10 |
| Comment | | | |
| • 70 °C is a good temperature to conduct this reaction | | | |
| • molarities of 2',4'-dichloroacetophenone and sodium borohydride are appropriate | | | |
| • volume of ethanol is proper | | | |
| • 93% yields is acceptable | | | |
| • the listed procedures are recommended for future reference | | | |

Figure 55

MULTIFUNCTIONAL MULTIREACTOR CONTROL SYSTEM WITH DYNAMIC MULTIPLE PROTOCOLS, TEMPLATES AND DIGITAL NOTEBOOKS AND METHODOLOGY

REFERENCE TO RELATED APPLICATIONS

This application is a continuation-in-part of a copending U.S. patent application Ser. No. 11/058,528 having a filing date of Feb. 15, 2005 and entitled "Multifunctional Multireactor Chemical Synthesis Instrument," having the same inventor herein, which itself is a continuation-in-part of copending U.S. patent application Ser. No. 10/827,754, filed on Apr. 20, 2004 and entitled "Multiport Confinger Microreactor Stopper and Device," by the same inventor herein and of common ownership.

BACKGROUND OF INVENTION a. Field of Invention

The invention relates generally to a system and a methodology for controlling multifunctional multireactor chemical synthesis instruments. The invention system and methodology employ real time automatic controls, calculations, feedbacks and optional graphic tracking of parameters, process characteristics, events and offer templates for designing otherwise complex sequences for the bench chemist, physicist or biologist. Automatic lab notebook construction is also provided as well as remote monitoring and control options, warning alarms and shut down alarms.

b. Description of Related Art

The following patents are representative of prior art related to various types of heated/cooled reaction vessels:

U.S. Pat. No. 2,472,362 to Herbert L Barnebey et al. describes a method of successively heating and cooling the contents of a vessel by means of a fluid medium, the steps of confining a body of vaporizable fluid in a hermetically sealed space about the bottom and sides of a vessel to be heated defined by the vessel wall and an auxiliary condensing surface, maintaining a portion of said fluid body in the liquid state as a pool contacting the bottom of said vessel, first applying extraneous heat to boil the liquid and heat the vessel and its contents by exchange of heat through the vessel walls from the hot liquid and condensing vapors, then ceasing to apply extraneous heat to the liquid, and finally extraneously cooling said auxiliary condensing surface causing the vessel and its contents to cool by boiling the liquid pool in contact with said vessel bottom, and condensing the resulting vapor on said surface.

U.S. Pat. No. 2,739,221 to G. H. Morey describes a vessel heater as recited in claim 2 wherein said means includes a first valve communicating with a supply of non-inflammable and non-combustion-supporting fluid in its gaseous phase to regulate admission of a quantity of fluid to blanket said heating element and thereby preclude ignition of combustible products adjacent said heating element, and a second valve communicating with a supply of non-inflammable and non-combustion-supporting fluid in its liquid phase to regulate admission of a quantity of fluid to effect rapid cooling of the vessel.

U.S. Pat. No. 2,894,881 to Clinton M. Wolston, Jr. et al. describes a laboratory distillation testing apparatus having a condenser tank, a flask, a flask supporting means, a heating means, a condenser tube passing through the said tank, and a light diffusing panel, the improvements which comprise a recess in said condenser tank, a shield means disposed within said recess, adjustable shelf means carried by said shield means for supporting said flask, conduit means below said tank, and solenoid valve means on said conduit means, the discharge end of said conduit means projecting forwardly of the rear wall of said recess below said condenser tube inlet and arranged to discharge forwardly and downwardly towards said shelf means.

U.S. Pat. No. 3,143,167 to A. Vieth describes a temperature controlled enclosure comprising a first metal wall surrounding the enclosure space, a heating means in thermal contact with said first wall for raising the temperature of the enclosure, a second metal wall surrounding the heating means, cooling means in thermal contact with said second wall for lowering the temperature of the enclosure, a first temperature-sensitive element in thermal contact with said first metal wall, a second temperature-sensitive element in thermal contact with said second metal wall, and a control circuit connected between said elements and said heating and cooling means for energizing the heating and cooling means selectively to produce a desired temperature within the enclosure, said control circuit including a bridge, an amplifier, and a switching means for connecting the heating means to a source of power when said first temperature-sensitive element is connected to the bridge and for activating the cooling means when said second temperature-sensitive element is connected to the bridge.

U.S. Pat. No. 3,239,432 to Joseph C. Rhodes et al. describes an apparatus for controlling the operation of a first distillation column and for determining the distillation properties of a product sample from said first column which apparatus comprises: means for withdrawing a product sample containing a mixture of liquids having different boiling points from said first column; a test column member; a plurality of liquid-retaining trays spaced apart vertically within said test column; a liquid sample container positioned below said test column and in flow communication with the bottom-most portion of said test column; means for receiving said withdrawn product sample and introducing a known amount of said product sample into said container; means for vaporizing liquid sample introduced into said container; vapor riser means for passing vapors from the lower portion of said test column upwardly through said test column to intimately contact liquid retained on said trays; condensing means communicating with the upper end of said test column to condense all the vapors rising from the upper-most of said trays; means for returning the resulting condensate to the upper-most of said trays; means for maintaining the test column pressure at a substantially constant pressure during a run; means for maintaining a pre-selected level of liquid on said trays; temperature sensing means to sense the temperatures and produce a temperature signal indicative thereof of equilibrium vapors above the trays in said test column; means for receiving said temperature signal and correlating the sensed temperatures with the distillation properties of a known product sample of approximately the same composition as said sample being run and produced an output signal relative to said correlation; and means for receiving said output signal and adjusting the control parameters of the first column in accordance with said output signal.

U.S. Pat. No. 3,473,387 to Charles Meriam describes an inclined-manometer-type of fluid characteristic measuring instrument which is responsive to pressure sensing for directly reading volume, weight or velocity of flow, or differential pressure across a flow measuring orifice, nozzle, venturi or laminar flow element or for directly reading static head, velocity head or total head fluid pressure. Adjustments are provided for correcting the instrument reading measurements for variations in fluid measurement conditions, including temperature of, density of, viscosity of, barometric pressure on, humidity of, mixture of fluids in, etc. of the fluid being measured; temperature, etc. of the manometer liquid; etc.

U.S. Pat. No. 3,479,252 to Kurt Anders Holm et al. describes an invention which is concerned with an apparatus for degreasing articles by means of a boiling solvent or vapor originating therefrom. The apparatus has double walls, and cooling means which are provided between said double walls. The cooling means comprise water spraying means, and means for passing ventilation air through the space defined by said double walls. Consequently, the ventilation air has the double function of withdrawing solvent vapor and cooling the wall of the apparatus.

U.S. Pat. No. 4,019,365 to Lecon Woo describes a thermomechanical analyzer adapted to measure stress or strain in a sample material by the use of a flat, passive spring, having a known modulus of elasticity, in conjunction with an axially displaceable shaft which mechanically links the spring and the sample together. The linkage is such that the sample under test and the spring are mechanically connected in parallel, i.e., each undergo equal displacement. A transducer senses axial displacement of the shaft such that the magnitude of the shaft displacement is related to the stress in the sample. The sample may be subjected to temperature variations during the test cycle.

U.S. Pat. No. 4,030,314 to John Frederick Strehler describes preservation of biological materials accomplished by apparatus and a process with and by which the material is cooled at a substantially linear rate to approximately freezing temperature, changed from the liquid to the solid phase at relatively constant temperature, and cooled at a substantially linear rate to and end temperature. The environment surrounding the material is rapidly chilled when the material reaches freezing temperature or a temperature minimally warmer than freezing temperature in the liquid phase to initiate phase change with minimal risk of super cooling the material, and is then warmed to freezing temperature or a temperature minimally cooler than freezing temperature to minimize temperature drop in the material upon completion of phase change. The apparatus contemplates, among other things, preselection of cooling rates, duration of phase change, and the end temperature.

U.S. Pat. No. 4,043,762 to George Milton Olds describes a coupling means for test tubes and the like, the coupling means enabling the coupling of test tubes to other objects or devices for various purposes, as for example, support purposes. In one embodiment of the invention, the coupling means is comprised of a flexible, resilient, tubular body portion which is open at each end and which is adapted to be slideably circumimposed on a portion of the periphery of a conventional tubular test tube of the type that is closed at one end, the coupling means also including a pair of circumferentially spaced, flexible, resilient and integral flange portions which project longitudinally outwardly from one end of the tubular body portion and which define openings adjacent the free ends thereof adapted to receive a cooperating member such as the stem of a conventional funnel, a support rod, a thermometer or other object to which it is desired to couple a test tube. In another embodiment of the invention, the coupling means is formed integrally with the body portion of a test tube.

U.S. Pat. No. 4,117,881 to Thomas E. Williams et al. describes blood cells, blood marrow, and other similar biological tissue that is frozen while in a polyethylene bag placed in abutting relationship against opposed walls of a pair of heaters. The bag and tissue are cooled with refrigerating gas at a time programmed rate at least equal to the maximum cooling rate needed at any time during the freezing process. The temperature of the bag, and hence of the tissue, is compared with a time programmed desired value for the tissue temperature to derive an error indication. The heater is activated in response to the error indication so that the temperature of the tissue follows the desired value for the time programmed tissue temperature. The tissue is heated to compensate for excessive cooling of the tissue as a result of the cooling by the refrigerating gas. In response to the error signal, the heater is deactivated while the latent heat of fusion is being removed from the tissue while the tissue is changing phase from liquid to solid.

U.S. Pat. No. 4,276,264 to Jury V. Redikultsev et al. describes a device for sterilizing water-containing liquid media by steam which comprises a sterilizing vessel with inlet and outlet connections for processed liquid media. A heater is provided in the lower portion of the vessel, while a condenser is arranged in the upper portion thereof. The vessel also houses a coaxially mounted steam-transfer unit representing gas-lift tube with a diffuser disposed over the heater.

U.S. Pat. No. 4,346,754 to Leland A. Imig et al. describes a heating and cooling apparatus capable of cyclic heating and cooling of a test specimen undergoing fatigue testing. Cryogenic fluid is passed through a block 10 clamped to the specimen 11 to cool the block and the specimen. Heating cartridges 13 penetrate the block 10 to heat the block and the specimen 11 to very hot temperatures. Control apparatus 36 and 46 is provided to alternately activate the cooling and heating modes to effect cyclic heating and cooling between very hot and very cold temperatures. The block 10 is constructed of minimal mass to facilitate the rapid temperature change thereof.

U.S. Pat. No. 4,480,682 to Hiroshi Kaneta et al. describes an apparatus for freezing fertilized ova, spermatozoa or the like has a heat transfer bottom board block formed at the lower end of a heat insulating peripheral wall with a lower refrigerant passage capable of flowing refrigerant. A bottom board temperature sensor is attached to the bottom board block, an upper heat transfer block is placed on the bottom board block through a heat insulating joint member, formed with an upper refrigerant passage for flowing the refrigerant. A temperature control heater, an upper block temperature sensor, a plurality of erecting tube charging spaces of tubes opened at the top thereof with the bottom gourd block as a bottom member are disposed between the peripheral wall and the upper block in such a manner that the tubes erected and charged into the spaces are cooled at the lower ends thereof by said bottom board block and at the upper part containing articles to be frozen such as fertilized ova, spermatozoa or the like are contained in buffer solution in said tubes. Thus, the buffer solutions in the tubes can be controlled to be cooled at the buffer solution of the lower noncontaining part by the bottom board block and the buffer solution of the containing part above the buffer solution of the lower noncontaining part by the upper block.

U.S. Pat. No. 4,489,569 to Helmuth Sitte describes a cooling apparatus utilizing liquid nitrogen for cooling specimens to temperatures in the range from −100° C. to −195° C. in propane, halogenated hydrocarbons, isopentane, or other cooling media. Freezing of the cooling media is avoided by means of an arrangement wherein the liquid nitrogen cools the cooling-bath container and/or the liquifier only initially, but after the desired cooling-bath temperature has been reached, the liquid nitrogen level is lowered to below the height of a protective shell which results in further cooling being only indirect, via solid/solid contacts and via the gas phase. A constant cooling-bath temperature is ensured by means of a thermostatic temperature-control system while trouble-free standby operation is ensured by means of an automatic system for replenishing liquid nitrogen, and by a system for controlling the level of liquid nitrogen. Safe disposal of the cooling media which may be combustible and/or toxic is provided for.

U.S. Pat. No. 4,502,531 to Peter Petersen describes an invention that provides an apparatus and method or heating a vessel having a vessel bottom and at least one vessel side wall. The invention includes a furnace housing which is adapted to contain the vessel and which has a housing bottom and at least one housing side wall. A heater mechanism, located at the housing bottom and at the housing side wall, heats the vessel and is adapted to contact selected portions of the vessel bottom and vessel side wall. Thermal insulation is disposed about the housing for reducing heat loss therefrom, and an extendable temperature sensor is adapted to contact the vessel and monitor the temperature thereof.

U.S. Pat. No. 4,548,259 to Sadao Tezuka describes a flow cell for containing sample solutions is surrounded by an electric heater which is then surrounded by an isothermal frame having a large heat capacity, and a Peltier element serving as a cooling source is coupled with the isothermal frame. A heat delaying plate is arranged between the flowcell and heater and a temperature sensor is arranged between the flowcell and the heat delaying plate. The Peltier element is controlled in such a manner that the temperature of the isothermal frame is maintained substantially at a constant temperature lower than a predetermined temperature at which the sample solution is to be kept. The heater is controlled in accordance with a difference between the temperature of the sample solution and the predetermined temperature.

U.S. Pat. No. 4,563,883 to Hellmuth Sitte describes a device for immersing a specimen into a cryogenic cooling liquid comprising an injector for carrying a specimen, means for accelerating the injector to a predetermined velocity vertically into the liquid, and means for rotating the injector, before the vertical movement ends, or at moment it ends, to promote heat transfer from the specimen. Various means for effecting rotation of the injector are described.

U.S. Pat. No. 4,578,963 to Hellmuth Sitte describes an apparatus for the cryofixation of specimens, comprises a tank adapted to contain a cold gaseous medium having an upper boundary with an atmosphere external to the tank, and cooling means having an upper surface, said cooling means being disposed within the tank. The upper surface is movable between a lower level and an upper level which is below the upper boundary. The upper surface is maintained at the upper level for a period sufficient to permit the application of a specimen to the upper surface, and is then lowered to the tower level.

U.S. Pat. No. 4,667,730 to Georg Zemp describes a temperature regulating apparatus for a laboratory reaction vessel arrangement, which comprises a reaction vessel and a thermal chamber for a fluid heat exchange medium which at least partially surrounds the reaction vessel. A jacketing vessel is provided with at least one inlet aperture for said fluid heat exchange medium and at least partially surrounds the thermal chamber. The at least one inlet aperture is arranged to extend through the jacketing vessel and into the thermal chamber, and a nozzle is arranged in a region of the at least one inlet aperture. This nozzle has an outlet orifice and is arranged in the region of the at least one inlet aperture such that the fluid heat exchange medium flows through the nozzle and out of the outlet orifice and such that the fluid heat exchange medium flowing out of the outlet orifice subsequently flows into said thermal chamber.

U.S. Pat. No. 4,846,257 to Terry A. Wallace et al. describes an apparatus for keeping food hot and/or cold which includes a body of heavily insulated material in which there are separate recesses for hot food and cold food. The cold food is kept cold by means of an ice compartment located in the bottom recess and an exhaustible refrigeration unit located in the top of that recess. The hot food is kept warm by means of an electrical coil in the bottom of the recess and a solar heating panel in the top.

U.S. Pat. No. 4,966,469 to Douglas S. Fraser et al. describes a positioning device for a temperature sensor in a flask for freeze drying. The device comprises a generally circular plastic stopper having an opening approximately in its center. The stopper is snap-fittingly secured to the top of the flask. A central, annular tube extends through that opening and into the flask. A thermocouple having a generally circular cross section is coiled around and supported by the annular tube so that it is free and is in the center of the flask. The thermocouple is retractable and extensible to permit the use of the thermocouple in flasks of various lengths.

U.S. Pat. No. 5,123,477 to Jonathan M. Tyler describes a thermal reactor, and a method of operating the thermal reactor, in which the thermal reactor includes a chamber which is thermally isolated by refrigerated air circulating in the walls of the chamber, and which holds a tray of sample vials, means for supplying air to the chamber and for exhausting air from the chamber; heaters for heating the air supplied to the chamber; sensors for sensing the temperature of the air supplied to the chamber and of the sample vials, and a computer which pulses the heaters according to the measured temperatures of the vials and the air in the chamber to maintain the temperature of the vials at a desired level.

U.S. Pat. No. 5,139,079 to Michael L. Becraft describes a present invention providing for improved performance of a dynamic mechanical analyzer which measures mechanical and rheological properties of a material by reducing thermal lag in the material by modifying the radiative oven thereof to include a convective transfer device.

U.S. Pat. No. 5,154,067 to Takeshi Tomizawa describes a portable cooler for cooling an article by utilizing the endothermic and exothermic phenomenon pertaining to a chemical reaction which is disclosed, in which an adsorbent and a working medium are sealed in a reaction chamber defined between an inner wall and an outer wall, a working medium retaining member which is disposed on the inner wall inside the reaction chamber for holding therein the working medium, the working medium retaining member being spaced from the adsorbent disposed on the outer wall, and a heater is held in contact with the adsorbent for regenerating the same, at least a part of said outer wall constituting a heat radiating portion.

U.S. Pat. No. 5,171,538 to Ewald Tremmel et al. describes a reagent supply system for a medical analytical instrument which includes a reagent space provided on the instrument and reagent vessels which are received in the reagent space. In the reagent space there is provided at least one reagent vessel compartment with a bottom, lateral guide elements, and a top guiding element, as well as a front stop. The instrument contains a fluid communication system for connection with a reagent vessel situated in the reagent vessel compartment. On the end face of the reagent vessel compartment is disposed a hollow needle near the bottom surface thereof and extending in a direction which is parallel to the bottom surface. The reagent vessel has on its front wall facing the end face a pierceable seal with pierceable elastic stopper.

U.S. Pat. No. 5,176,202 to Daniel D. Richard describes a method used in low temperature storage of biological specimens comprising the steps of (a) maintaining a multiplicity of biological specimens within a predetermined low temperature range in a cryogenic storage unit, (b) selecting at least one biological specimen for removal from the storage unit, (c) determining a respective thaw period and thaw rate for the selected specimen, (d) automatically retrieving the selected specimen from the storage unit at removal time in accordance with the respective determined thaw period, and (e) automatically thawing the selected specimen at the respective thaw rate. An associated thawing system comprises a storage unit for maintaining a plurality of biological specimens within a predetermined low temperature range, a plurality of thawing chambers, and a heat exchange assembly for implementing a temperature change in each of the chambers independently of temperature changes in the other chambers. A servomechanism is provided for retrieving selected specimens from the storage unit and transferring the retrieved specimens to respective thawing chambers, while a control unit is operatively connected to the heat exchange assembly and the servomechanism for operating the heat exchange assembly to control rates of temperature changes in the thawing chambers and for activating the servomechanism to transfer the selected specimens from the storage unit to the respective chambers.

U.S. Pat. No. 5,203,203 to William L. Bryan et al. describes an apparatus for measuring in situ the viscosity of a fluid in a sealed container which includes a spherical ball forming an integral package before any fluid is placed within the container. The apparatus further includes a composite ball consisting of a spherical core of one material surrounded by one or more layers of different materials distributed spherically about the core. The container may also be supported by an angular support member which angularly positions the container such that the ball will move within the container through the fluid at specific speed. A sensing device is provided along the wall of the container to measure the speed of the ball wherein the sensing device includes a pair of sensors spaced apart by a known distance to sense when the ball passes by each of the sensors providing a speed which is useful for calculating the viscosity of the fluid.

U.S. Pat. No. 5,337,806 to Josef Trunner describes a bath in which the supply reservoir is arranged for the liquid, in which the reaction flask to be heated or cooled can be immersed. The heating or cooling device is arranged on the bottom of the supply reservoir. The liquid is delivered with an immersion pump through a feed pipe and an opening in the bottom of the bath. The level of the liquid in the bath can be adjusted with the aid of a slider. The liquid flows back into the supply reservoir over an overflow. When the pump is switched off, the liquid in the bath flows independently back into the supply reservoir.

U.S. Pat. No. 5,447,374 to Douglas S. Fraser et al. describes a method and device for positioning a probe, such as a temperature sensor, in a flask. A stopper adapted to be secured to an open end of the flask is provided having an opening through which a tube extends. A clamping mechanism is connected to the tube to secure the probe to the stopper. The clamping mechanism comprises a first flange, and a second opposing flange spaced slightly apart from the first flange. An O-ring positioned around the flanges causes them to flex inward to engage and secure the probe between them.

U.S. Pat. No. 5,489,532 to Stanley E. Charm describes an automatic test apparatus for use in a test method to determine antimicrobial drugs. The test apparatus comprises a first aluminum, electrically heatable block with holes for the insertion of test containers and a separate, second cooling aluminum block adapted to be placed periodically in contact with the heated aluminum block to cool rapidly the heated block. The test apparatus includes timed signals existing therein to alert the test user. The test apparatus is adapted to provide for the timed sequential solid heating and cooling of one or more test containers containing a test sample.

U.S. Pat. No. 5,689,895 to David T. Sutherland et al. describes a device for positioning a probe, such as a temperature sensor, in a flask for freeze drying. The device includes a stopper adapted to be secured to an open end of the flask. The stopper has a center opening and at least one radial opening spaced from the center opening. The radial opening allows for fluid communication between inside and outside of the flask when the stopper is secured to the open end of the flask. The center opening receives a guide tube which extends into the flask and is sized to receive the probe such that substantially no fluid communication between the inside of the flask and the outside of the flask occurs through the guide tube or center opening. A channel formed in an upper surface of the stopper and the O-ring positioned about an outer diameter of a neck of the flask secure the probe in position relative to the guide tube. The multiple radial openings define an annular passageway which mimics fluid communication through a standard slit-type stopper employed in freeze drying.

U.S. Pat. No. 5,947,343 to Klaus Horstmann describes a flask for liquids, in particular an insulating flask, in which a pouring aperture can be closed by a lid which can be releasably attached to the flask. The lid is provided with a closure element which can be moved by a handle and is loaded by a spring element towards a closed position. The closure element is movable in a substantially vertical opening motion between an open position, in which the pouring aperture is released, and the closed position, in which the pouring aperture is closed. In order to ensure that the closure element is movable by an uncomplicated, durable mechanism, with the pouring aperture being easily openable and effectively closable during operation, the spring element is formed from a spring-elastic diaphragm connection the closure element to the lid.

U.S. Pat. No. 6,095,356 to Miriam Rits describes a vented flask cap having a body portion with proximal and distal ends with a generally cylindrical sidewall extending from the proximal end to the distal end of first and second support plates are formed at the proximal end of the body portion and having a plurality of apertures extending there-through; a filter assembly is also provided which includes a first, lower membrane having a first porosity, a second, upper membrane having a second porosity and a radiation absorbing material disposed between the first and second membranes.

U.S. Pat. No. 6,502,456 B1 to Yaosheng Chen describes a method and an apparatus that are disclosed for the measurement of the aridity, temperature, flow rate, total pressure, still pressure, and kinetic pressure of steam at a downhole location within a well through which wet steam is flowing. The apparatus comprises a series of fiber optic sensors that are mounted on sections of a shell assembly. The apparatus is lowered into a well to different downhole locations, and measures the multiple parameters of steam at different locations and heights. The data can be stored on board for subsequent analysis at the surface when the apparatus is retrieved from the well. The apparatus is very reliable, accurate, and of long-life in harsh environments.

U.S. Pat. No. 6,615,914 to Li Young describes a reaction vessel system that includes a reaction vessel, a cooling unit functionally connected to the vessel to impart controlled cooling thereto; a heating unit functionally connected to the vessel to impart controlled heating thereto; and control means connected to the cooling unit and the heating unit for programmable automatic control of the cooling unit to control at least one of the on/off flow and rate of flow, and to control at least one of on/off heating and rate of heating, including a programmable device. The cooling unit includes a cooling element in proximity to the vessel with at least one inlet port for injection of a phase change coolant, a heat absorbent area and at least one outlet port for removal of the phase change coolant. This is an injector for injecting the coolant in liquid form via the inlet port to the cooling element. In preferred embodiments, the control means includes software, and the system includes an injection physical control device, for cyclical on/off control thereof to establish a predetermined temperature sequence involving a plurality of diverse, programmable temperature levels. The phase change coolant used in the present invention is an environmentally inert material which absorbs heat upon vaporization and has a boiling point below room temperature at atmospheric pressure, and may be selected from the group consisting of inert gases, carbon dioxide, and nitrogen.

European Patent No. EP 0 400 965 A2 to Kondo Akihiro describes a reagent reactor comprising a vial having an opening at one end thereof; a supporting block, having a first heater element, for surrounding and supporting said vial in a substantially erected position so that said opening of the vial is adjacent to the upper surface thereof and exposed to the outside thereabove; a cover block pressing against said supporting block under pressure and capable of sealing said opening of said vial including a fluid introducing tube projecting from said operating into said vial when the cover block is in the sealing position to the vial, a fluid discharging opening opposed to said opening when the cover block is in the sealing position to the vial, and a second heater element; and a temperature control circuit for controlling said first and second hater elements so as to maintain the temperature of the upper portion of aid vial and the lower end surface of said cover block which contacts said opening of said vial more than the temperature of the main body of said vial when a reagent is added to a sample contained in said vial so as to allow reaction of the reagent with said sample and when the evaporation or the azeotropy of a reagent or a solvent is performed.

Notwithstanding the prior art, the present invention is neither taught nor rendered obvious thereby.

SUMMARY OF INVENTION

The present invention relates to a system and a methodology. The present invention includes a multifunctional multireactor control system with dynamic multiple protocols, templates and digital notebooks for a multifunctional multireactor chemical synthesis instrument. The multifunctional multireactor chemical synthesis instrument to which the present invention system and methodology may apply is an instrument having a main housing having at least one independent multireactor work station, each work station adapted to receive a multireactor reaction vessel; having at least one cooling unit functionally connected to each of the at least one independent work station to impart controlled cooling thereto, each cooling unit including: a cooling element in proximity to each of the at least one independent work station and having an inlet port for injection of a phase change coolant, a heat absorbent area and an outlet port for removal of the phase change coolant; and, injection means for injecting the phase change coolant in liquid form via said inlet port to the cooling element; having at least one heating unit functionally connected to each of the at least one independent work stations to impart controlled heating thereto; having an inert gas blanket supply means connected to each of the at least one independent work station; having at least one stirring mechanism connected to each of the at least one independent work station; and having control means connected to each cooling unit and each heating unit and to each stirring mechanism for programmable automatic control thereof, which comprises: the control means including at least one programmable central processing unit having input means, output means and storage means. The present invention system and methodology includes functional software to provide separate real time modules for each of the at least one independent work stations, and to provide the system with the following for each of the modules: (a) means to separately control at least one of on/off flow and rate of flow, to separately control at least one of on/off heating and rate of heating, and to separately control the stirring mechanism, the control means including a programmable device; (b) a plurality of working templates that present various preset operations offered to a user, the operations including heating, heating and stirring, cooling, cooling and stirring, heating with inert gas blanket, cooling with inert gas blanket, ambient and stirring; (c) an instructional program including list of available templates to show a user how to select, customize and operate the templates and the system; (d) input means for a user to select templates and operational step sequences and to key in parameters for each template including a plurality of reactants used, times, temperatures and other functional operations to create a work station protocol, and storage thereof; (e) start up for user to initiate actual start up of reactor with template selected sequences in accordance with selected parameters; (f) automatic sequencing of each independent work station in accordance with the template selected sequences and parameters; (g) dynamic real time presentation of operating conditions and parameters, and at least one variable versus variable subpresentation selected from the group consisting of temperature versus time, pressure versus time and enthalpy versus time, the presentation being in at least one format selected from the group consisting of graphic, listing, streaming, and storage for retrieval on demand; (h) user monitoring of all parameters and of the dynamic real time presentation; (i) user manual override to alter, delete or extend any parameter, sequence or template; and (j) generation of a digital laboratory notebook showing all parameters, sequences and dynamic real time presentations, dates, times, and users.

In the present invention, the reactor may further include additional operations of refluxing, degassing and vacuuming for each work station and the control system templates further include templates for at least one of the additional operations.

In some preferred embodiments, the software further includes means to store, retrieve, reuse and amend selected templates for subsequent use.

In some preferred embodiments of the present invention system and methodology, the digital laboratory notebook is set in a predetermined format and is a read only feature. Thus, while a user may add comments or constituents, etc, in the read only format, the automatically produced reactor process data and results will be unalterable, i.e., read only.

In some preferred embodiments of the present invention system and methodology, the digital laboratory notebook format and the digital laboratory notebook parameters, sequences and dynamic real time presentations, dates, times, and user identifications are secured and are read only.

In some preferred embodiments of the present invention system and methodology, the independent work stations includes means for evaporation functions and means for vacuum pressure functions for a reactor vessel.

In some preferred embodiments of the present invention system and methodology, the digital laboratory notebook is set for customized programming set up by a user.

In some preferred embodiments of the present invention system and methodology, the digital laboratory notebook includes comment input areas for a user to insert observations, comments and conclusions.

In some preferred embodiments of the present invention system and methodology, there are at least two independent multireactor work stations.

In some preferred embodiments of the present invention system and methodology, there are at least three independent multireactor work stations further and further includes cyclical, sequential presentation of each dynamic real time presentation for each work station and means to hold at any one or more of the work station dynamic real time presentations for any desired time period.

In some preferred embodiments of the present invention system and methodology, there are at least three independent multireactor work stations and further includes programmable liquid transfer means for moving liquid from one reaction vessel to another at programmable times, transfer rates and amounts.

In some preferred embodiments of the present invention system and methodology, there are liquid sampling means that includes means to remove liquid from a reaction vessel to a test instrument at programmable times, transfer rates and amounts.

In some preferred embodiments of the present invention system and methodology, there is an automatic pause and alarm security subsystem that recognizes unacceptable inputs selected from the group consisting of reactants, solvents, parameters, template selections and sequence selections and that signals a user, identifies the unacceptable inputs and affords the user editing opportunity.

In some preferred embodiments of the present invention system and methodology, there is a disaster alarm security subsystem that recognizes unacceptable outputs and environmental conditions, shuts down the relevant reaction vessel and signals a user to address the identified concern.

In some preferred embodiments of the present invention system and methodology, there sre remote user monitoring and controlling capabilities selected from the group consisting of internet, intranet, wireless and combinations thereof.

The present invention also includes a multifunctional multireactor control methodology with dynamic multiple protocols, templates and digital notebooks for a multifunctional multireactor chemical synthesis instrument having a main housing having at least one independent multireactor work station, each work station adapted to receive a reaction vessel; having at least one cooling unit functionally connected to each of the at least one independent work station to impart controlled cooling thereto, each cooling unit including: a cooling element in proximity to each of the at least one independent work station and having an inlet port for injection of a phase change coolant, a heat absorbent area and an outlet port for removal of the phase change coolant; and, injection means for injecting the phase change coolant in liquid form via said inlet port to said cooling element; having at least one heating unit functionally connected to each of the at least three independent work station to impart controlled heating thereto; having an inert gas blanket supply means connected to each of the at least one independent work station; having at least one stirring mechanism connected to each of the at least three independent work station; and having control means connected to each cooling unit and each heating unit and to each stirring mechanism for programmable automatic control thereof, which comprises: providing said control means with at least one programmable central processing unit having input means, output means, storage means and functional software to provide separate real time modules for each of said independent work stations, and providing said system with the following for each of the modules: (a) providing means to separately control at least one of on/off flow and rate of flow, to separately control at least one of on/off heating and rate of heating, and to separately control the stirring mechanism, the control means including a programmable device; (b) providing a plurality of working templates that present various preset operations offered to a user, the operations including heating, heating and stirring, cooling, cooling and stirring, heating with inert gas blanket, cooling with inert gas blanket, ambient and stirring; (c) providing an instructional program including list of available templates to show a user how to select, customize and operate the templates and the system; (d) having a user select templates and operational step sequences and to key in parameters for each template including a plurality of reactants used, times, temperatures and other functional operations to create a work station protocol, and storing the protocol; (e) having a user start up the reactor with template selected sequences in accordance with selected parameters by initiating a start up procedure; (f) automatically sequencing and operating each independent work station in accordance with the template selected sequences and parameters; (g) providing a dynamic real time presentation of operating conditions and parameters, and at least one variable versus variable subpresentation selected from the group consisting of temperature versus time, pressure versus time and enthalpy versus time, said presentation being in at least one format selected from the group consisting of graphic, listing, streaming, and storage for retrieval on demand; (h) having a user monitor all operating conditions and parameters and said dynamic real time presentation; (i) providing user manual override to alter, delete or extend any parameter, sequence or template; and (j) generating a digital laboratory notebook showing all parameters, sequences and dynamic real time presentations, dates, times, and users.

In some preferred embodiments of the present invention methodology, the reactor further includes additional operations of refluxing, degassing and vacuuming for each work station and the control methodology includes providing additional templates for at least one of the additional operations.

In some preferred embodiments of the present invention methodology any and all of the above stated detailed features may be included, alone or in combination. These include: providing means to store, retrieve, reuse and amend selected templates for subsequent use; providing a digital laboratory notebook in a predetermined format and is a read only feature; providing a digital laboratory notebook format wherein the digital laboratory notebook parameters, sequences and dynamic real time presentations, dates, times, and users are secured and are provided as read only; providing a digital laboratory notebook with customized programming set up by a user; providing a digital laboratory notebook with comment input areas for a user to insert observations, comments and conclusions.

In some preferred embodiments of the present invention methodology, the methodology further provides at least two independent multireactor work stations. In some preferred embodiments of the present invention methodology, the methodology further provides at least three independent work stations further and further includes cyclical, sequential presentation of each dynamic real time presentation for each work station and means to hold at any one or more of the work station dynamic real time presentations for any desired time period. In some preferred embodiments of the present invention methodology, the instrument includes at least three independent multireactor work stations and further includes programmable liquid transfer means for moving liquid from one reaction vessel to another at programmable times, transfer rates and amounts. In some preferred embodiments of the present invention methodology, the instrument includes liquid sampling means that includes means to remove liquid from a reaction vessel to a test instrument at programmable times, transfer rates and amounts. In some preferred embodiments of the present invention methodology, the instrument includes an automatic pause and alarm security subsystem that recognizes unacceptable inputs selected from the group consisting of reactants, solvents, parameters, template selections and sequence selections and that signals a user, identifies the unacceptable inputs and affords the user editing opportunity. In some preferred embodiments of the present invention methodology, the instrument includes an disaster alarm security subsystem that recognizes unacceptable outputs and environmental conditions, shuts down the relevant reaction vessel and signals a user to address the identified concern. In some preferred embodiments of the present invention methodology, the instrument further includes remote user monitoring and controlling capabilities selected from the group consisting of internet, intranet, wireless and combinations thereof.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 35 through 41 show chemical and physical processes that are examples for uses of present invention instrument vessel arrangements;

FIG. 42 illustrates a block diagrammatic overview of one preferred embodiment of the present invention control system showing the steps a user would take to effectively utilize the control system in conjunction with an instrument such as any of those shown in FIGS. 18, 19, 23, 24, 25, 26, 27, 28, 29, 30, 31, 32, 33 and 34 above;

FIGS. 45, 46 and 47 show front views of present invention system and methodology monitor screen template presentations presented to a user and filled in by the user for a particular sequence and reactor;

FIGS. 48, 49, 50, 51, 52, 53 and 54 show a series of monitor screen pages that provide a multiplicity of functions. These pages are presented to a user to provide instruction on how to proceed with the sequence of operations, they present a checklist for the user, they create a record of procedures and they may optionally be incorporated into the laboratory notebooks automatically created by the present invention;

FIGS. 55 and 56 illustrate electronic lab notebook pages created by the present invention showing both the project components and parameters and the project results.

DETAILED DESCRIPTION OF THE EMBODIMENTS

Figure 1:
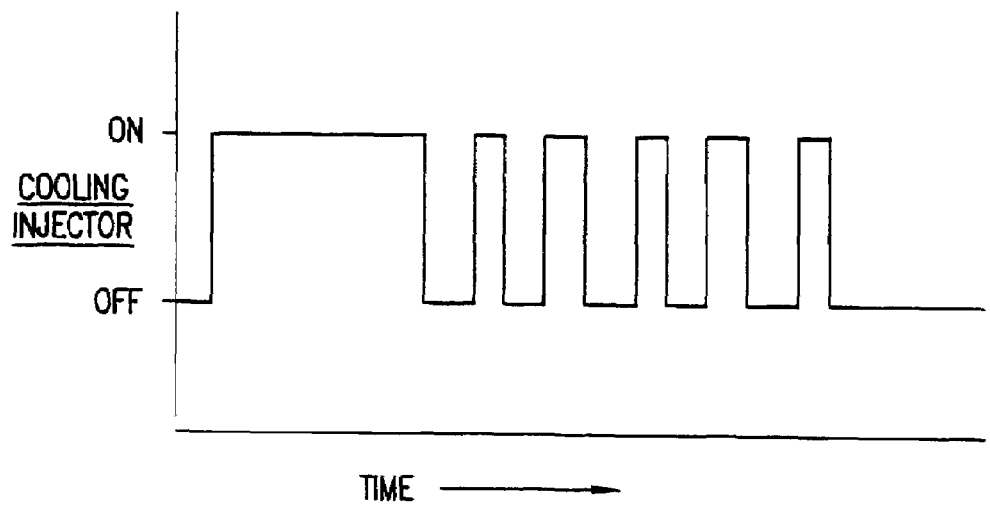
FIG. 1 is a graphical representation of the time sequence of cooling injector on-off cycling to accomplish the cooling temperature-time sequence shown in FIG. 2.

The present invention relates to the control and operation of single (stand alone) instruments for performing a variety of functions on a plurality of reaction vessels at the same time (in parallel). These functions include heating, cooling, stirring, evaporation, refluxing, gas blanketing and vacuuming, and more particularly to such instruments with cooling units that may uniquely rely upon phase change coolant injection. Further, the instruments may include unique cofinger microreactor stoppers for the vessels to enhance efficiencies and to provide many different input and output ports without interference with one another. The instruments also include pre-programmable features for controlling the functions of each work station independently of one another.

The present invention systems and methodologies include instruments that include work stations with reaction vessel systems that include programmable temperature/time sequences utilizing a microprocessor, a heating unit and a cooling unit. With this system various reaction requirements are automatically achieved, such as heating/cooling, cooling/heating sequences, refluxing, evaporating, condensing, distilling and other steps necessary to achieve desired reaction conditions. The present invention preferred cooling unit uniquely relies upon phase change coolants where the endothermal heat of evaporation is absorbed from the reaction vessel when the phase change coolant is injected into the heat absorbing area with a programmable device, e.g. a computer, controlled injector. Environmentally inert phase change coolants are utilized and evaporated and dissipated to the atmosphere in gaseous form.

The reaction vessels utilized in the present invention systems and methodologies may be any form of reaction vessel capable of transmitting heat therethrough to add or remove heat during a reaction process. Thus, the vessel may be glass, ceramic, cement, metal or other material, and may be opened or closed and at atmospheric pressure, fixed pressurized or variably pressurized. It will have connected thereto (inside, outside, both or embedded) at least one temperature sensor, e.g. a thermocouple, to sense temperature. It preferably has at least two temperature sensors, for example, one at an upper portion of said vessel and one at a lower portion thereof. The temperature sensors are connected to the control means, which has a programmable device, e.g., a computer, a microprocessor or other known devices as its central component.

The heating unit is one which may be automatically controlled, either by off/on sequencing or amount of heating (rate) or both. The heating unit may be conductive, convective, radiant, directly or indirectly, e.g. by heat exchanger or combination of heating mechanisms but is typically a steam heating element or an electric heating element type unit, with electrical convection to the microprocessor. The heating unit may be a flat plate, a nest for the reaction vessel, an annular unit to encompass the reaction vessel, a wrap, a coil or any shape otherwise functionally connected to the vessel, i.e. connected directly or indirectly, permanently or temporarily thereto, to impart heat to at least a portion of the vessel, e.g., at its lower portion.

The heating unit and cooling unit may be in close proximity to one another or spaced apart substantially depending upon the actual needs for the reactions of the reaction vessel. The cooling unit of the present invention, like its heating unit counterpart, may take on any physical shape to accommodate the heat transfer (removal for cooling) relative to the reaction vessel. Critically, the cooling unit of the present invention includes a cooling element with an inlet port, a heat absorbing area and an outlet port or a plurality of one or more of these components. It also includes injection means at the inlet port for controlled injection of phase change coolant. While the present invention systems may be manufactured and sold in various configurations without a phase change coolant supply, in actual use a phase change coolant supply is essential, e.g. by attachment of one or more pressurized inert liquid tanks or with a generator, or a compressor or other coolant creating, compressing or storing means.

The cooling element may be a coiled tubing or a molded, machined or an otherwise-formed open area within the cooling unit to permit injection of phase change coolant and is preferably adjacent to the reaction vessel itself. In other words, the open area of the cooling element is enclosed, e.g. with materials of construction which preferably include insulative characteristics. The phase change coolant is injected into the heat absorbing area at the inlet port and evaporates under normal pressure to its gaseous state and exhausts as gases through the outlet port. It is the endothermic heat of evaporation to the phase change coolant that absorbs heat from the vessel to effect cooling.

The phase change coolant may be any material which evaporates below room temperature, e.g. preferably below 24° C., and most preferably, below 0° C. Such materials are liquid under pressure and may be stored as such in storage reservoirs, e.g. tanks, for subsequent use or otherwise provided as described above. These coolants go through at least one phase change to effect a net heat absorbing transition, are environmentally inert, i.e. harmless to the environment when dissipated, and include such phase change coolants as are presently and/or will become commercially available. They include, but are not limited to, the elements known as inert gases, carbon dioxide, nitrogen, etc. The cooling mechanism of the current invention is based on the heat exchange during the phase change of coolant material and physical condition of the nozzle. A precise heat exchange control can be readily achieved by an appropriate selection and adjustment between either liquid to gas or a sequential phase change of liquid to solid then solid to gas. Commonly used coolants are pressurized liquid carbon dioxide, or pressurized liquid argon, or pressurized liquid nitrogen. Pressurized liquid carbon dioxide is preferred because it can be easily used to accommodate the critical point, which is very close to the room temperature at atmospheric pressure.

The injection means will typically include an injection nozzle, such as a stainless steel nozzle, a valving mechanism and a supply line, with the valving mechanism directly upstream from the injection nozzle. (In cases where small diameter tubing or inlet means is used, then such tubing or inlet means may also act as the nozzle itself, without added hardware.) The valving mechanism may be a flap or shutter valve or other on/off valve, or it may be a controlled opening (flow rate controlling valve) such as a stem valve or gate valve. The on/off valve mechanisms may be opened and closed by solenoids or switches or other known devices, and the flow controlling valves may be opened and closed by servo-drivers or other rotating or lifting devices. In a more complicated system, both types of valves, i.e. on/off and flow rate controlling valves may be used to offer both types of controls in the system.

One component of the present invention systems and methodologies is a control means that may be any programmable device, such as manual switches, dials, buttons, levers, etc., with sensors for feedback, a computer or microprocessor with appropriate software or sequence input, external inputs and wiring to the cooling unit, to the heating unit and preferably, to the reaction vessel. More specifically, the programmable device may have output information available to a user, e.g. a microprocessor may have a display which includes a readout and programming inputs. For example, it could have a plurality of buttons, input means, selection means, switches, keypads, etc., with choices including "SEQUENCE NUMBER", "TEMPERATURE" and "TIME" with a numerical keyboard, and the microprocessor itself will divide when to use the heating unit and when to use the cooling unit to achieve the programmed temperatures for the specified times. The "TIME" inputs could be elapsed time needs or actual clock start and end times. In a more preferred embodiment, additional buttons, controls, inputs, icons, selections, etc. could include "HEATING UNIT" and "COOLING UNIT" selections so that both units could operate simultaneously or separately or both, as the user may desire other control inputs/outputs should now be evident to the artisan. In yet another embodiment, a user may be offered the opportunity to select proportional controls for flow, tolerances from a predetermined set of choices and other parameters, as a designer may offer to end users. Also, the programmable device may have time delay input capabilities before start-up is initiated or even offer unlimited off sequences between heating and/or cooling sequences for inputted periods of time. Other programming possibilities should now be apparent to the artisan without exceeding the scope of the present invention.

The total configuration of the system may be portable or somewhat permanent depending upon the size of the reaction vessel and the particular needs, and would be enclosed by the instrument main housing. Further, while the drawings described below are merely diagrammatic, actual embodiments would have appropriate support structures and in preferred embodiments, the reaction vessel itself may be movable from the remainder of the system, for reaction product removal, cleaning, etc. Additionally, while the drawings illustrate the system simplistically, it should be understood that spatial relationships are not limited to those shown. For example, in distillations and condensing, a reaction vessel may have a side arm or condensing tube and the cooling unit may be connected thereto rather than directly above the heating unit, without exceeding the scope of the present invention. The following FIGS. 1 through 6 below describe the details of those present invention embodiments that include phase change cooling systems.

Figure 2:
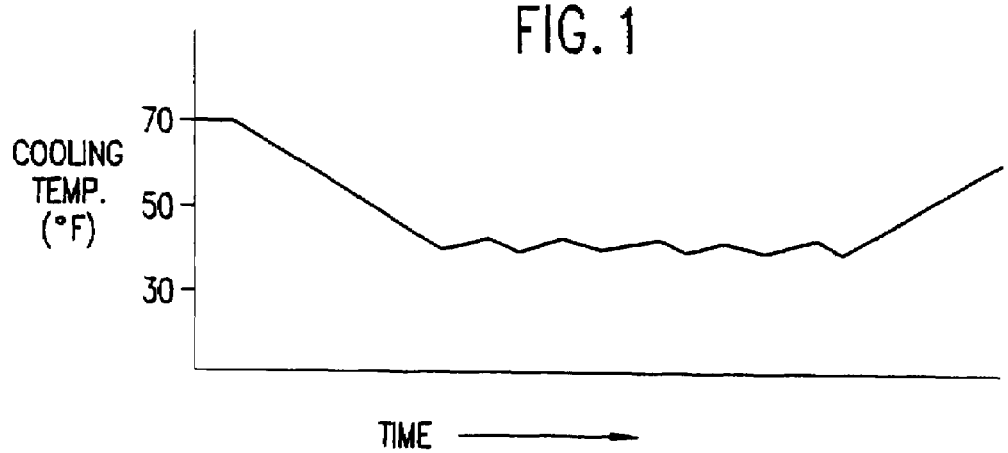

Referring now to FIGS. 1 and 2, there is shown a typical cooling temperature versus time sequence to be controlled within the reaction vessel by the system which is shown in FIG. 2. The cooling injector on-off time cycling, controlling injection of coolant into the system cooling unit, implemented by the system controller to accomplish this temperature-time cycle is shown in FIG. 1. In addition, FIG. 3 shows the time cycling of the percent injection cooling controlled by the injector, which is the modulation of the rate of injection of coolant into the reaction vessel cooling unit, implemented by the controller in combination with the cooling injector on-off cycling of FIG. 1, to accomplish the temperature-time sequence in the reaction vessel of FIG. 2.

Figure 3:
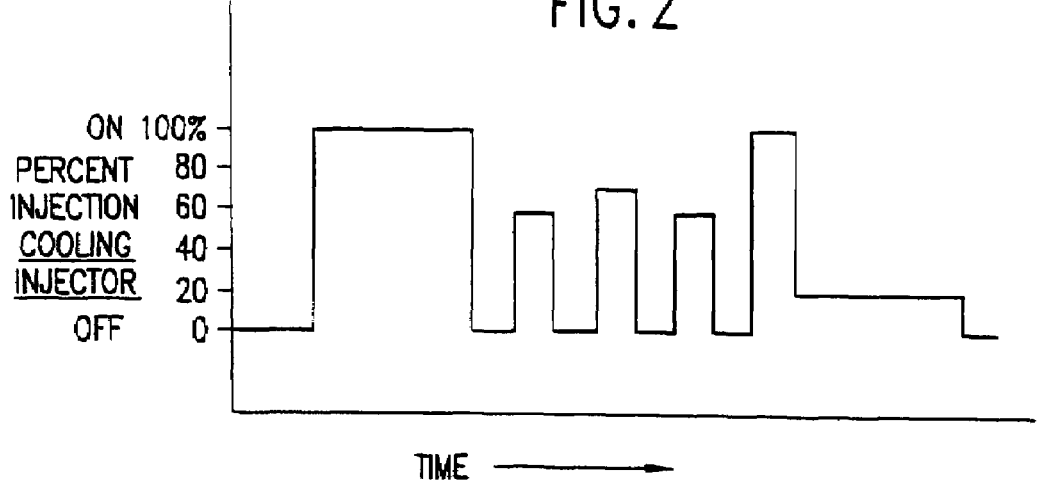
FIG. 3 shows the variation in percent injection cooling time sequence of the cooling injector used in conjunction with the cooling injector on-off sequence shown in FIG. 1 to accomplish the cooling temperature-time sequence of FIG. 2.
Figure 4:
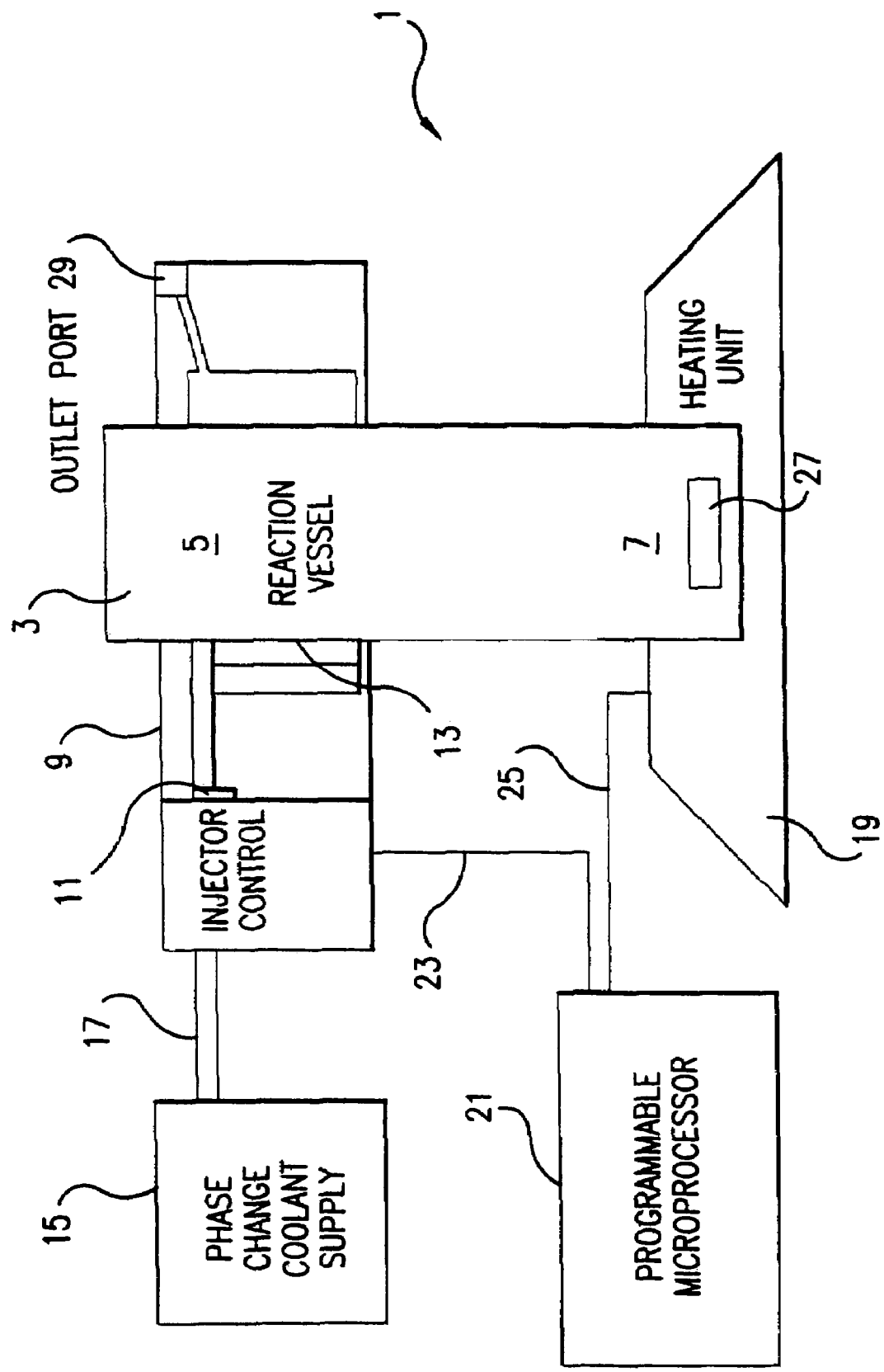
FIG. 4 is a schematic diagram of the present invention reaction vessel system, and two representative embodiments of the reaction vessel system are shown in FIGS. 5 and 6.

While the foregoing discussion pertaining to FIGS. 1, 2 and 3 above are specifically directed to cooling units, similar illustrations, discussions and control techniques could also be applied to heating units of the present invention. A schematic diagram of the heatable, coolable reaction vessel system 1 is shown in FIG. 4. The reaction vessel 3 has a cooling section 5 and a heating section 7. Inlet port 9 provides coolant from injector control 11 to cooling unit 13. Cooling unit 13 physically surrounds and connects to cooling section 5 of the reaction vessel 3 to transfer heat from section 5 to the coolant in the cooling unit 13. Outlet port 29 ejects spent coolant from cooling unit 13 to the atmosphere. A supply of phase change coolant 15 is connected to coolant injector 11 via conduit 17, and thereby into coolant unit 13.

Heating unit 19 is shown at the heating area 7 of reaction vessel 3. The heating unit physically surrounds and connects to heating area 7 of reaction vessel 3 to transfer heat into the vessel as needed to control the chemical reactions occurring in reaction vessel 3.

Programmable microprocessor 21 is the control means for the reaction vessel system, and is connected to the coolant injector control 11 via cable 23 and to heating unit 19 via cable 25 to implement the required temperature-time cycling desired within the reaction vessel, and programmed into the microprocessor 21 for execution.

A magnetically operated stirring device 27 is shown within the reaction vessel in heating area 7.

Figure 5:
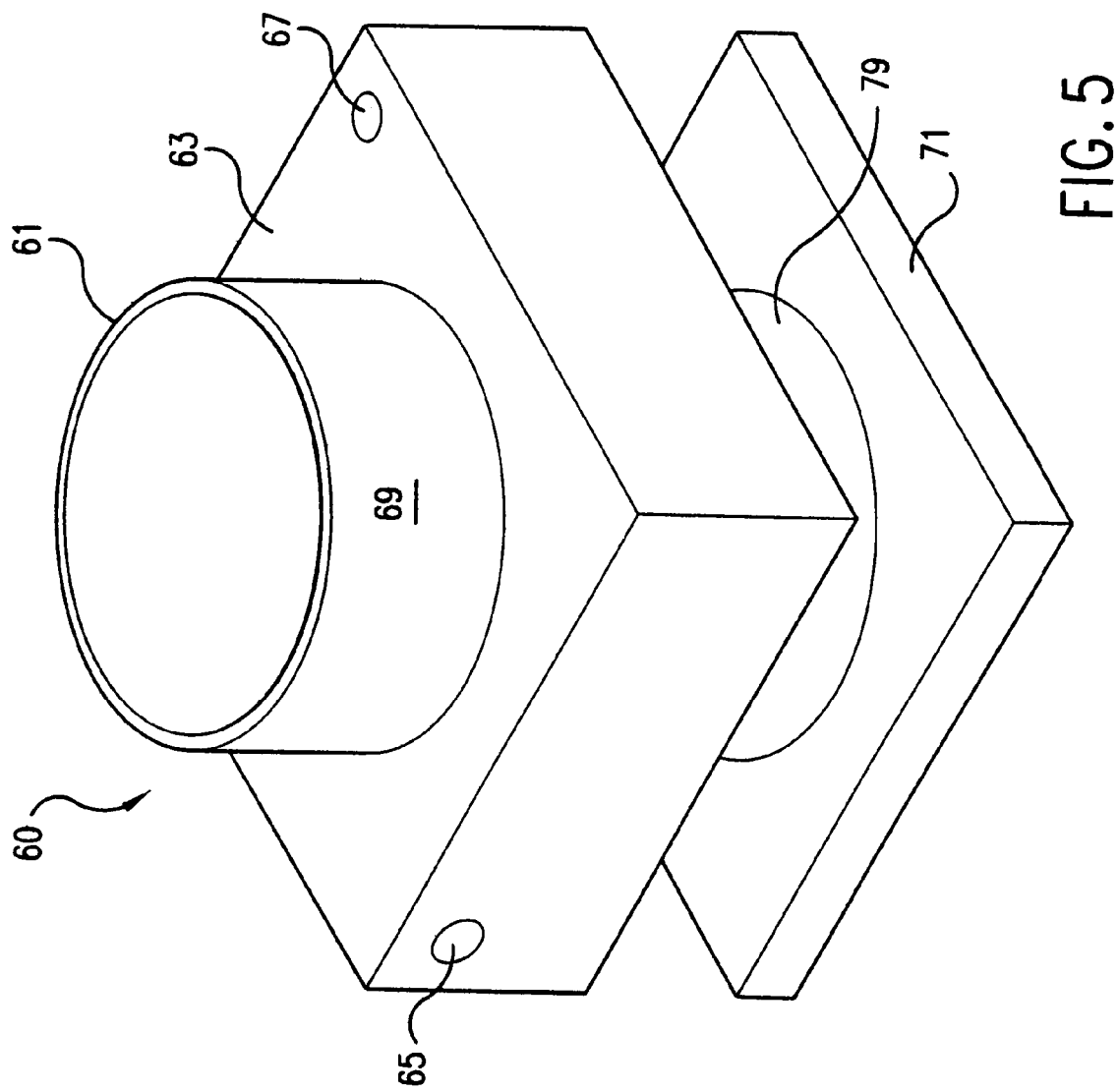

FIG. 5 is a perspective view of one embodiment of the reaction vessel system 60. Reaction vessel 61 has cooling section 69 and heating section 79. Surrounding cooling section 69 of the reaction vessel 61 is cooling unit 63 with phase change coolant inlet port 65 and phase change coolant outlet port 67. Heating unit 71 is shown surrounding heating section 79 of reaction vessel 61.

Figure 6:
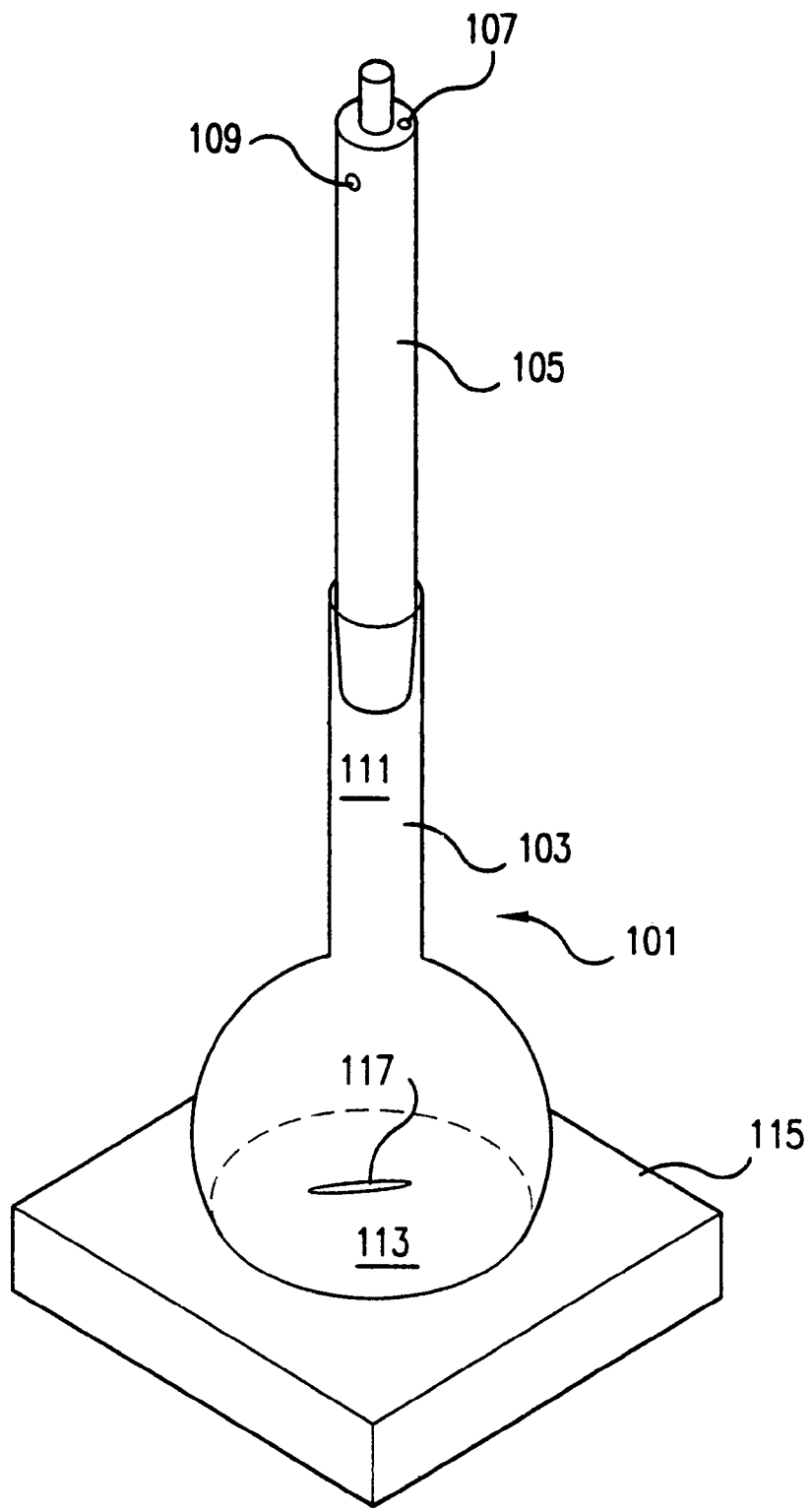

FIG. 6 shows a perspective view of a second embodiment of the reaction vessel system 101. Reaction vessel 103 has an upper section 111 with a cooling unit 105 having phase change coolant inlet port 107 and phase change coolant outlet port 109. Also shown is heating section 113 of reaction vessel 101 surrounded by heating unit 115. Magnetically operated stirring device 117 is shown inside reaction vessel 103.

The magnetic stirring device 117 is provided in a preferred embodiment of the reaction vessel system to asset in promoting the chemical reactions occurring in the reaction vessel which are being controlled by the cooling and heating subsystems. The magnetic stirring device is actuated by a magnetic drive mechanism located within the heating unit 115 at the heating area 113 of reaction vessel 103. The required operating cycle of the stirring device during a particular reaction time sequence is controlled by the programmable controller 21 in FIG. 4.

The foregoing describes preferred embodiments of the present invention, and FIGS. 4, 5 and 6 illustrate upper reaction vessel cooling units and lower reaction vessel heating units. These may be reversed, or multiple heating and/or cooling units may be included in any useful arrangement without exceeding the scope of the present invention. Likewise, any sequence of heating/cooling or cooling/heating or repeats, reverses or even simultaneous heating and cooling may be effected by the present invention.

Also, as mentioned above, the heating and cooling units of the present invention instruments may be directly or indirectly connected thermally to the reaction vessel. Indirect connection may include, for example, baths, such as oil baths, water baths or gel baths; others may be other heat exchange media, such as flowing gases or solids or combinations. In those present invention embodiments that do not include phase change cooling, the cooling system may be any cooling system known, such as liquid cooling, and any known heating system, such as convection heating or resistance heating.

Figure 7:
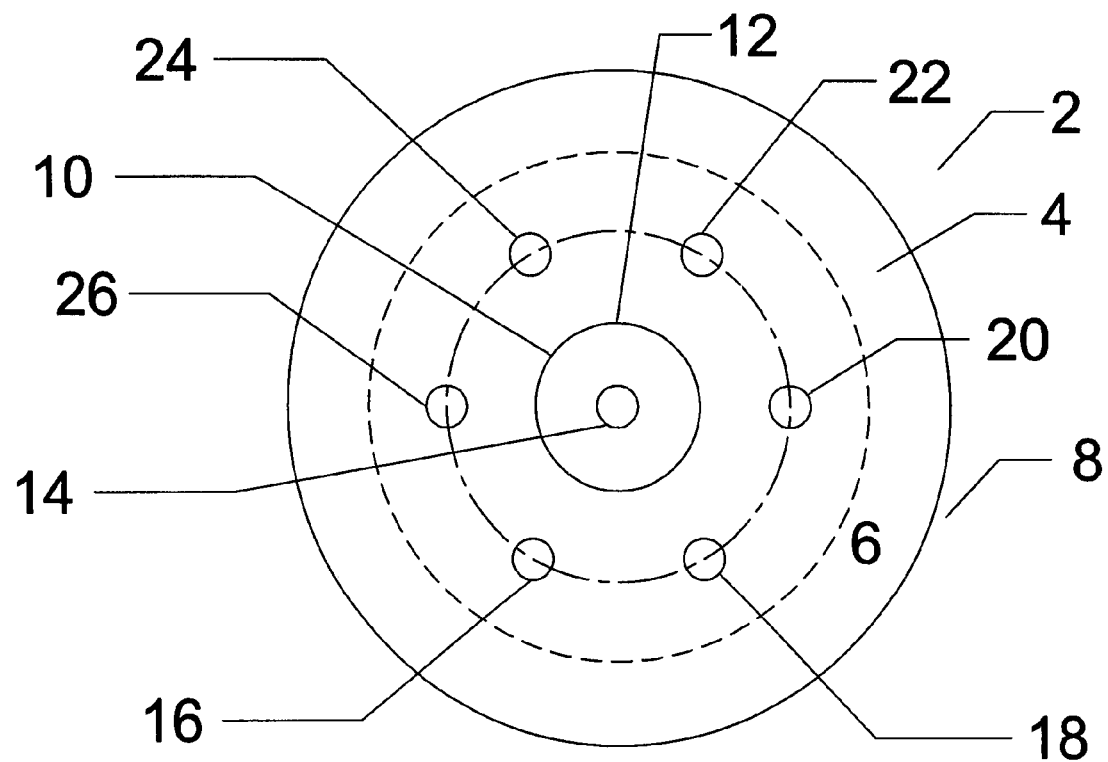
FIG. 7 shows a top view of present invention multiport cofinger stopper.
Figure 8:
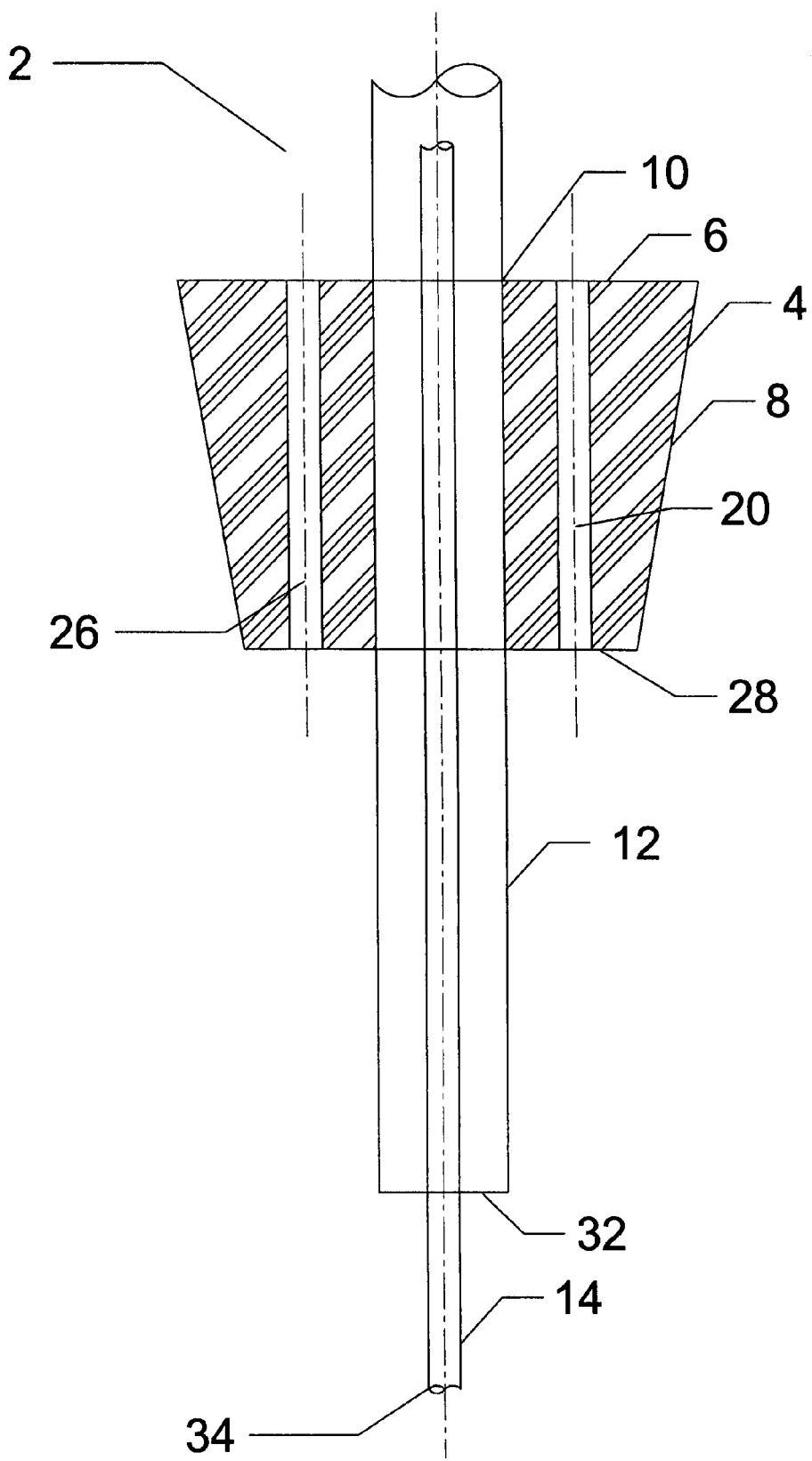
FIG. 8 shows a side cut view of the present invention stopper shown in FIG. 7, with identical parts identically numbered.

The following FIGS. 7 through 17 below describe the details of those present invention embodiments that include the use of cofinger stoppers with the reaction vessels (microreactors), and the discussion is focused on the cofinger technology. Subsequent Figures describe further details of the present invention instruments incorporating the phase change cooling and/or cofinger features:

FIG. 7 shows a top view of present invention multiport cofinger stopper 2 and FIG. 8 shows a side cut view of present invention stopper 2 shown in FIG. 7, with identical parts identically numbered. Both Figures are now discussed together. Stopper 2 includes a main housing 4 with a top 6, a sidewall 8, and a bottom 28. There is a central orifice passing from top 6 to bottom 28 shown generally as orifice 10. There is a plurality of concentric outer orifices 14, 16, 18, 20, 22, 24, and 26 that also run from top 6 to bottom 28.

FIG. 8 shows a side cut view of present invention stopper 2 shown in FIG. 7. Central orifice 10 includes a cofinger established by outer tube 12 and inner tube 14. In this embodiment, both outer tube 12 and inner tube 14 have open ended lower ends 32 and 34, respectively. These could be used simultaneously to add two separate constituents to the center of a reaction solution. Alternatively, they could be used to maintain a fixed volume within a desired height range by adding or removing materials. Other uses would now be apparent to one skilled in the art.

Stopper 2 has a tapered side wall with slight resilience so that it may be pushed into an open neck of a microprocessor and force-fitted therein for use in combination with a microprocessor.

The central orifice is shown to be on center in FIGS. 7 and 8, but need not be in the center to be centrally located. Likewise, the outer orifices need not be of identical spacing or distance from center. Although symmetry is aesthetically appealing, it is not essential to the functionality of the present invention.

The outer orifices or the central orifice may be used for insertion of reactants, solvents, diluents, or any other materials, solid, liquid or gaseous. Alternatively, any of the orifices may be used to remove material from the microreactor. The outer orifices may be used for sensing physical characteristics, such as temperature, thermal conductivity, pressure, viscosity, electrical resistance or any other characteristic by insertion of one or more probes. They may be used for inert or reactive gas blanketing or removal. They may be used for combinations of the foregoing simultaneously, sequentially, continually or continuously or as otherwise desired.

The central orifice includes a cofinger that may be used for any one or more of the above-stated purposes and is ideal for cooling or heating when the outer tube is closed at its lower end so that hot or cool liquid or gas may flow in one tube and out the other so as to heat or cool the contents of the microreactor without physical contact therewith.

Figure 9:
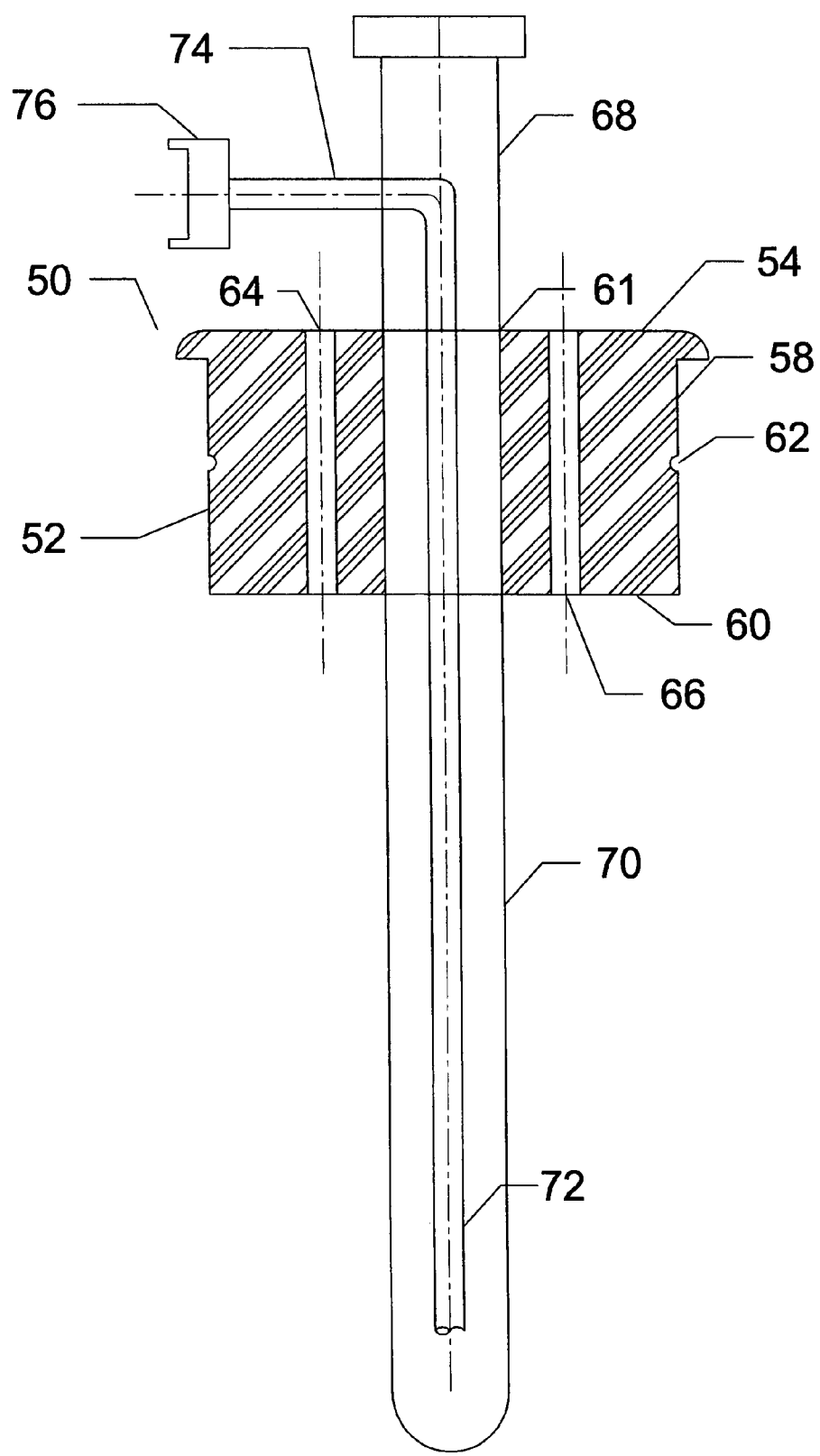
FIG. 9 shows an alternative embodiment present invention stopper with different features from the stopper described above.

FIG. 9 shows an alternative embodiment present invention stopper 50 with different features from stopper 2 described above. Stopper 50 includes a mainhousing 52 with a top 54, a side wall 58, a bottom 60 and a central orifice 61. It also has a set of eight separate outer orifices that are shown in cut view FIG. 9 as represented by orifices 64 and 66.

Embedded in central orifice 61 is a cofinger 68 that included a closed outer tube 70 and an open inner tube 72. Inner tube 72 includes an elbow 74 with attachment means 76. Instead of a taper, stopper 50 has an O-ring 62 for sealing means.

Figure 10:
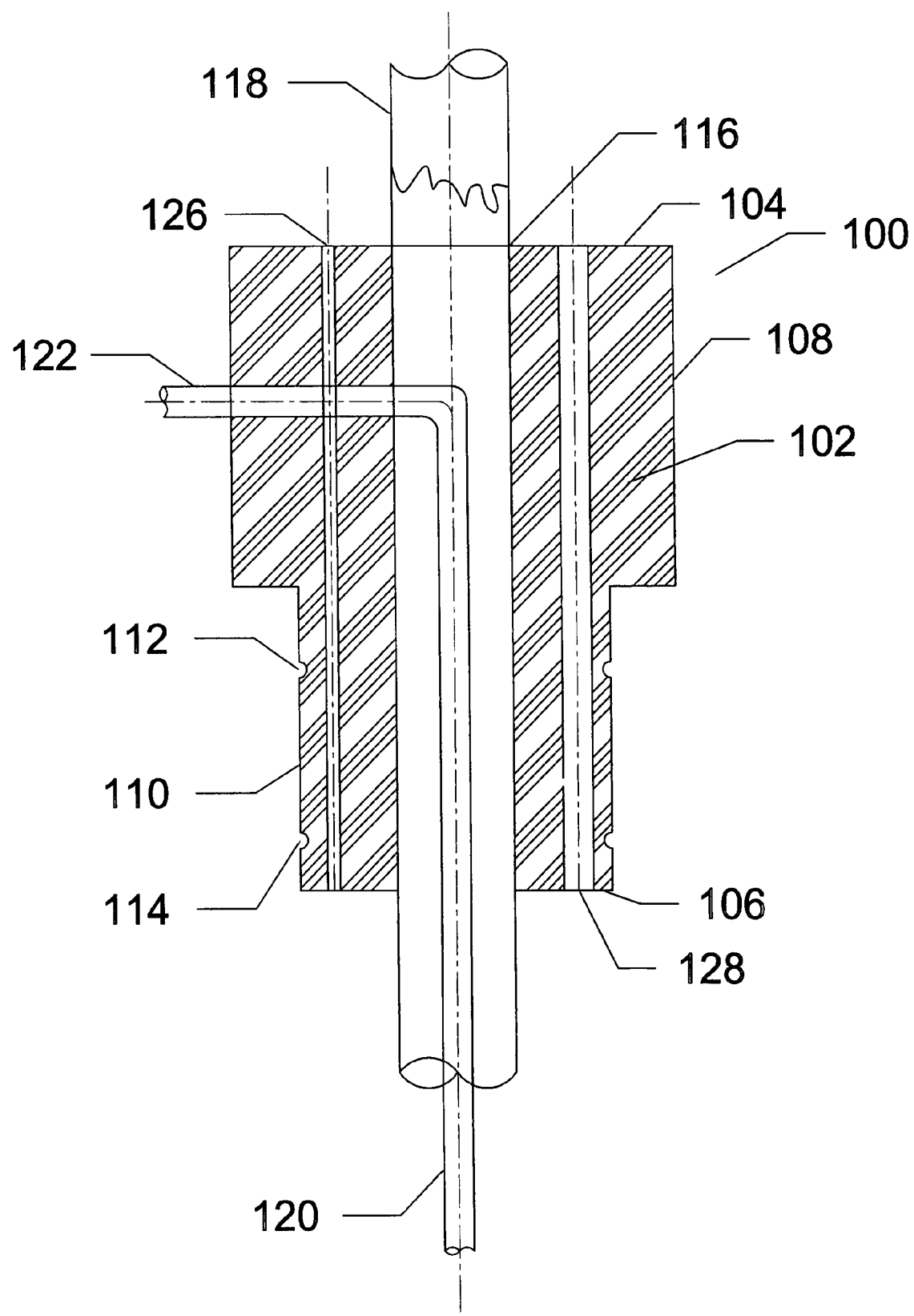
FIG. 10 shows a present invention stopper that has two different diameter sections.

FIG. 10 shows a present invention stopper 100. Stopper 100 includes a mainhousing 102 with a top 104 and a bottom 106. There is a side wall having an upper section 108 and a lower section 110. The diameter of side wall upper section 108 is greater than the diameter of side wall lower section 110, as shown. Lower section 110 fits into an open neck of a microreactor such as a flask, beaker or other bench-scale reactor. It is held in place and sealed via dual O-rings 112 and 114. A central orifice 116 includes outer tubing 118 and inner tubing 120 to form a cofinger. Additionally, there are a plurality of different size outer orifices (at least four) as represented by outer orifices 126 and 128.

In this particular embodiment, inner tube 120 has an elbow 122 that exits outer tube 118 and exits through the side wall of main housing 102, as shown.

Figure 11:
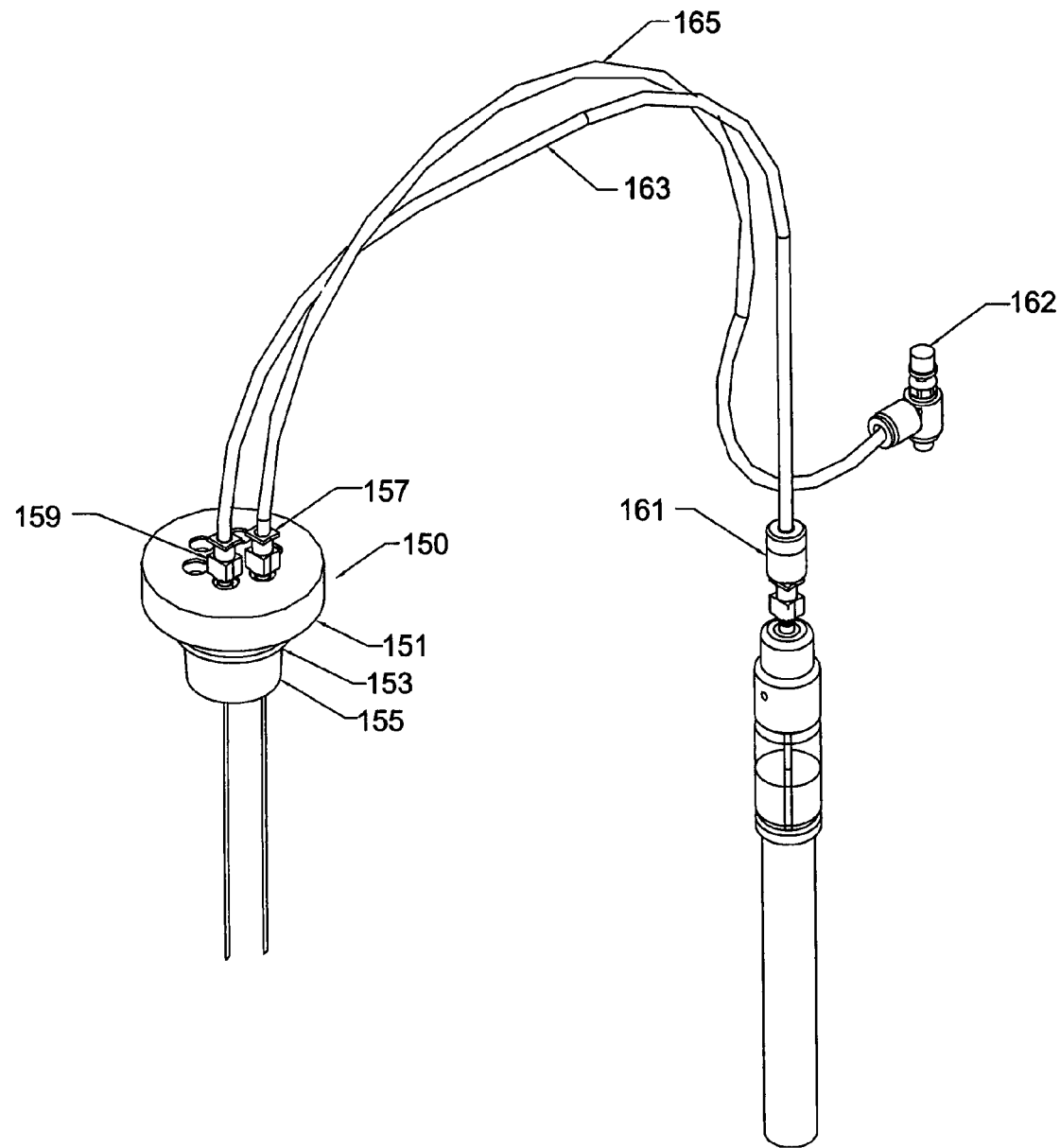
FIGS. 11 and 12 show oblique views of present invention stoppers with differing cofinger arrangements.

FIG. 11 shows a present invention device 150 with stopper 151 having an upper portion 153 and a lower portion 157. There is a central orifice 157 and five outer orifices such as outer orifice 159. There is a gas bubbler 161 connected to tubing 163 for gas input. There is a separate output line 165 with a controlling valve 167. This is used in environments wherein central orifice 157 may be used in closed, sometimes pressurized, environments. Central orifice 157 would include a cofinger with probes or other components connected thereto, as desired. Alternatively, the central orifice 157 could be connected to evacuation means for removing gas or liquid or both.

Figure 12:
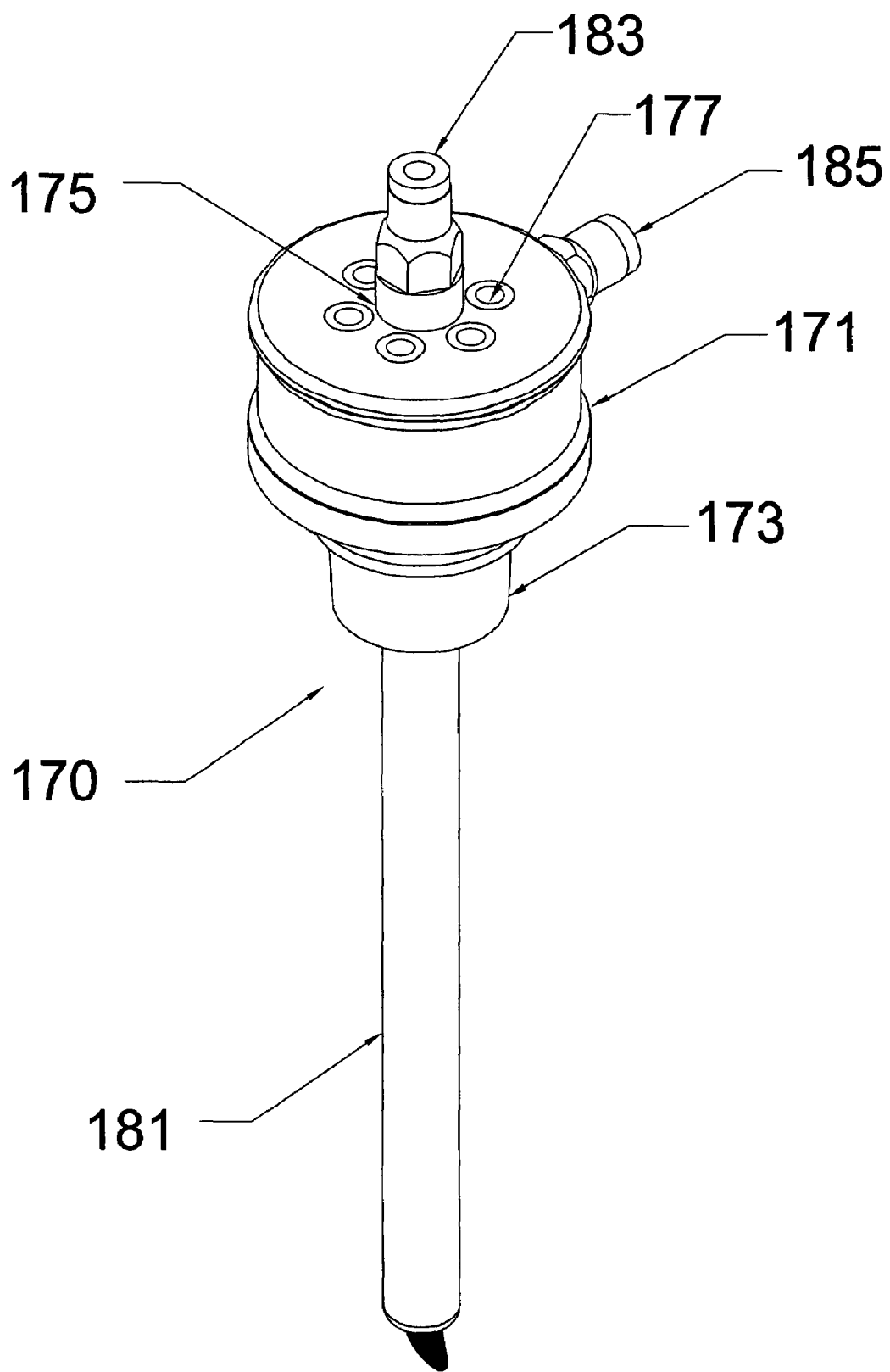

FIG. 12 shows another present invention stopper 170. It includes an upper section 171 and a lower section 173 with a central orifice 175 and six outer orifices such as outer orifice 177. Cool finger cofinger 181 has a top-exiting outer tube 183 and a side wall-exiting inner tube 185. Any of the outer orifices could be used to create pressure, or to evacuate, to measure physical parameters, to remove product, to add reactant or dilutent or some combination thereof.

Figure 13:
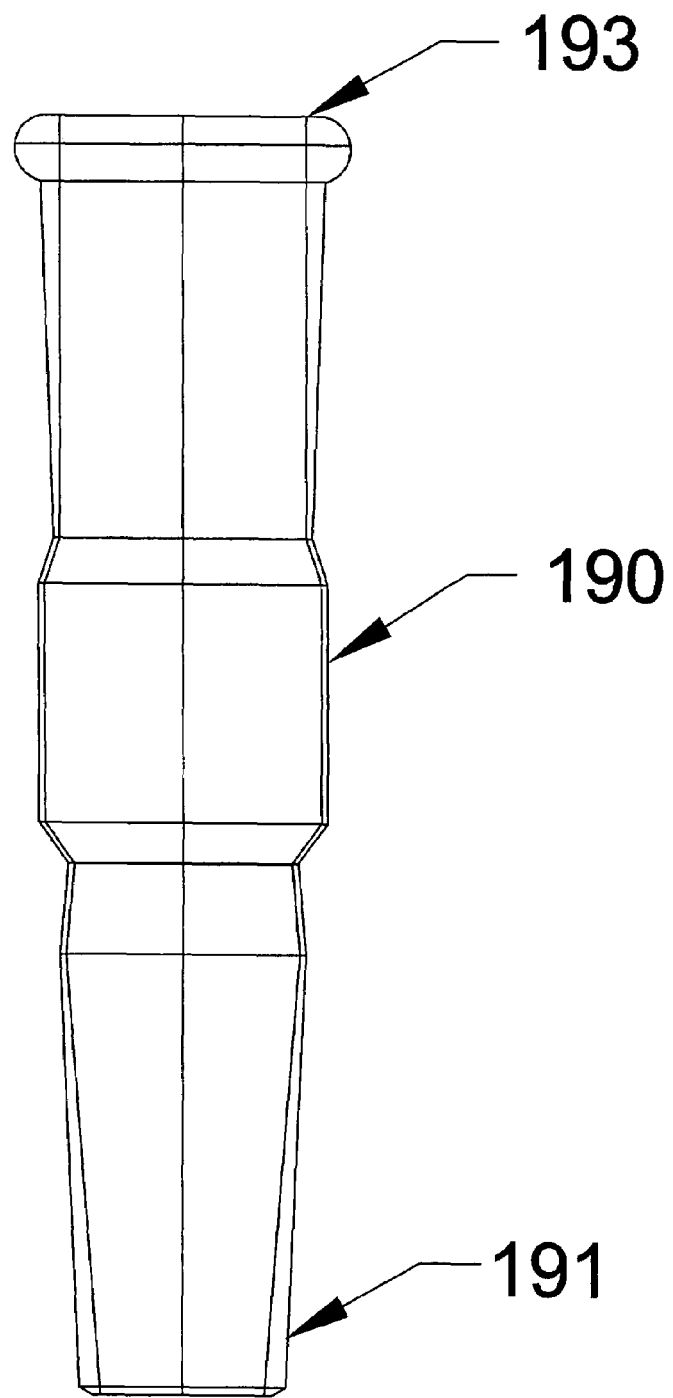
FIG. 13 shows a microreactor extension member.

FIG. 13 shows a microreactor extension member 190. It has a narrow bottom neck 191 for insertion into an open neck of a microreactor. It has a wider open top neck 193 for receiving a present invention stopper.

Figure 14:
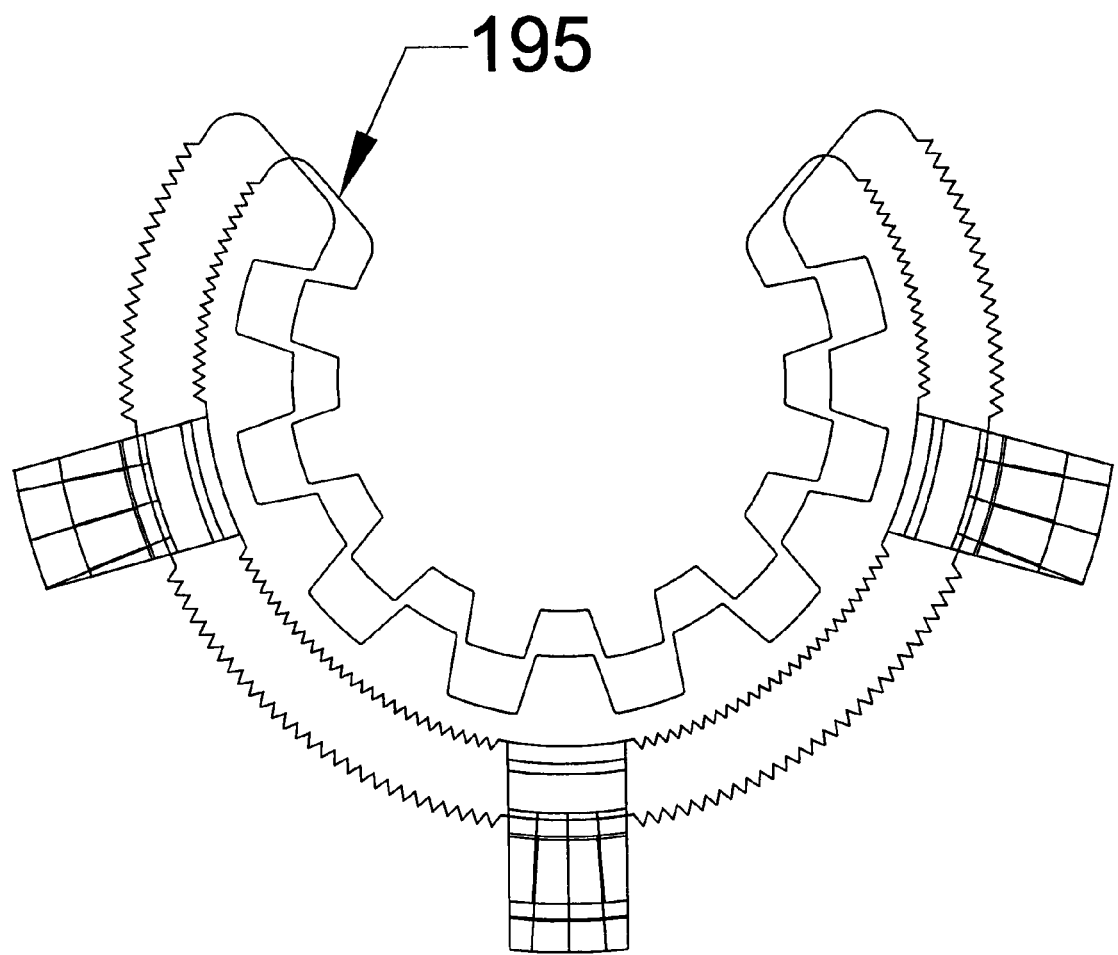
FIG. 14 shows a clamp, each of which may be utilized with a present invention device.

FIG. 14 shows a top view of a stopper clamp 195 that may be connected to both a stopper and a microreactor for clamping the stopper to a microreactor under pressurized conditions.

Figure 15:
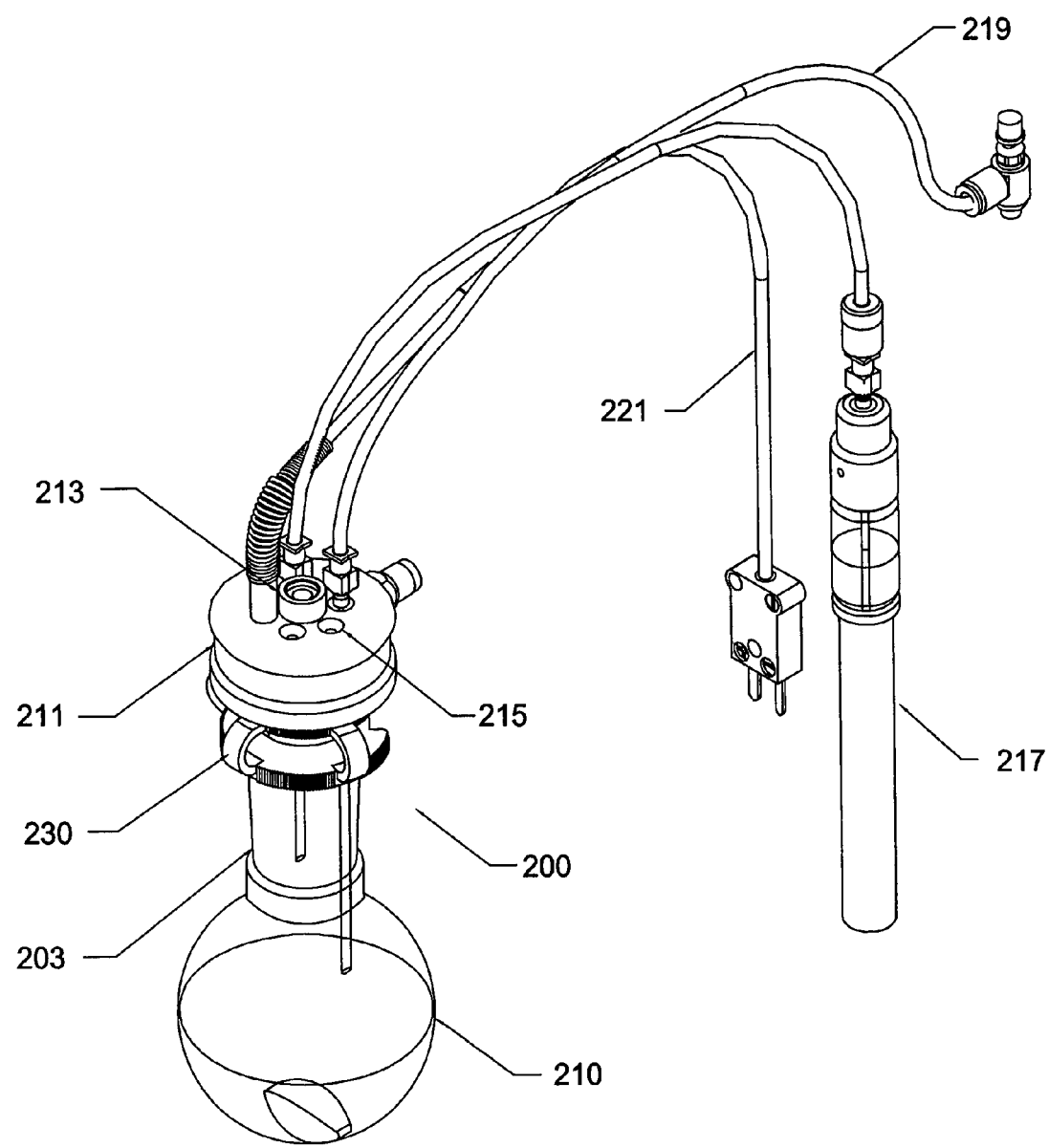
FIG. 15 illustrates a present invention device with three separate connective functions.

FIG. 15 shows an oblique view of a present invention device shown generally as device 200. It includes a microreactor 201 with an open neck 203. Stopper 211 has a central orifice 213 and a plurality of outer orifices such as outer orifice 215. Stopper 211 is similar to stopper 1 shown in FIG. 7. A gas bubbler 217 is connected to one outer orifice for blanket gas input and output to tube 219 is connected to another outer orifice for blanket gas output. Thermocouple sensor 221 is connected to the central orifice cofinger 213 to permit exhaust gas exiting and simultaneous temperature measuring. The remaining outer orifices may be open or closed and may or may not include injection ports. Clamp 230 may be used to maintain stopper 211 in sealed position on microreactor 201.

Figure 16:
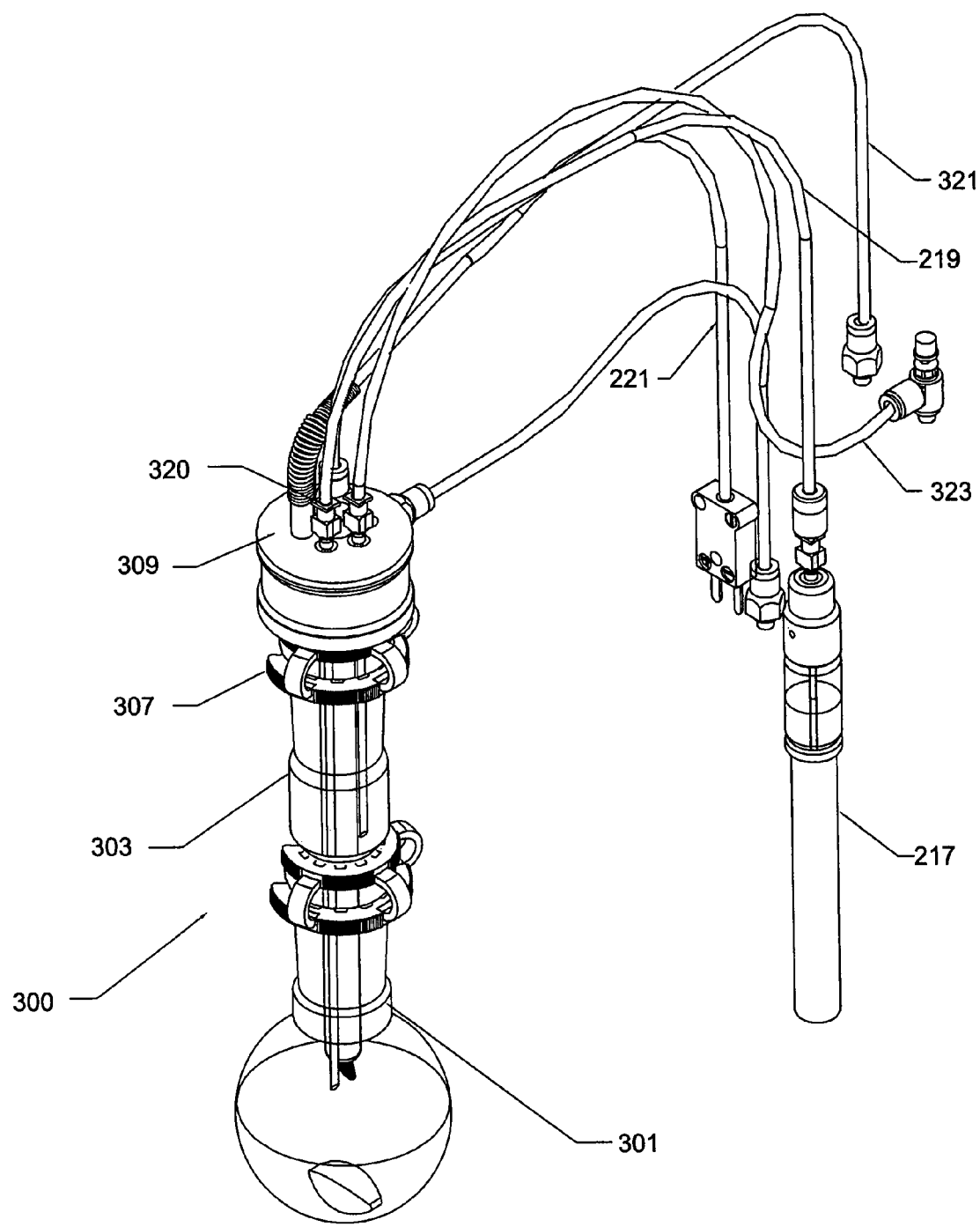
FIG. 16 shows a present invention device with an extension member and five orifices being used for different functions.

FIG. 16 shows an alternative embodiment present invention device 300. It includes microreactor 301 with open-mouthed neck 303, extension 305, clamp 307, and stopper 309. In this embodiment, some of the orifice connections shown in FIG. 11 are also shown here and are identically numbered. Additionally, the thermocouple 221 is located in an outer orifice, and a closed loop cool finger cofinger is contained within central orifice 320. This includes cooling water input 321 and cooling water output 323.

Figure 17:
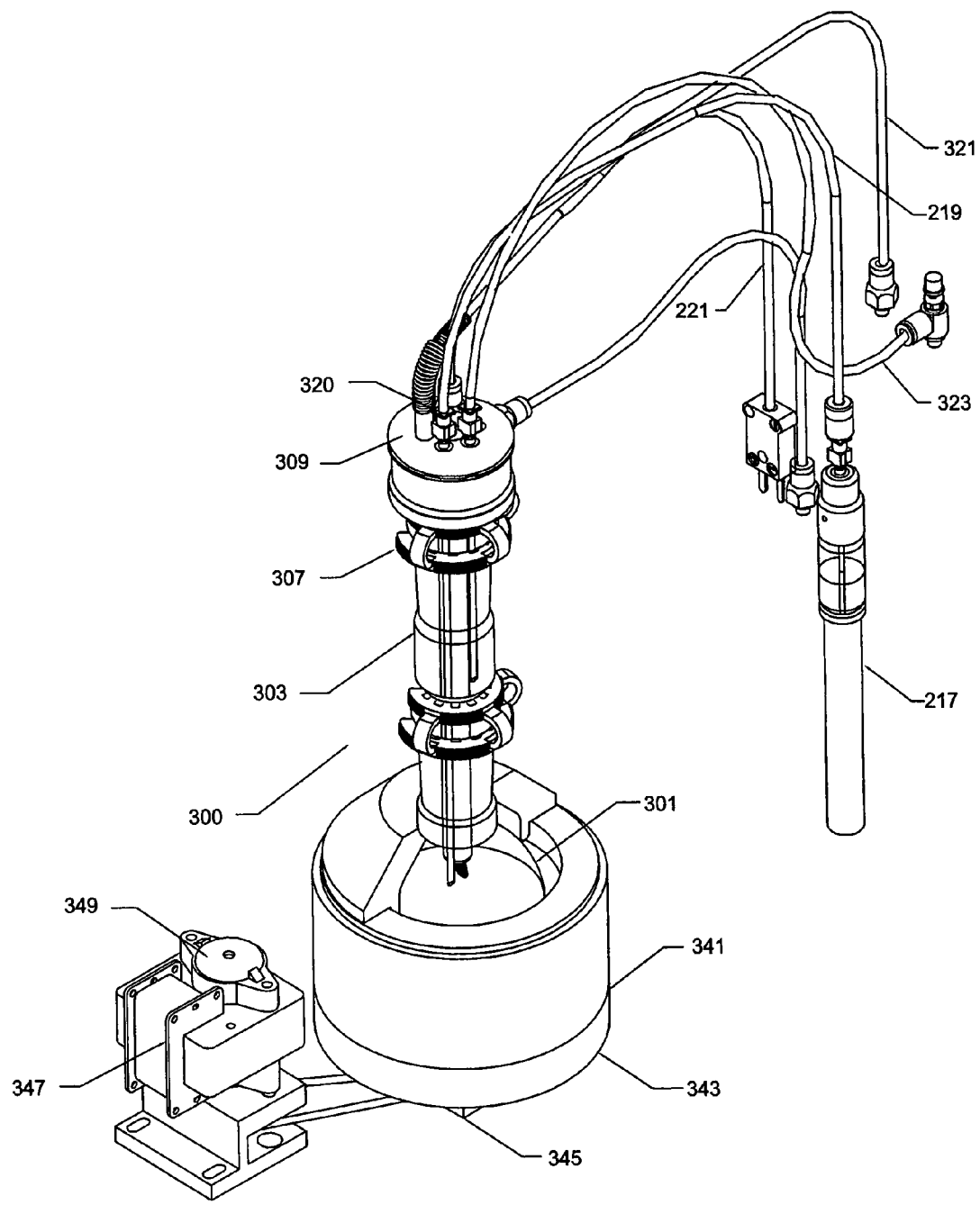
FIG. 17 shows the same present invention device as shown in FIG. 16, but with additional features now included.

FIG. 17 shows the same present invention device 300 as shown in FIG. 16, but with additional features now included. Identical parts from these two figures are identically numbered. Here, microreactor, 301 is located in an insulation cylinder 341 with an insulated bottom 343 containing a bottom-based heating and cooling mechanism 345. Magnetic stirring device 347 and controls 349 are also included.

Figure 18:
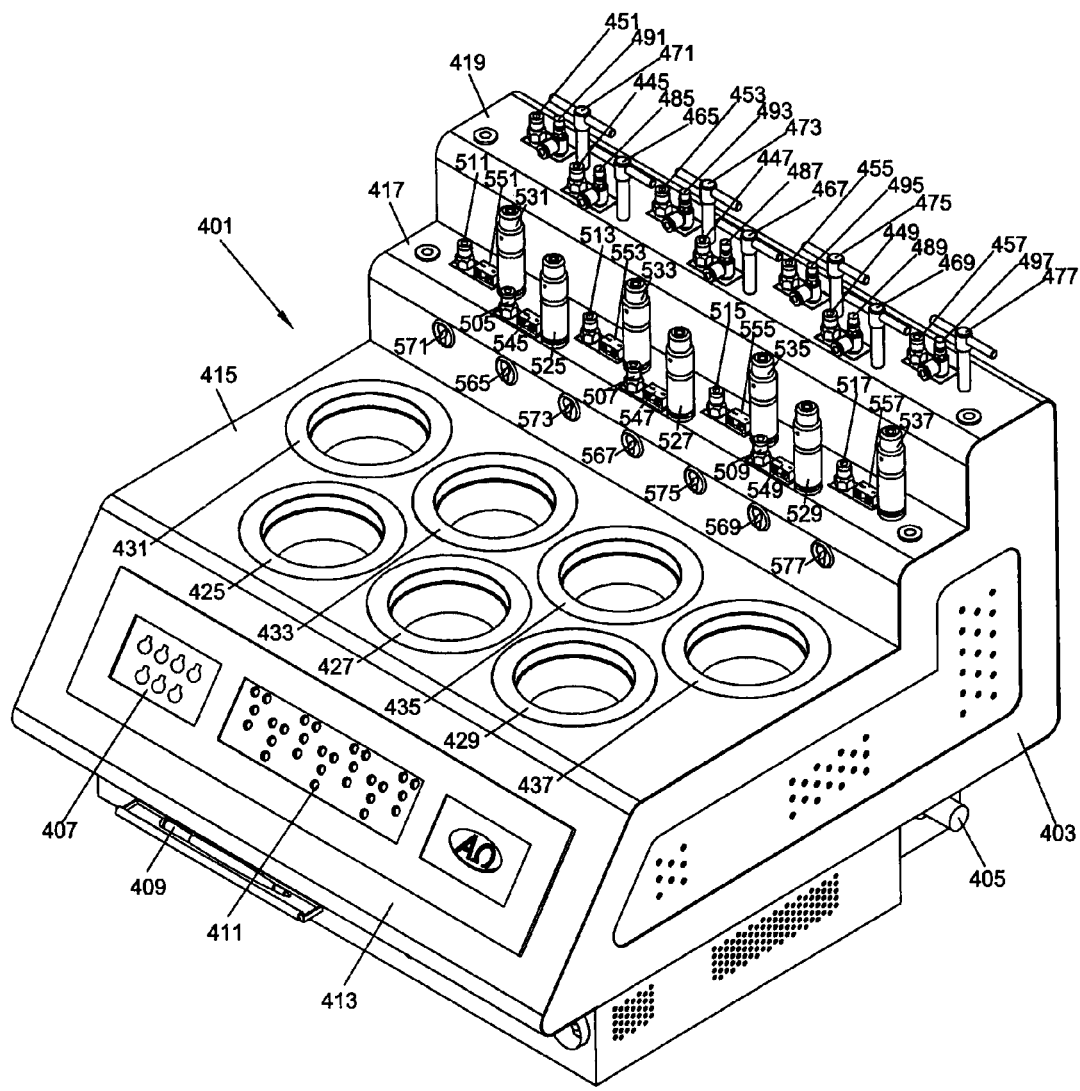
FIG. 18 shows a present invention multifunctional, multireactor instrument from a perspective view with no reactor vessels therein.
Figure 19:
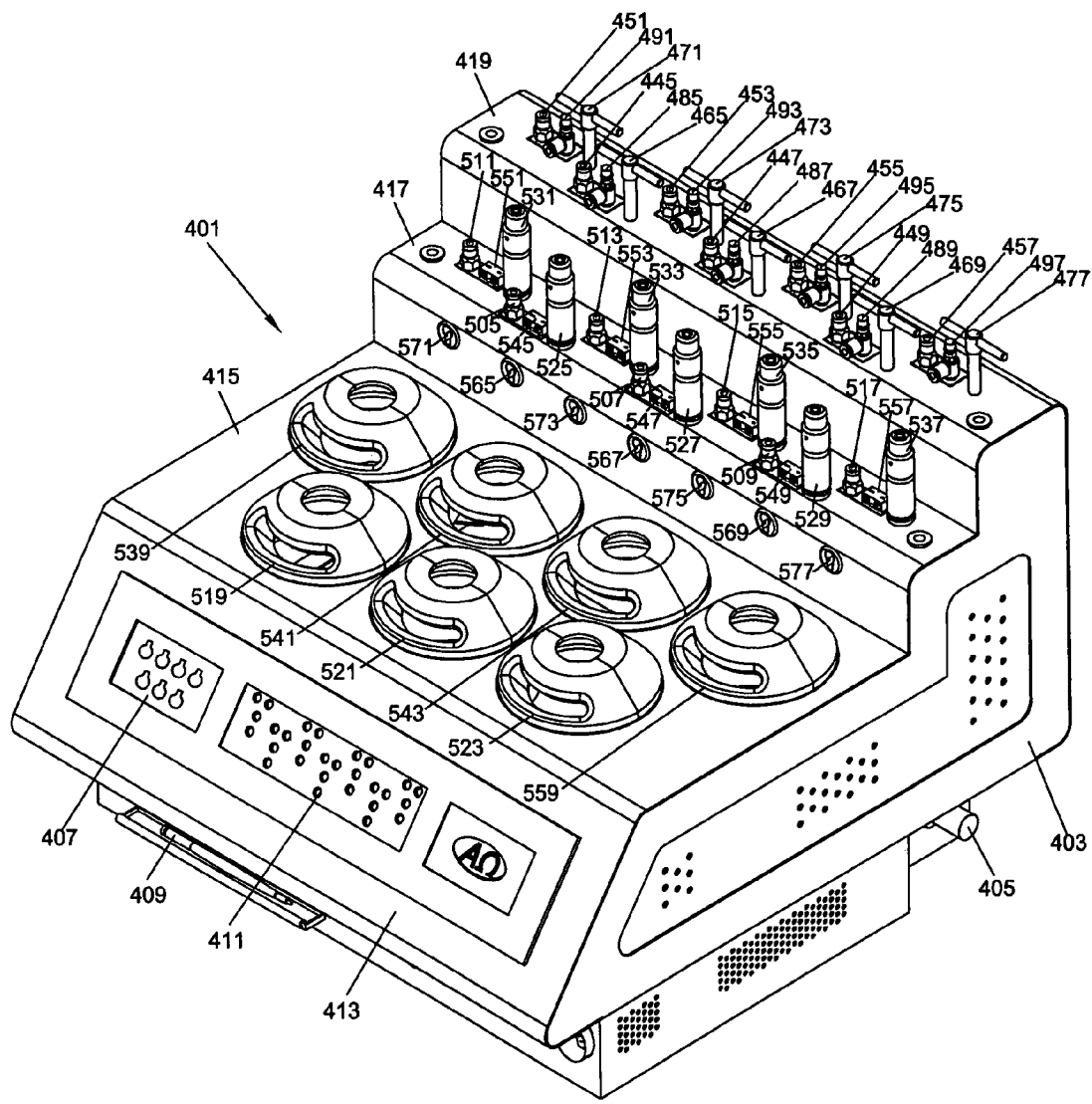
FIG. 19 shows the same instruments, but with reactor covers in place.

The following Figures describe the present invention instruments in their overview and functionality, as well as in details:

FIG. 18 shows a present invention multifunctional, multi-reactor instrument 401 from a perspective view with no reactor vessels therein, and FIG. 19 shows the same instrument 401, but with reactor covers in place. Common components to both Figures are identically numbered. Instrument 401 includes a Main Housing 403, a Pressure Controller 405, and a Microprocessor Programming Touchpad 407, with Stylus 409. A central processing unit is contained inside the Main Housing 403 to control the functions of each work station independently. The Touchpad 407 is used to set temperature, flow of gas, coolant flow etc. either through manual specific settings or through programming based on desired controlled parameters. Front Panel includes 413 Heating, Cooling, Refluxing and Stirring Indicators, such as 411, for each work station. Note that the Main housing 403 may be made of metal or plastic or combinations thereof, and metal such as aluminum is one material of choice.

The following is a parts list for the instrument 401, naming the remaining components shown in FIG. 18:

| | |
|---|---|
| Top Panel | 415 |
| Middle Tier Panel | 417 |
| Top Tier Panel | 419 |
| 1st Work Station | 425 |
| 2nd Work Station | 427 |
| 3rd Work Station | 429 |
| 4th Work Station | 431 |
| 5th Work Station | 433 |
| 6th Work Station | 435 |
| 7th Work Station | 437 |
| Water Feed for 1st Work Station | 445 |
| Water Feed for 2nd Work Station | 447 |
| Water Feed for 3rd Work Station | 449 |
| Water Feed for 4th Work Station | 451 |
| Water Feed for 5th Work Station | 453 |
| Water Feed for 6th Work Station | 455 |
| Water Feed for 7th Work Station | 457 |
| On/Off Valve for Water-1st Work Station | 465 |
| On/Off Valve for Water-2nd Work Station | 467 |
| On/Off Valve for Water-3rd Work Station | 469 |
| On/Off Valve for Water-4th Work Station | 471 |
| On/Off Valve for Water-5th Work Station | 473 |
| On/Off Valve for Water-6th Work Station | 475 |
| On/Off Valve for Water-7th Work Station | 477 |
| Gas Feed for 1st Work Station | 485 |
| Gas Feed for 2nd Work Station | 487 |
| Gas Feed for 3rd Work Station | 489 |
| Gas Feed for 4th Work Station | 491 |
| Gas Feed for 5th Work Station | 493 |
| Gas Feed for 6th Work Station | 495 |
| Gas Feed for 7th Work Station | 497 |
| Water Outlet From 1st Work Station | 505 |
| Water Outlet From 2nd Work Station | 507 |
| Water Outlet From 3rd Work Station | 509 |
| Water Outlet From 4th Work Station | 511 |
| Water Outlet From 5th Work Station | 513 |
| Water Outlet From 6th Work Station | 515 |
| Water Outlet From 7th Work Station | 517 |
| Gas Outlet From 1st Work Station | 525 |
| Gas Outlet From 2nd Work Station | 527 |
| Gas Outlet From 3rd Work Station | 529 |
| Gas Outlet From 4th Work Station | 531 |
| Gas Outlet From 5th Work Station | 533 |
| Gas Outlet From 6th Work Station | 535 |
| Gas Outlet From 7th Work Station | 537 |
| Thermocouple Receiver for 1st Work Station | 545 |
| Thermocouple Receiver for 2nd Work Station | 547 |
| Thermocouple Receiver for 3rd Work Station | 549 |
| Thermocouple Receiver for 4th Work Station | 551 |
| Thermocouple Receiver for 5th Work Station | 553 |
| Thermocouple Receiver for 6th Work Station | 555 |
| Thermocouple Receiver for 7th Work Station | 557 |
| Clamp Rod Lock—1st Work Station | 565 |
| Clamp Rod Lock—2nd Work Station | 567 |
| Clamp Rod Lock—3rd Work Station | 569 |

-continued

| | |
|---|---|
| Clamp Rod Lock—4th Work Station | 571 |
| Clamp Rod Lock—5th Work Station | 573 |
| Clamp Rod Lock—6th Work Station | 575 |
| Clamp Rod Lock—7th Work Station | 577 |
| In addition, FIG. 19 includes the following: | |
| Isolated Reaction Vessel Cover | 519 |
| Isolated Reaction Vessel Cover | 521 |
| Isolated Reaction Vessel Cover | 523 |
| Isolated Reaction Vessel Cover | 539 |
| Isolated Reaction Vessel Cover | 541 |
| Isolated Reaction Vessel Cover | 543 |
| Isolated Reaction Vessel Cover | 559 |

The water feeds may be used for coolant through a cofinger or other exchanger, and may be used in addition to a phase change coolant system or without a phase change coolant subsystem. The gas feeds may be used to provide inert blanket gas, cooling or heating gas or reaction gas, but is typically used to create an inert environment above reactants.

Figure 20:
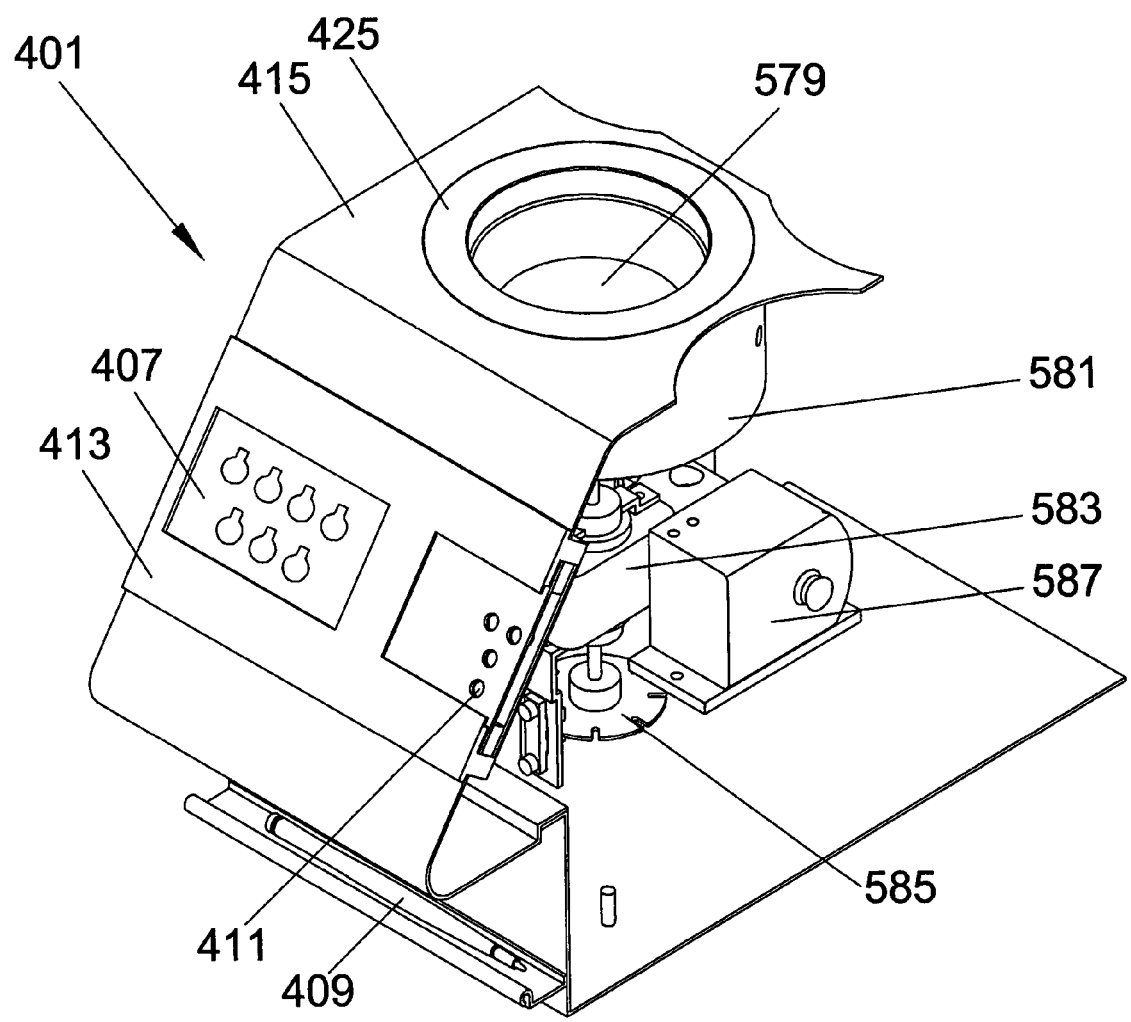
FIG. 20 shows a partial view of the same present invention instrument as shown in FIG. 18, but with additional features now included.

FIG. 20 shows a partial view of the same present invention instrument as shown in FIG. 18, but with additional features now included. These additional features include:

| | |
|---|---|
| Resistance Heater | 581 |
| Stirrer Magnet Motor | 583 |
| Timer Wheel | 585 |
| Controller | 587 |

Figure 21:
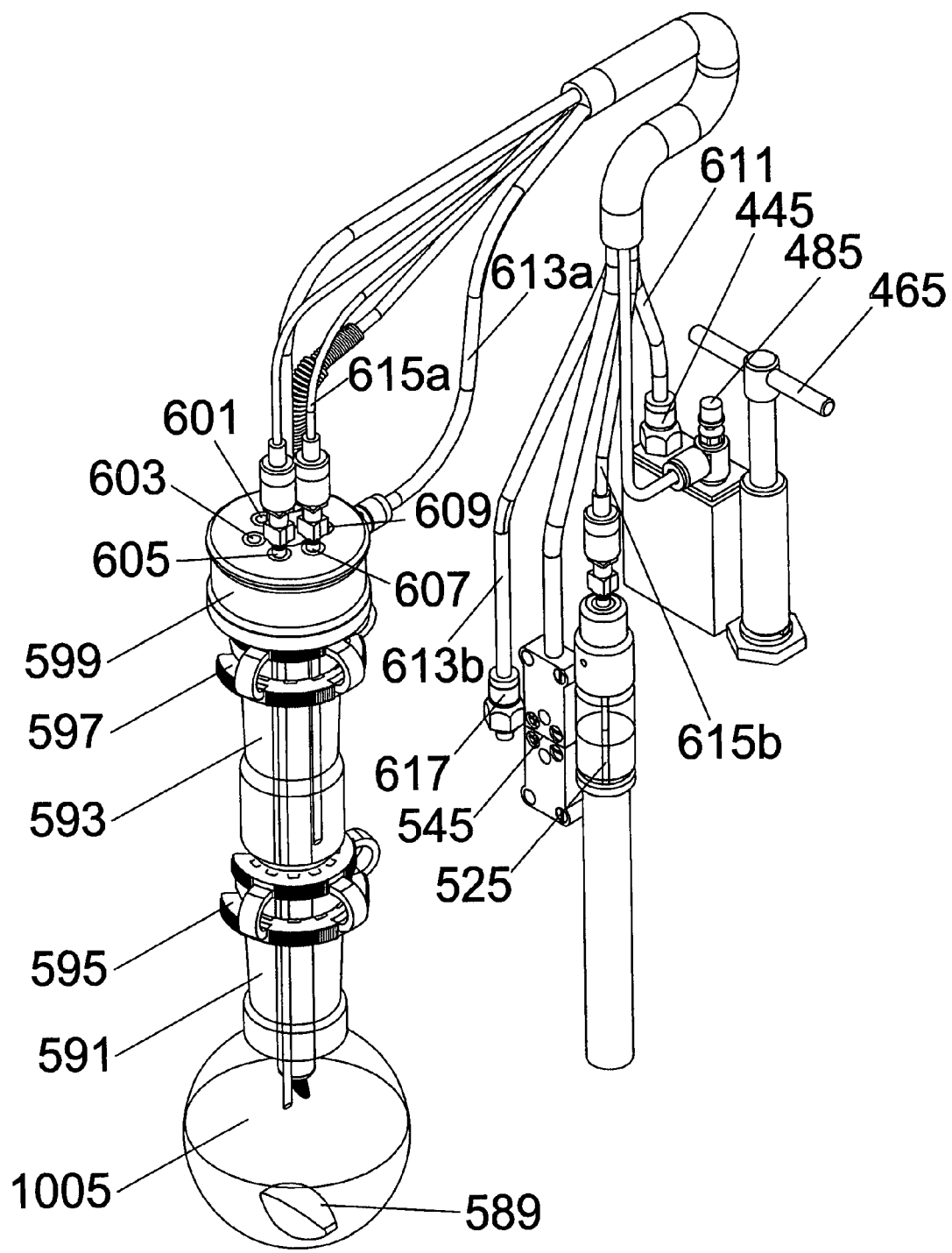
FIG. 21 illustrates a reaction vessel for a reflux type reaction with various functional connections and a cofinger stopper as may be used as a component of a present invention instrument.

FIG. 21 illustrates a reaction vessel for a reflux type reaction with various functional connections and a cofinger stopper as may be used as a component of a present invention instrument, and includes the following additional components:

| | |
|---|---|
| Microreactor Reaction Vessel (1st) | 1005 |
| Magnetic Stirrer | 589 |
| Neck | 591 |
| Neck Extension | 593 |
| Lower Yoke | 595 |
| Upper Yoke | 597 |
| Cofinger Stopper | 599 |
| Stopper Port | 601 |
| Stopper Port | 603 |
| Stopper Port | 605 |
| Stopper Port | 607 |
| Stopper Port | 609 |
| 1st Reaction Vessel Water Inlet Line | 611 |
| 1st Reaction Vessel Water Outlet Line | 613a |
| 1st Reaction Vessel Water Outlet Line | 613b |
| 1st Reaction Vessel Gas Outlet Line | 615a |
| 1st Reaction Vessel Gas Outlet Line | 615b |
| Water Outlet Connector | 617 |
| Vessel Clamp | 619 |
| Vessel Clamp Securing Rod | 621 |
| Vessel Cover Half | 519a |
| Vessel Cover Half | 519b |
| Cofinger | 623 |
| Resistance Heater | 631 |
| Stirrer Magnet Motor | 633 |
| Timer Wheel | 635 |
| Controller | 637 |
| Vessel Clamp Securing Rod | 641 |
| Vessel Clamp | 643 |
| Cofinger Stopper | 645 |
| Stopper Port | 647 |
| Inert Gas Feed Line | 651 |
| Exhaust Gas Outlet Line | 653 |
| Bundle Elbow | 655 |

-continued

| | |
|---|---|
| Resistance Heater | 661 |
| Stirrer Magnet Motor | 663 |
| Timer Wheel | 665 |
| Controller | 667 |
| Vessel Clamp Securing Rod | 669 |
| Cofinger Stopper | 671 |
| Stopper Port | 673 |
| Thermocouple | 675 |
| Thermocouple Wire | 677 |
| Thermocouple Plug | 679 |
| Clamp | 681 |
| Resistance Heater | 691 |
| Stirrer Magnet Motor | 693 |
| Timer Wheel | 695 |
| Controller | 697 |
| Vessel Clamp Securing Rod | 699 |
| Clamp | 701 |
| Stopper | 703 |
| Stopper Port | 705 |
| Thermocouple Wire | 707 |
| Water Feed Line | 709 |
| Water Outlet Line and Stopper | 711a |
| Water Outlet Line | 711b |
| Exhausted Gas Outlet Line | 713a |
| Exhaust Gas Outlet Line | 713b |
| Bundle | 715 |
| Resistance Heater | 721 |
| Stirrer Magnet Motor | 723 |
| Timer Wheel | 725 |
| Controller | 727 |
| Vessel Clamp Securing Rod | 729 |
| Clamp | 731 |
| Stopper | 733 |
| Stopper Port | 735 |
| Thermocouple Wire | 737 |
| Inlet Gas Feed Line | 739 |
| Exhaust Gas Outlet Line | 741 |
| Bundle | 743 |
| Resistance Heater | 751 |
| Stirrer Magnet Motor | 753 |
| Timer Wheel | 755 |
| Controller | 757 |
| Vessel Clamp Securing Rod | 759 |
| Clamp | 761 |
| Stopper | 763 |
| Stopper Port | 765 |
| Vacuum Line | 967 |
| Vacuum Manifold | 969 |
| Vacuum Manifold Support | 951 |
| Inlet Gas Feed Line | 767 |
| Thermocouple | 769 |
| Resistance Heater | 771 |
| Stirrer Magnet Motor | 773 |
| Timer Wheel | 775 |
| Controller | 777 |
| Vessel Clamp Securing Rod | 779 |
| Clamp | 781 |
| Stopper | 783 |
| Stopper Port | 785 |
| Vacuum Line | 963 |
| Vacuum Control Valve | 965 |
| Vacuum Manifold | 961 |
| Vacuum Manifold Support | 951 |
| Vacuum Line Joint | 959 |
| Inlet Gas Feed Line | 787 |
| Vacuum Manifold Support | 951 |
| Vacuum Manifold Support Frame | 953 |
| Vacuum Manifold Support Upright | 955 |
| Vacuum Main Line | 957 |
| Vacuum Line Joint | 959 |
| Vacuum Manifold | 961 |
| Vacuum Line | 963 |
| Vacuum Control Valve | 965 |

Figure 22:
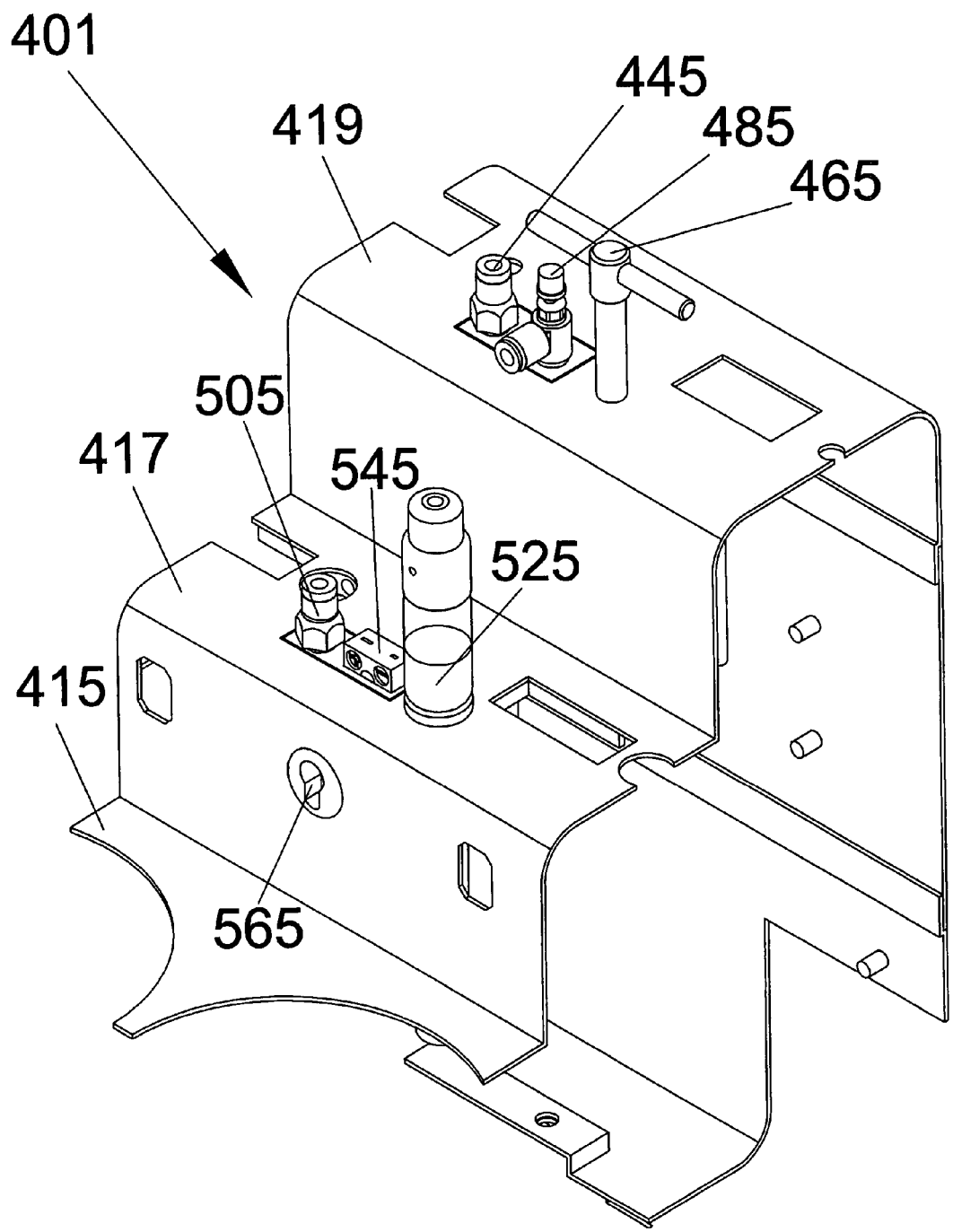
FIG. 22 shows a partial view of the same present invention instrument as shown in FIG. 18, but with additional features now included. Combined with FIG. 20, it is shown also in FIG. 23, with the vessel and components of FIG. 21 also included, in an exploded view.
Figure 23:
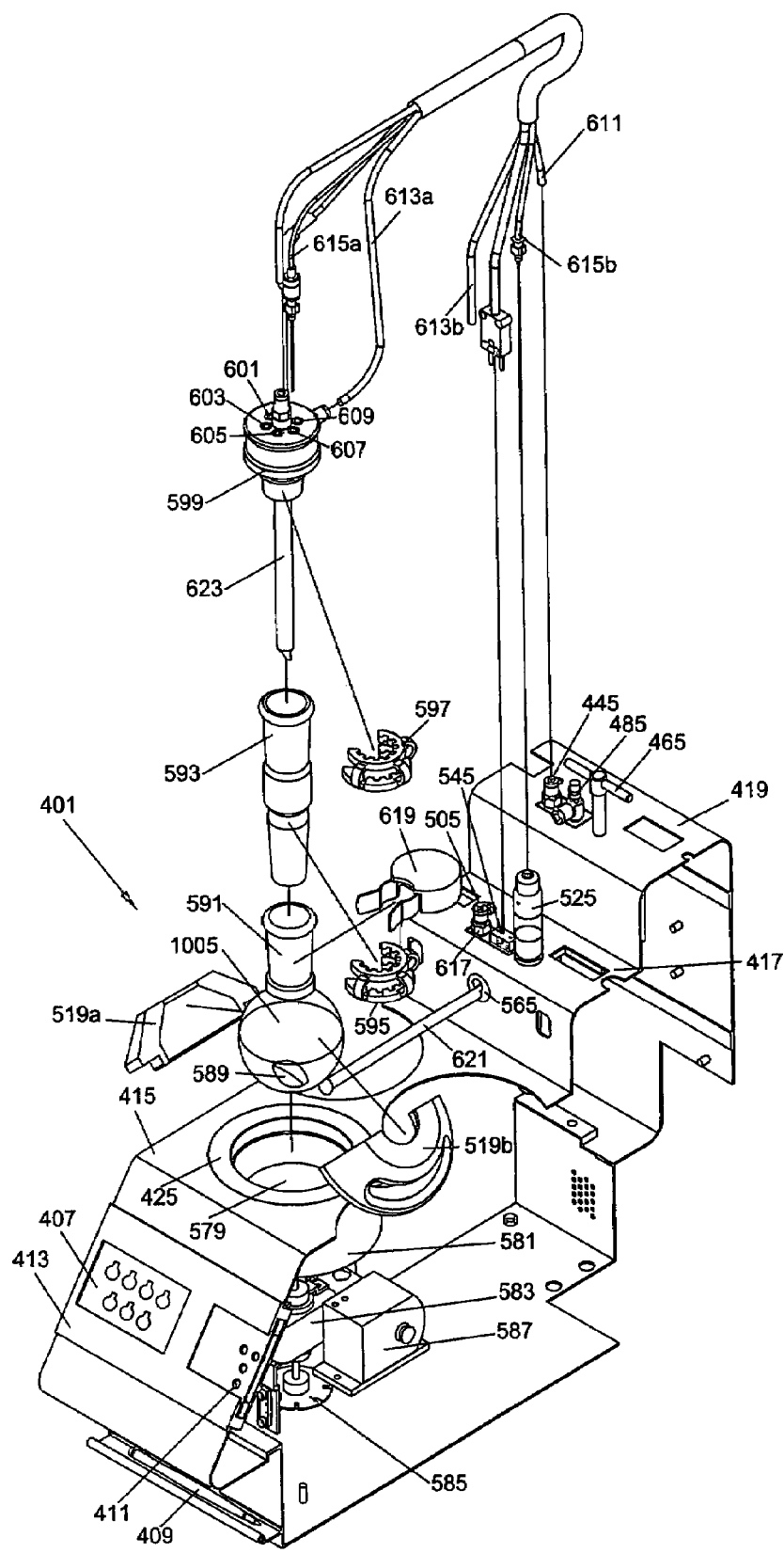
Figure 24:
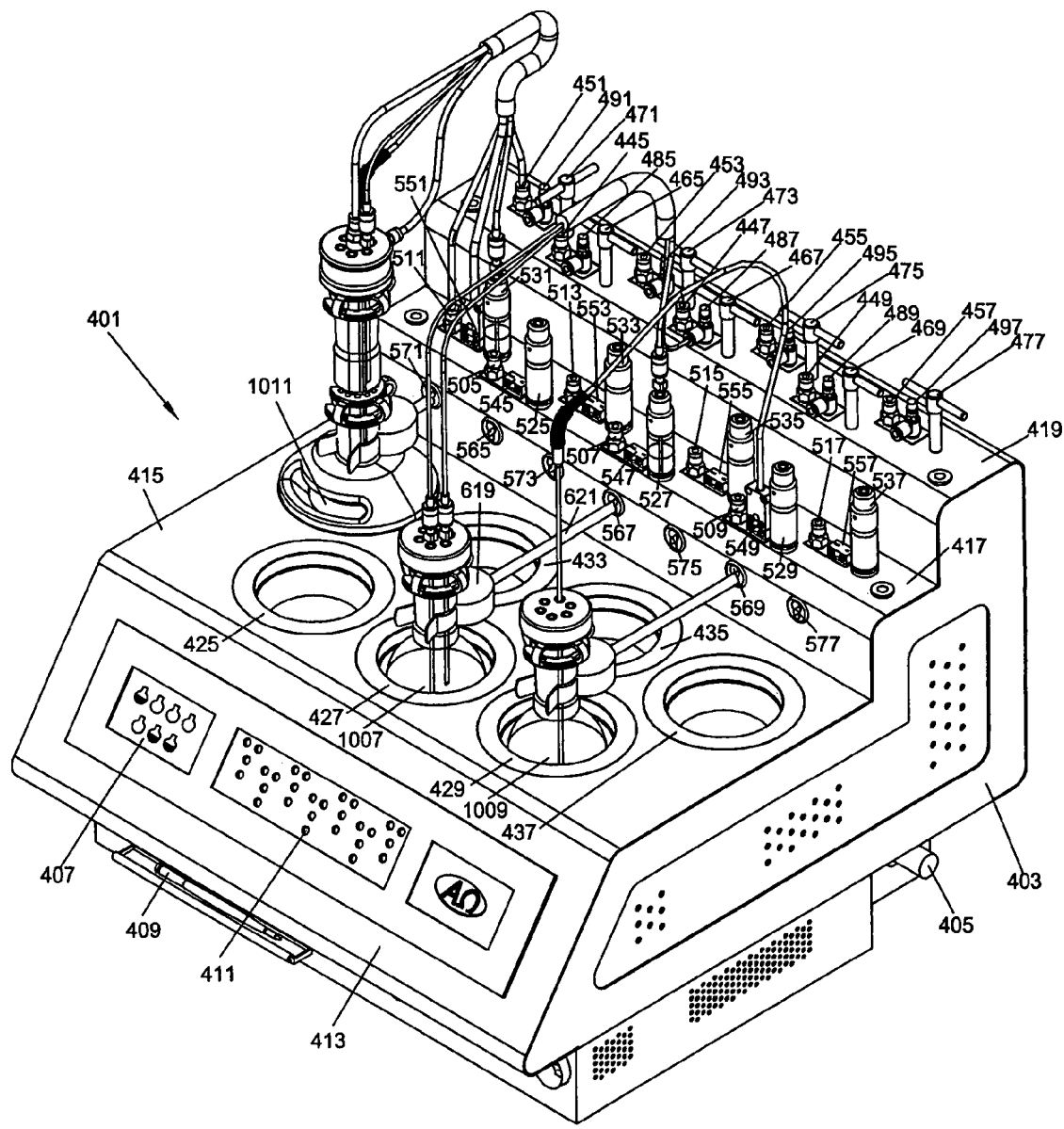
FIG. 24 shows an oblique view of the same present invention instrument as shown in FIG. 18, but with three reactor subsystems in place, one for a room temperature reaction under inert gas blanket, one for a room temperature reaction without a gas blanket, and one for a high temperature reaction.
Figure 25:
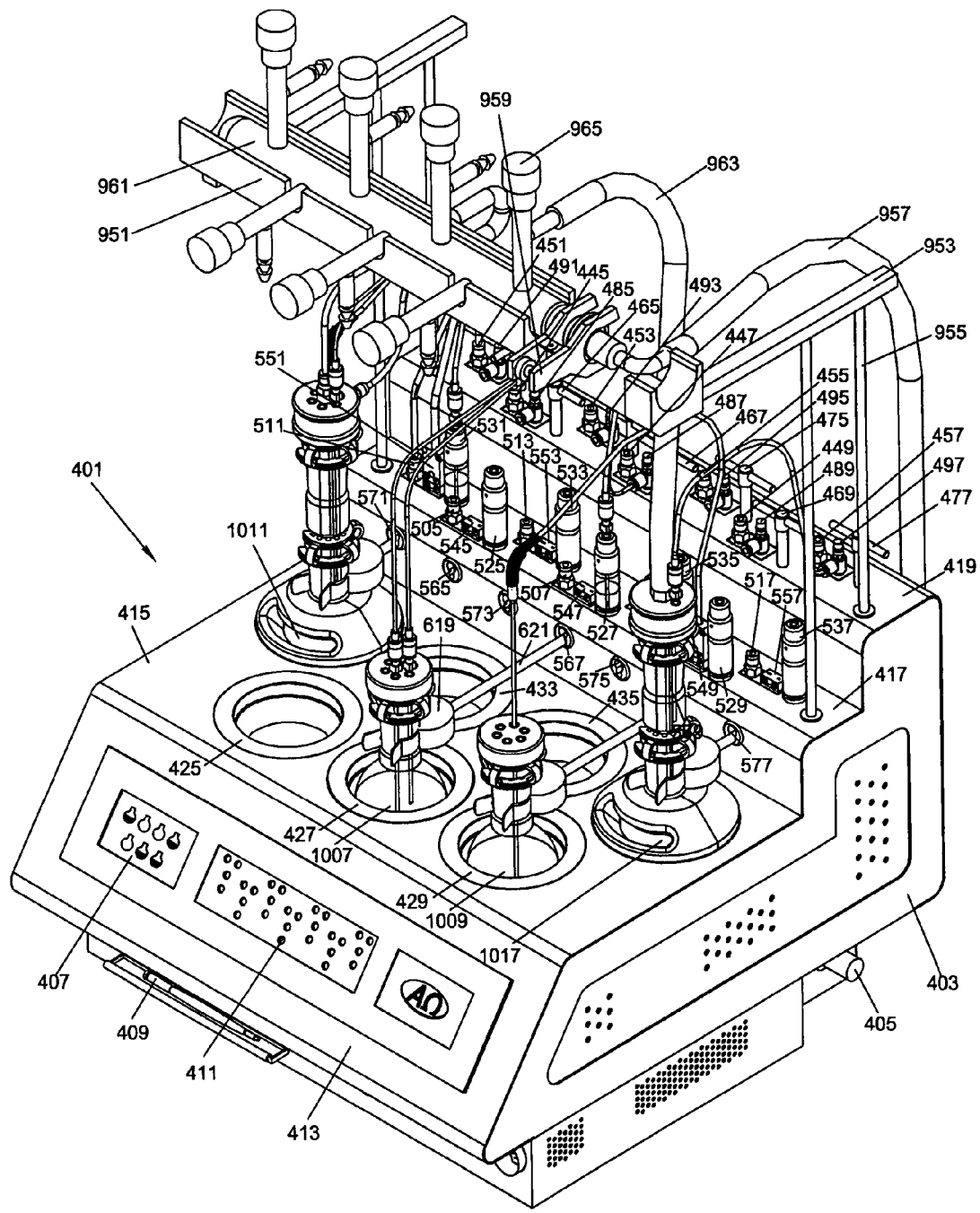
FIG. 25 is the same as FIG. 24, except that it now includes another reactor, this being for a solvent evaporation process.
Figure 26:
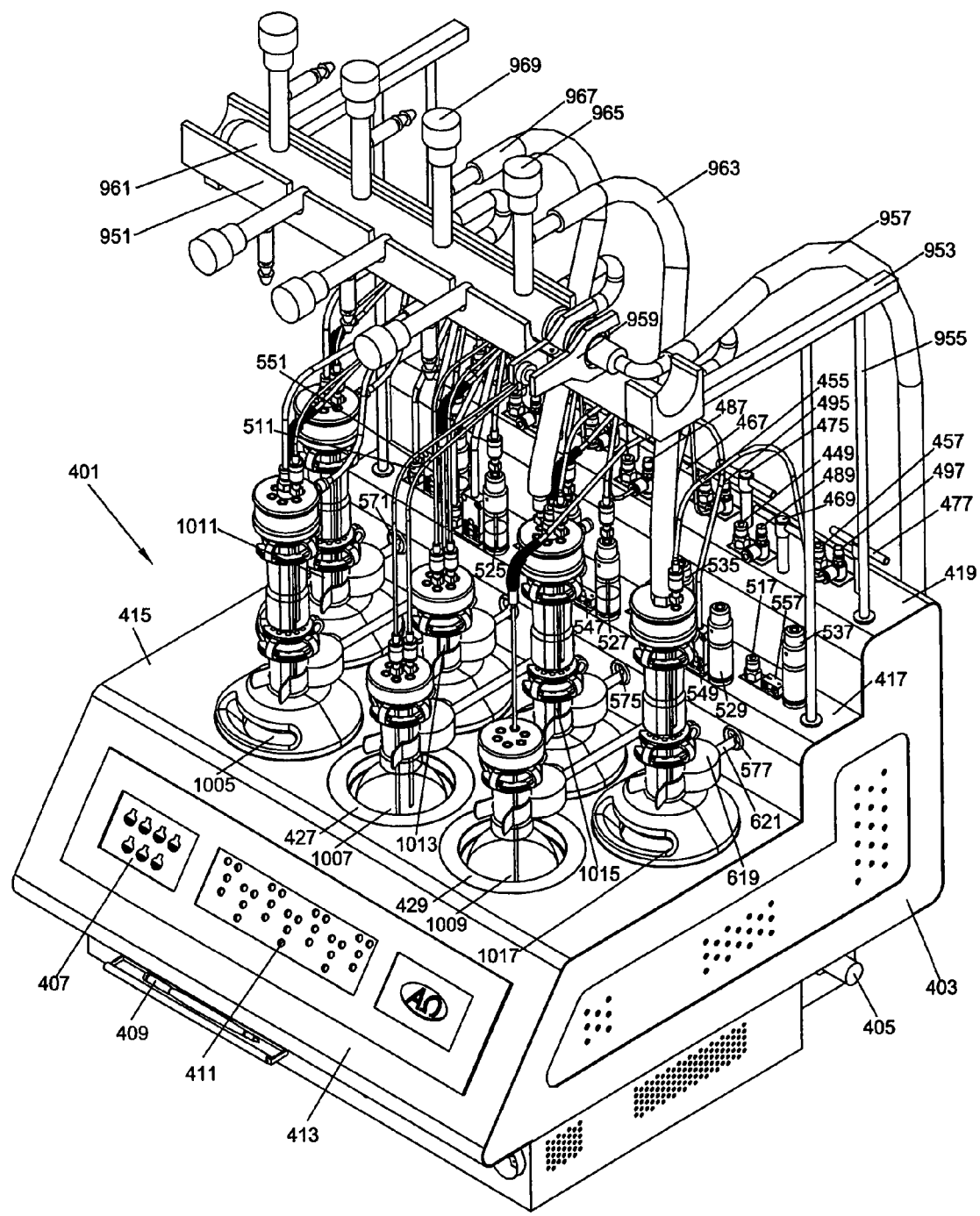
FIG. 26 is the same as FIG. 25, except that it now includes additional reactors, these being for a reflux reaction shown above, a below room temperature reaction under inert conditions, and a high temperature air sensitive reaction.
Figure 27:
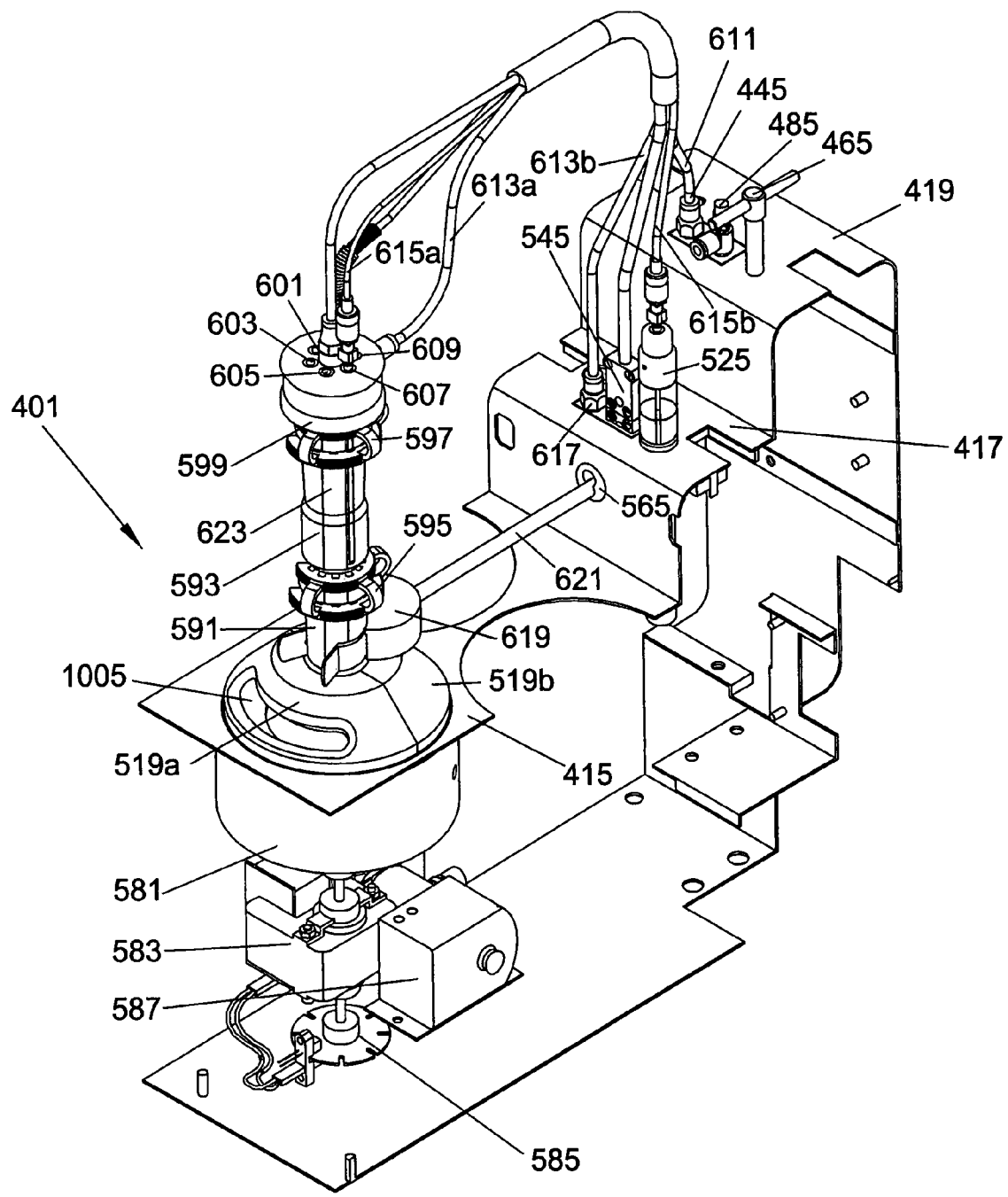
FIGS. 27, 28, 29, 30, 31, 32, and 33 illustrate various details of the different reactor arrangements in the previous Figures in partial, cut, enlarged views.
Figure 28:
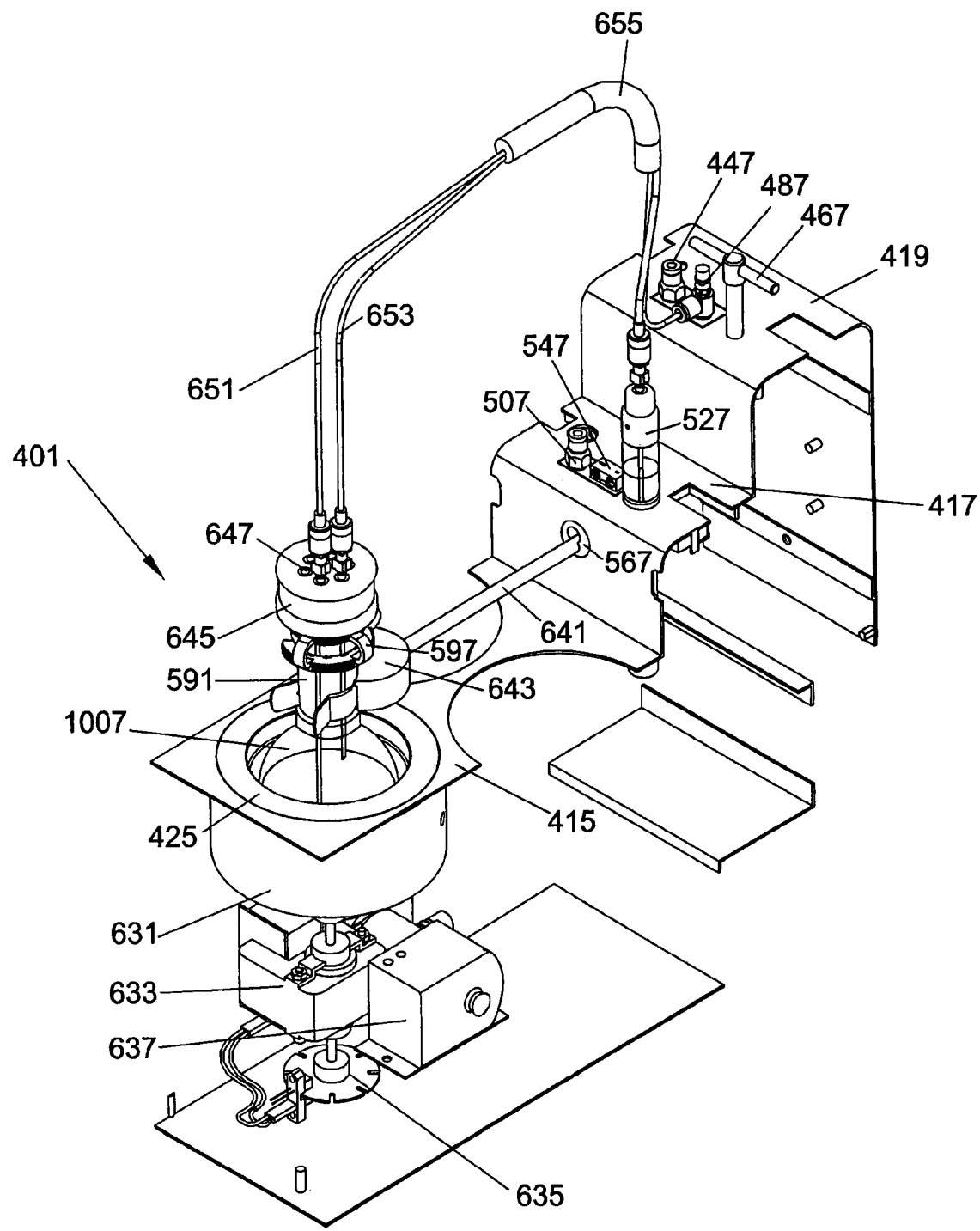
Figure 29:
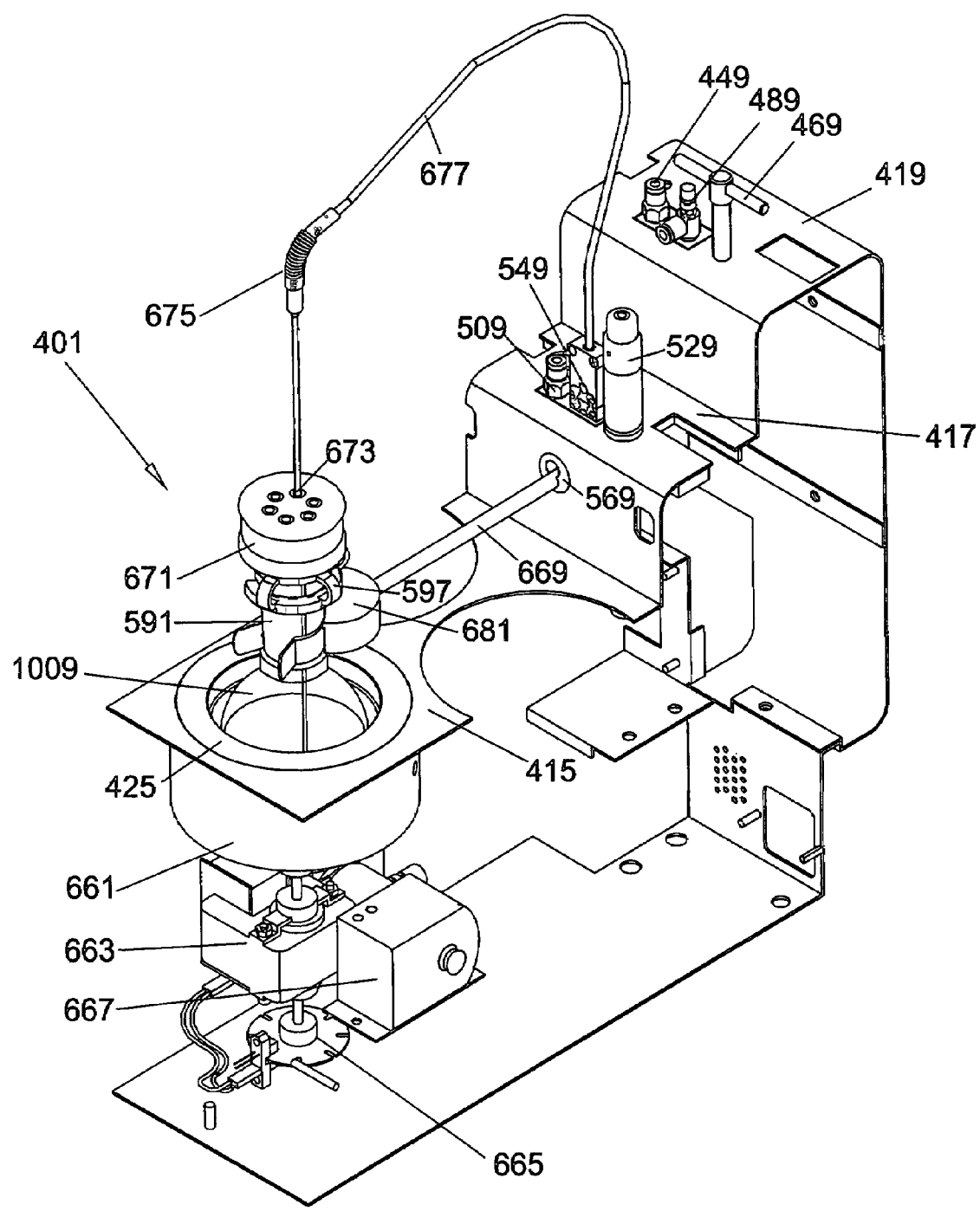
Figure 30:
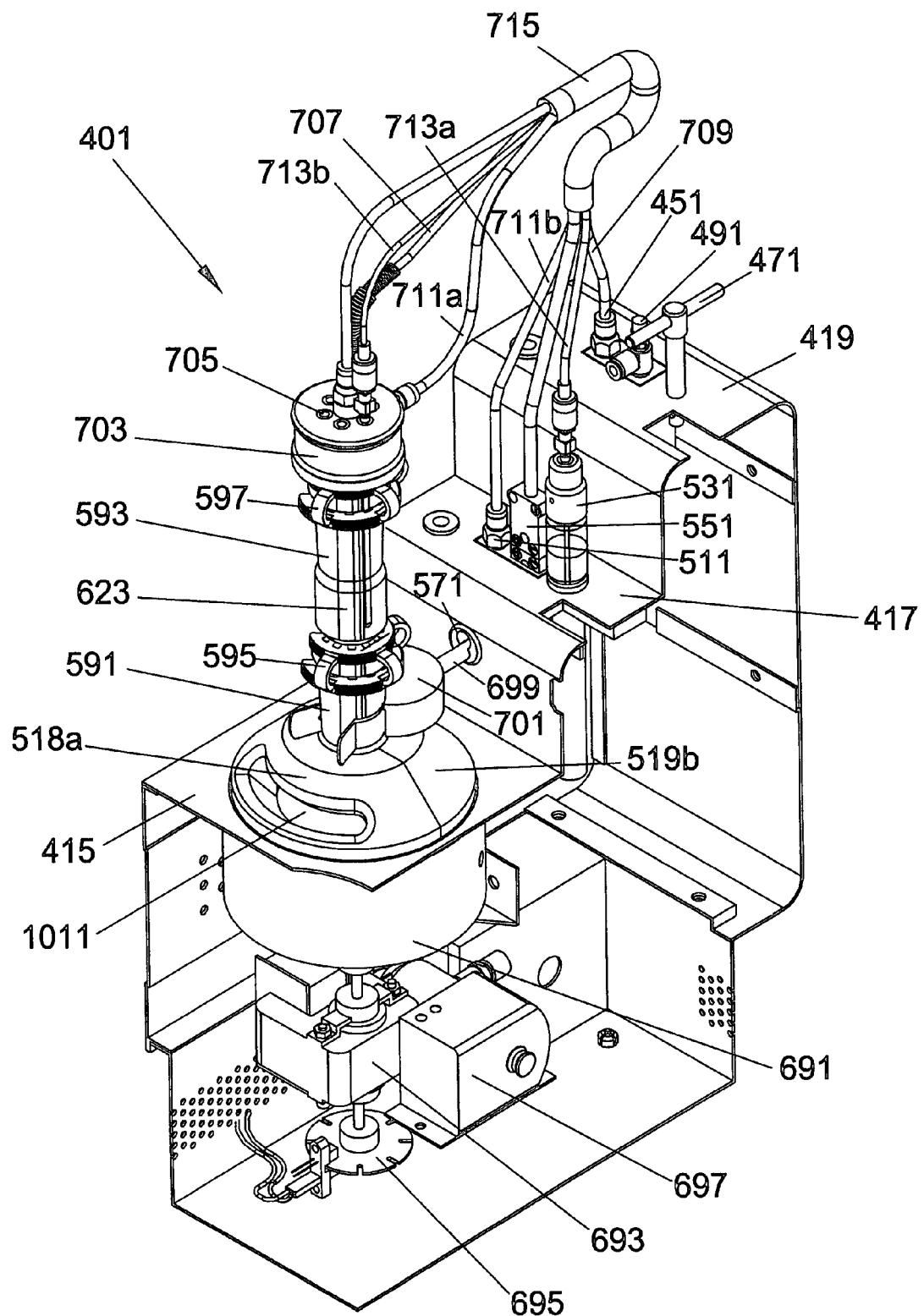
Figure 31:
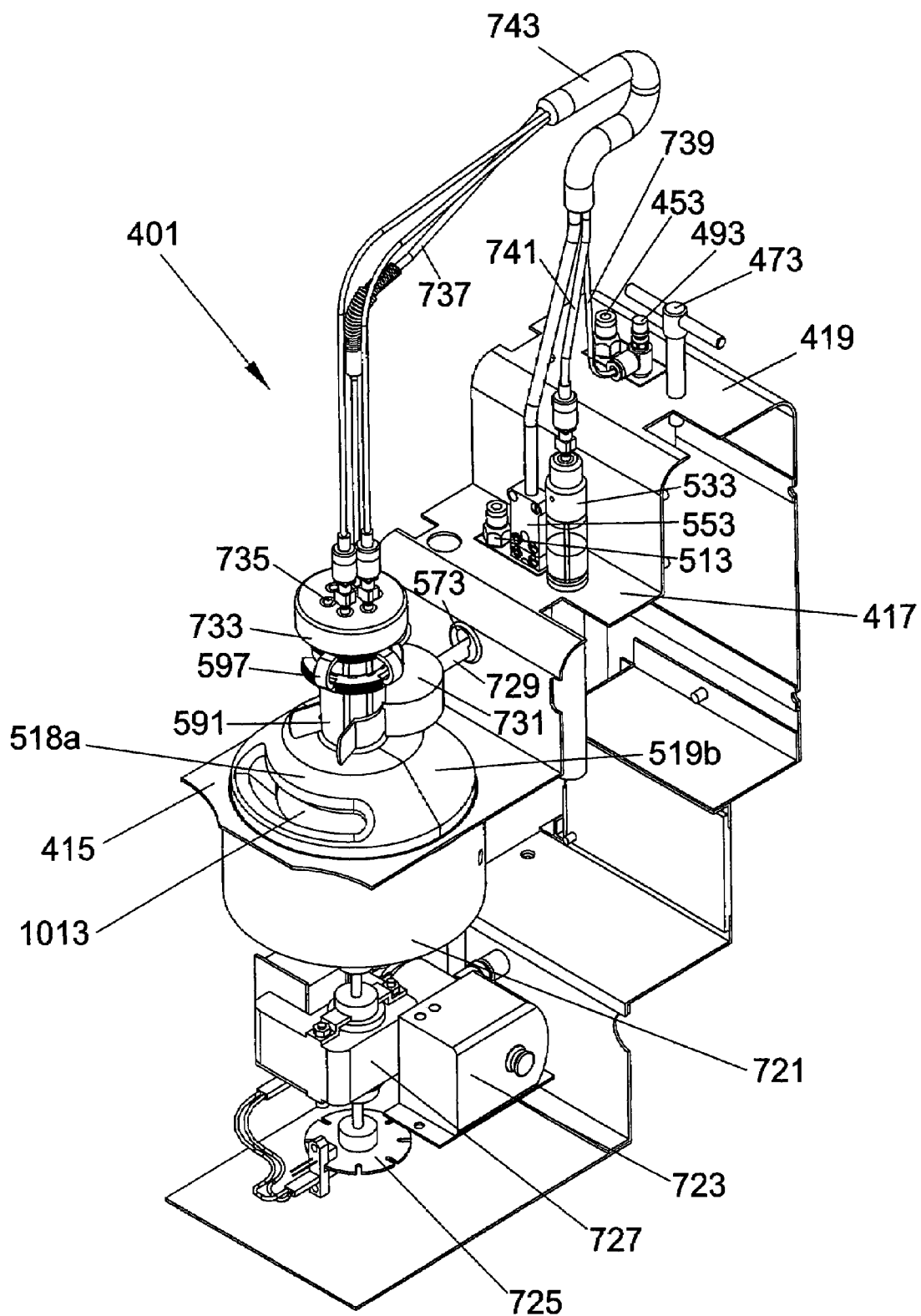
Figure 32:
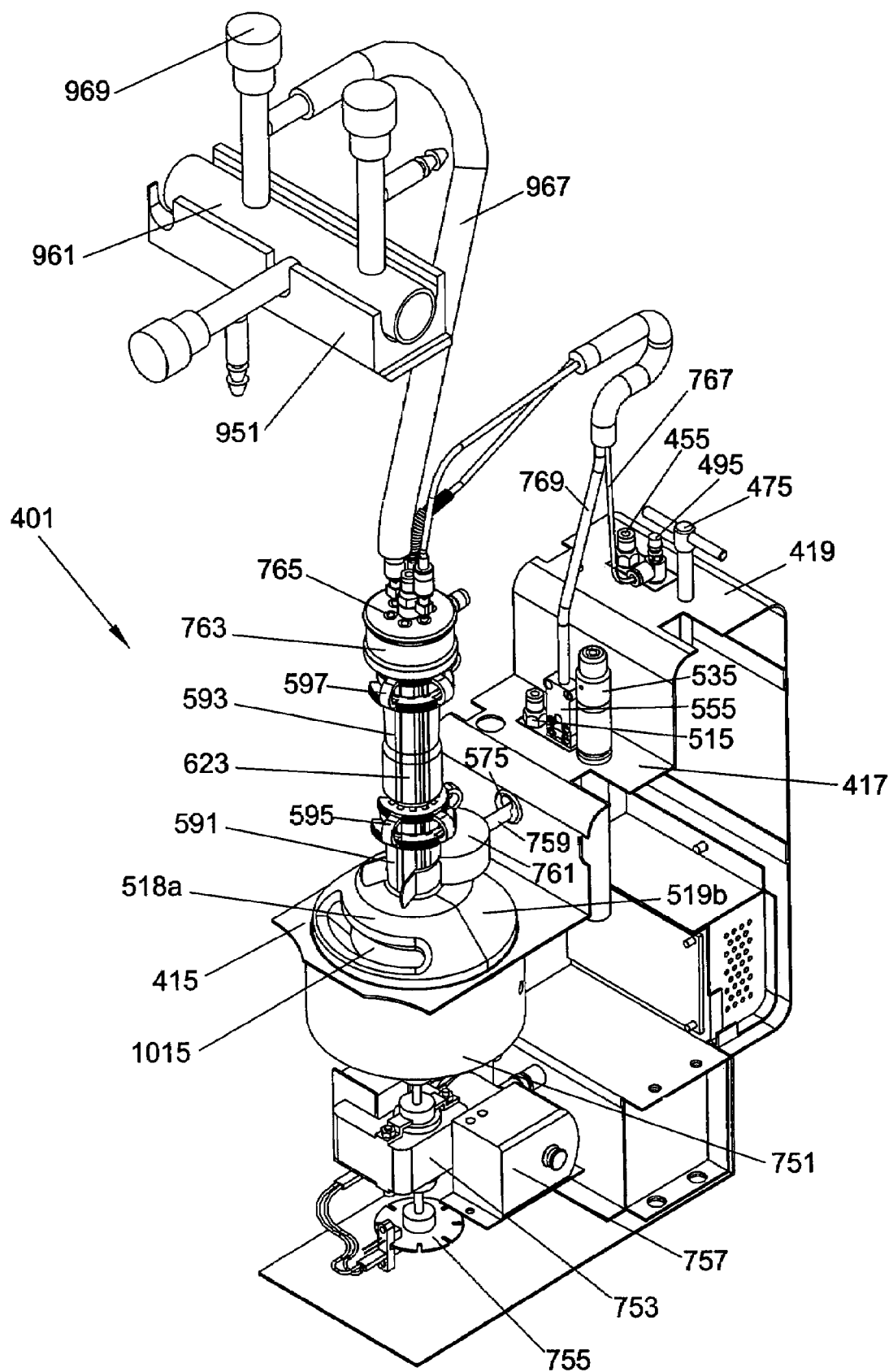
Figure 33:
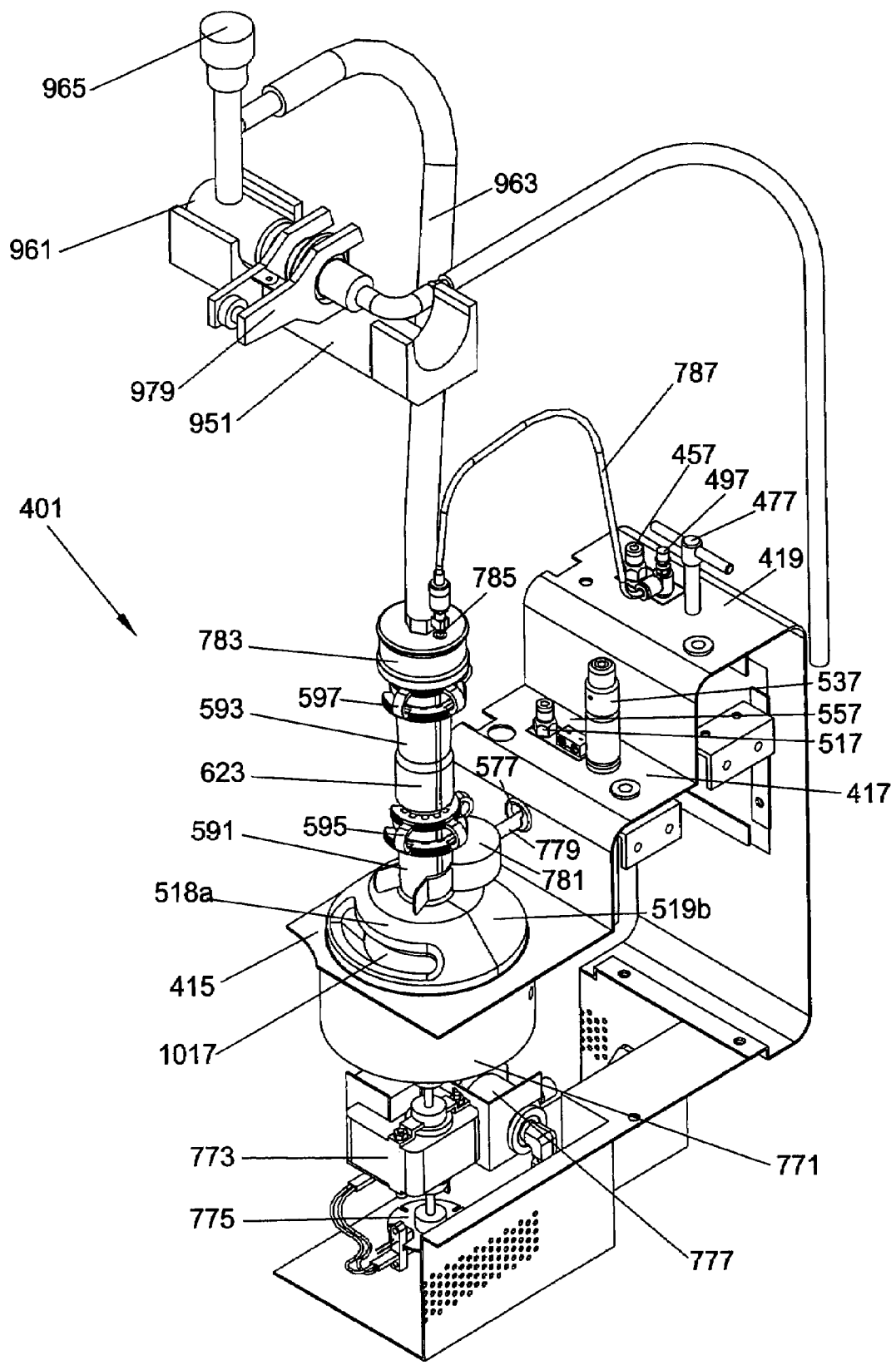
Figure 34:
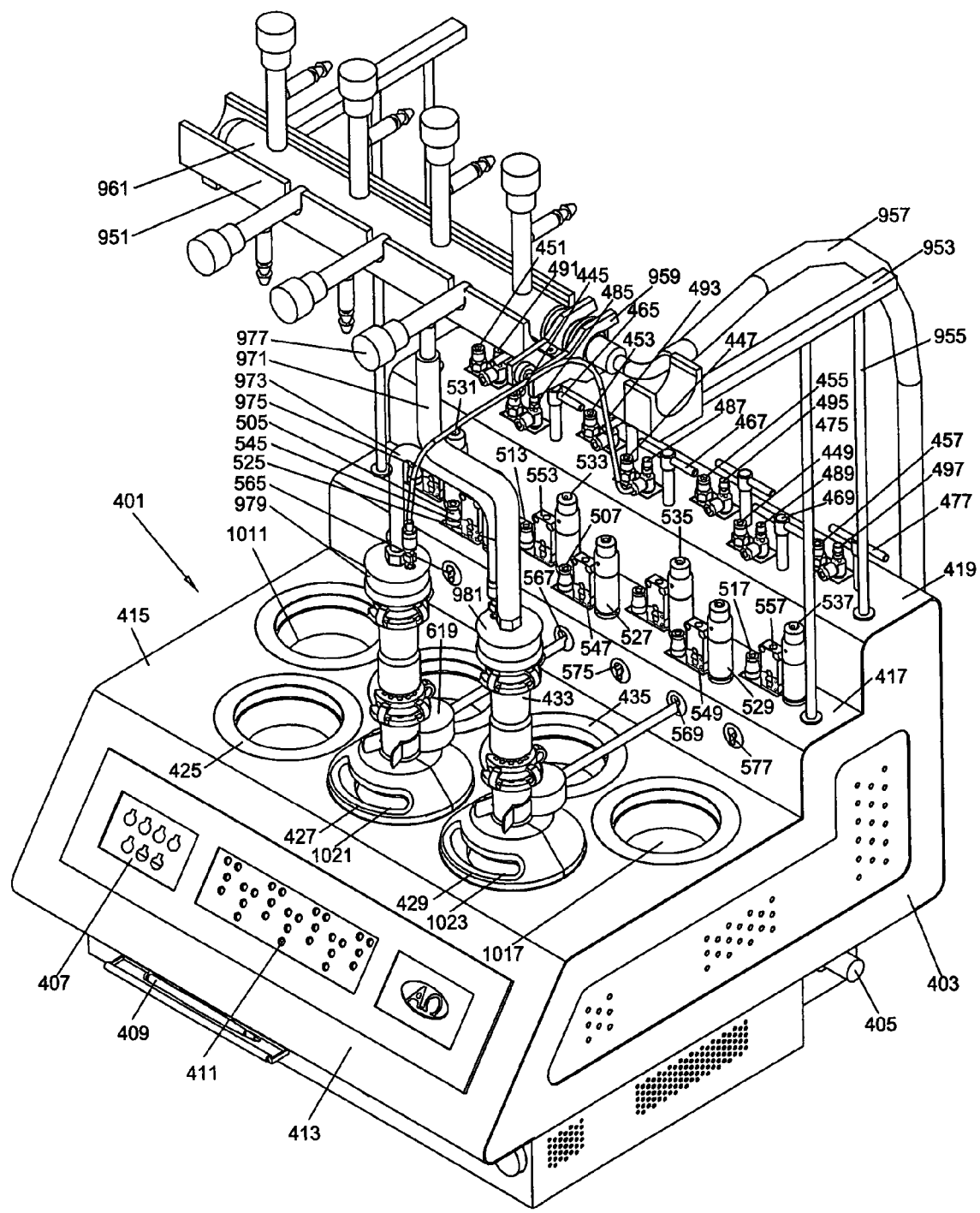
FIG. 34 shows a present invention instruments with two reaction vessels that are interconnected for a single process with plural steps, occurring in the different reactors sequentially.
Figure 35:
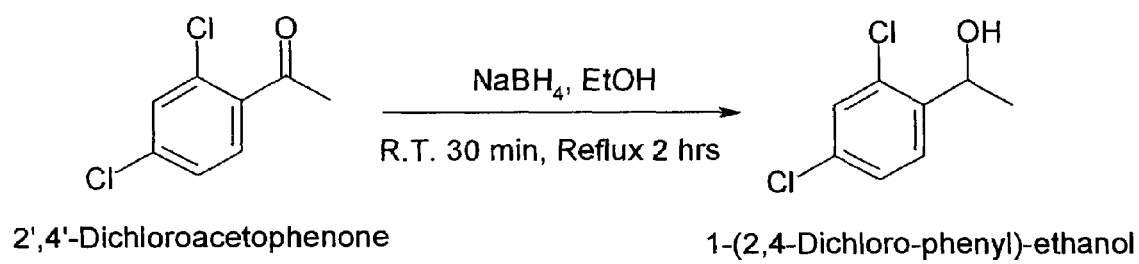
Figure 36:
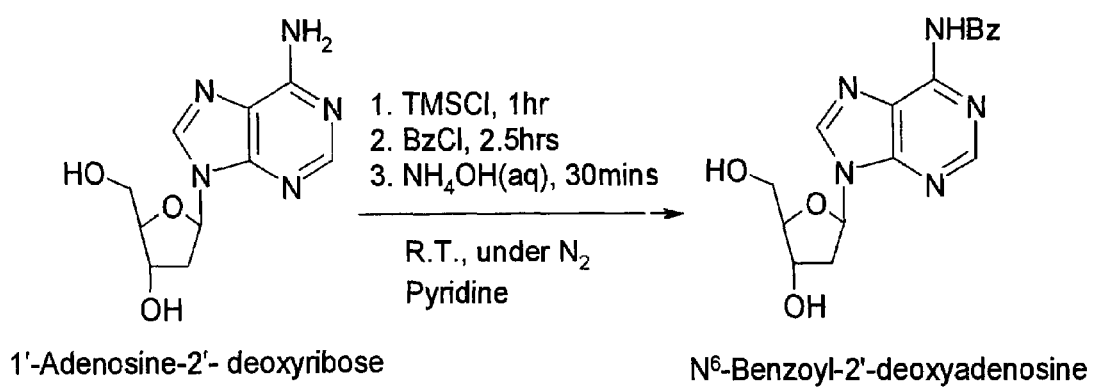
Figure 37:
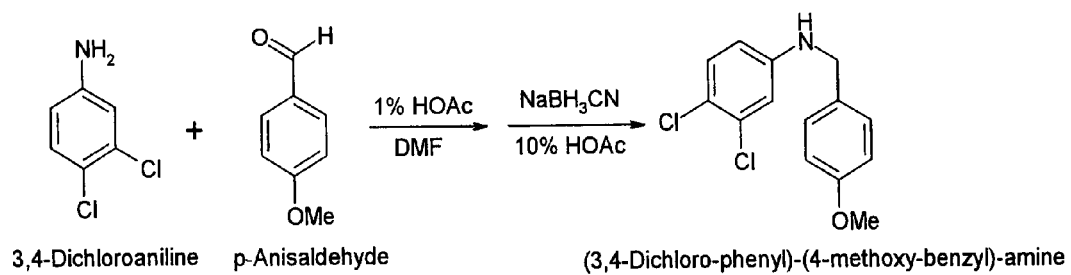
Figure 38:
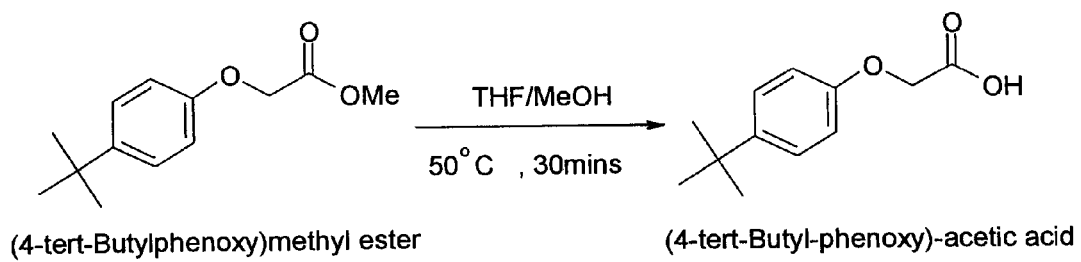
Figure 39:
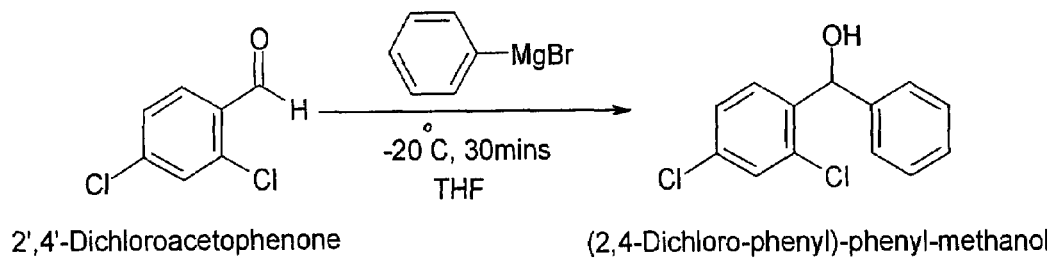
Figure 40:
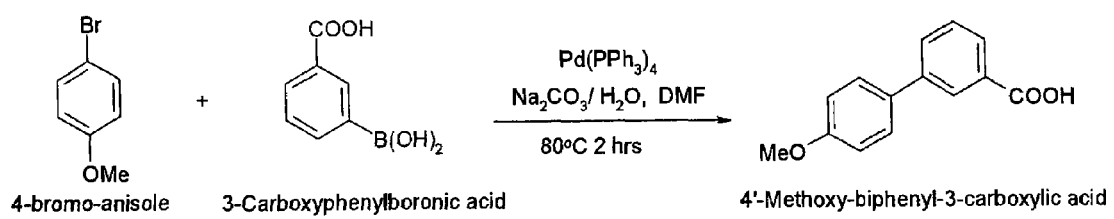

FIG. 22 shows a partial view of the same present invention instrument as shown in FIG. 18, but with additional features now included. Combined with FIG. 20, it is shown also in FIG. 23, with the vessel and components of FIG. 21 also included, in an exploded view;

FIG. 24 shows an oblique view of the same present invention instrument as shown in FIG. 18, but with three reactor subsystems in place, one for a room temperature reaction under inert gas blanket, one for a room temperature reaction without a gas blanket, and one for a high temperature reaction;

FIG. 25 is the same as FIG. 24, except that it now includes another reactor, this being for a solvent evaporation process;

FIG. 26 is the same as FIG. 25, except that it now includes additional reactors, these being for a reflux reaction shown above, a below room temperature reaction under inert conditions, and a high temperature air sensitive reaction;

FIGS. 27, 28, 29, 30, 31, 32, and 33 illustrate various details of the different reactor arrangements in the previous Figures in partial, cut, enlarged views; and, FIG. 34 shows a present invention instruments with two reaction vessels that are interconnected for a single process with plural steps, occurring in the different reactors sequentially.

The components list for the foregoing Figures is as follows:

| | |
|---|---|
| Vessel Clamp | 619 |
| Vessel Clamp Securing Rod | 621 |
| Vessel Cover Half | 519a |
| Vessel Cover Half | 519b |
| Cofinger | 623 |
| Resistance Heater | 631 |
| Stirrer Magnet Motor | 633 |
| Timer Wheel | 635 |
| Controller | 637 |
| Vessel Clamp Securing Rod | 641 |
| Vessel Clamp | 643 |
| Cofinger Stopper | 645 |
| Stopper Port | 647 |
| Inert Gas Feed Line | 651 |
| Exhaust Gas Outlet Line | 653 |
| Bundle Elbow | 655 |
| Resistance Heater | 661 |
| Stirrer Magnet Motor | 663 |
| Timer Wheel | 665 |
| Controller | 667 |
| Vessel Clamp Securing Rod | 669 |
| Cofinger Stopper | 671 |
| Stopper Port | 673 |
| Thermocouple | 675 |
| Thermocouple Wire | 677 |
| Thermocouple Plug | 679 |
| Clamp | 681 |
| Resistance Heater | 691 |
| Stirrer Magnet Motor | 693 |
| Timer Wheel | 695 |
| Controller | 697 |
| Vessel Clamp Securing Rod | 699 |
| Clamp | 701 |
| Stopper | 703 |
| Stopper Port | 705 |
| Thermocouple Wire | 707 |
| Water Feed Line | 709 |
| Water Outlet Line and Stopper | 711a |
| Water Outlet Line | 711b |
| Exhausted Gas Outlet Line | 713a |
| Exhaust Gas Outlet Line | 713b |
| Bundle | 715 |
| Resistance Heater | 721 |
| Stirrer Magnet Motor | 723 |
| Timer Wheel | 725 |
| Controller | 727 |
| Vessel Clamp Securing Rod | 729 |
| Clamp | 731 |
| Stopper | 733 |
| Stopper Port | 735 |
| Thermocouple Wire | 737 |

-continued

| | |
|---|---|
| Inlet Gas Feed Line | 739 |
| Exhaust Gas Outlet Line | 741 |
| Bundle | 743 |
| Resistance Heater | 751 |
| Stirrer Magnet Motor | 753 |
| Timer Wheel | 755 |
| Controller | 757 |
| Vessel Clamp Securing Rod | 759 |
| Clamp | 761 |
| Stopper | 763 |
| Stopper Port | 765 |
| Vacuum Line | 967 |
| Vacuum Manifold | 969 |
| Vacuum Manifold Support | 951 |
| Inlet Gas Feed Line | 767 |
| Thermocouple | 769 |
| Resistance Heater | 771 |
| Stirrer Magnet Motor | 773 |
| Timer Wheel | 775 |
| Controller | 777 |
| Vessel Clamp Securing Rod | 779 |
| Clamp | 781 |
| Stopper | 783 |
| Stopper Port | 785 |
| Vacuum Line | 963 |
| Vacuum Control Valve | 965 |
| Vacuum Manifold | 961 |
| Vacuum Manifold Support | 951 |
| Vacuum Line Joint | 959 |
| Inlet Gas Feed Line | 787 |
| Vacuum Manifold Support | 951 |
| Vacuum Manifold Support Frame | 953 |
| Vacuum Manifold Support Upright | 955 |
| Vacuum Main Line | 957 |
| Vacuum Line Joint | 959 |
| Vacuum Manifold | 961 |
| Vacuum Line | 963 |
| Vacuum Control Valve | 965 |

As to FIG. 34, the reaction vessels 1021 and 1023 are arranged so as to be connected sequentially, for a two step process. The instrument 401 is the same as shown above. However, here there are two cofinger stoppers 979 and 981 working together, with a gas feed 975, a connector tube 973, a vacuum line 971 and a vacuum line control valve 977. This enables a user to perform different steps in different reactors to perform multistep reactions with the present invention instrument. It should now be seen that more than two reactors could be interconnected in this fashion.

As mentioned above, many types of reactions and processes may be preformed simultaneously, yet independently utilizing present invention instruments. The following Table I shows examples of set-ups for specific reaction vessels and corresponding examples of the types of reactions that may be performed. Actual reactions are shown in FIGS. 35 through 42.

TABLE I

| REACTOR VESSEL NUMBER FIGURE | SHOWN IN FIGURE | EXAMPLE PROCESS |
|---|---|---|
| 1005 | 27 | 35 |
| 1007 | 28 | 36 |
| 1009 | 29 | 37 |
| 1011 | 30 | 38 |
| 1013 | 31 | 39 |
| 1015 | 32 | 40 |
| 1017 | 33 | 41 |

As mentioned above, the present invention relates to a system and a methodology that includes any of the multifunctional multireactor chemical synthesis instruments and controls described above. The present invention multifunctional multireactor control systems provide dynamic multiple protocols, templates and digital notebooks for a multifunctional multireactor chemical synthesis instrument. They have control means connected to each cooling unit and each heating unit and to each stirring mechanism for programmable automatic control thereof, which comprises: the control means including at least one programmable central processing unit having input means, output means and storage means. The present invention system and methodology includes functional software to provide separate real time modules for each of the at least one independent work stations, and to provide the system with the following for each of the modules: (a) means to separately control at least one of on/off flow and rate of flow, to separately control at least one of on/off heating and rate of heating, and to separately control the stirring mechanism, the control means including a programmable device; (b) a plurality of working templates that present various preset operations offered to a user, the operations including heating, heating and stirring, cooling, cooling and stirring, heating with inert gas blanket, cooling with inert gas blanket, ambient and stirring; (c) an instructional program including list of available templates to show a user how to select, customize and operate the templates and the system; (d) input means for a user to select templates and operational step sequences and to key in parameters for each template including a plurality of reactants used, times, temperatures and other functional operations to create a work station protocol, and storage thereof; (e) start up for user to initiate actual start up of reactor with template selected sequences in accordance with selected parameters; (f) automatic sequencing of each independent work station in accordance with the template selected sequences and parameters; (g) dynamic real time presentation of operating conditions and parameters, and at least one variable versus variable subpresentation selected from the group consisting of temperature versus time, pressure versus time and enthalpy versus time, the presentation being in at least one format selected from the group consisting of graphic, listing, streaming, and storage for retrieval on demand; (h) user monitoring of all parameters and of the dynamic real time presentation; (i) user manual override to alter, delete or extend any parameter, sequence or template; and (j) generation of a digital laboratory notebook showing all parameters, sequences and dynamic real time presentations, dates, times, and users.

FIG. 42 illustrates a block diagrammatic overview of one preferred embodiment of the present invention control system showing the steps a user would take to effectively utilize the control system in conjunction with an instrument such as any of those shown in FIGS. 18, 19, 23, 24, 25, 26, 27, 28, 29, 30, 31, 32, 33 and 34 above, or similar instruments. Block 1001 illustrates the five protocol steps that are repeated for each reactor, as well as the six subsequent steps for operation of the system.

Figure 43:
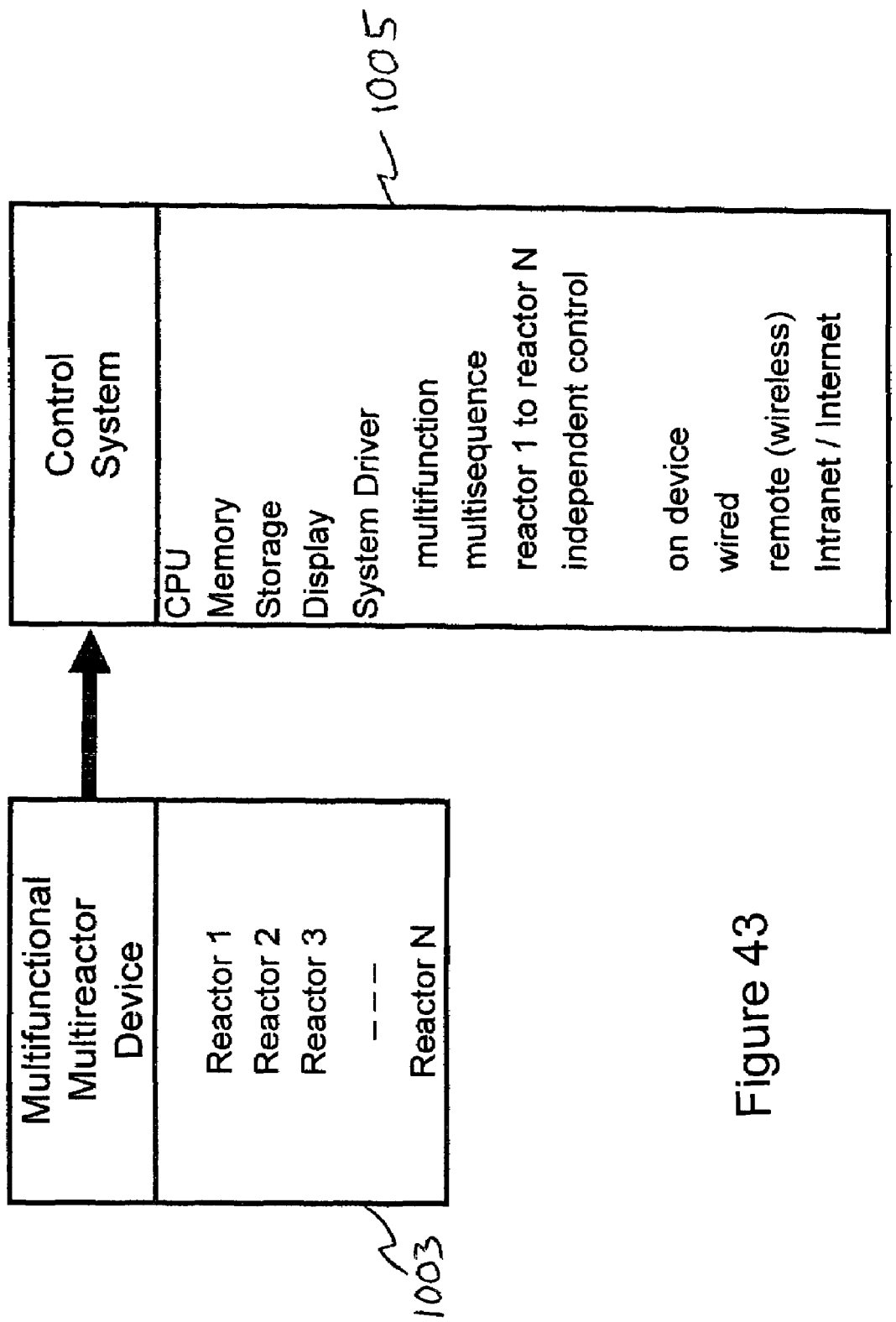
FIG. 43 illustrates a block diagram showing one arrangement between the control system and the multireactor instrument device for the present invention methodology and system.

FIG. 43 illustrates in block diagram format, one arrangement between the control system 1005 and the multireactor instrument device 1003 for one preferred embodiment of the present invention methodology and system. As can be seen from the Figure, the control system includes a CPU, memory, storage, display and system driver capabilities. The system driver is multifunctional for the several different functions of each reactor, includes multisequencing, and offers independent control for user inputs, overrides and output generation.

Figure 44:
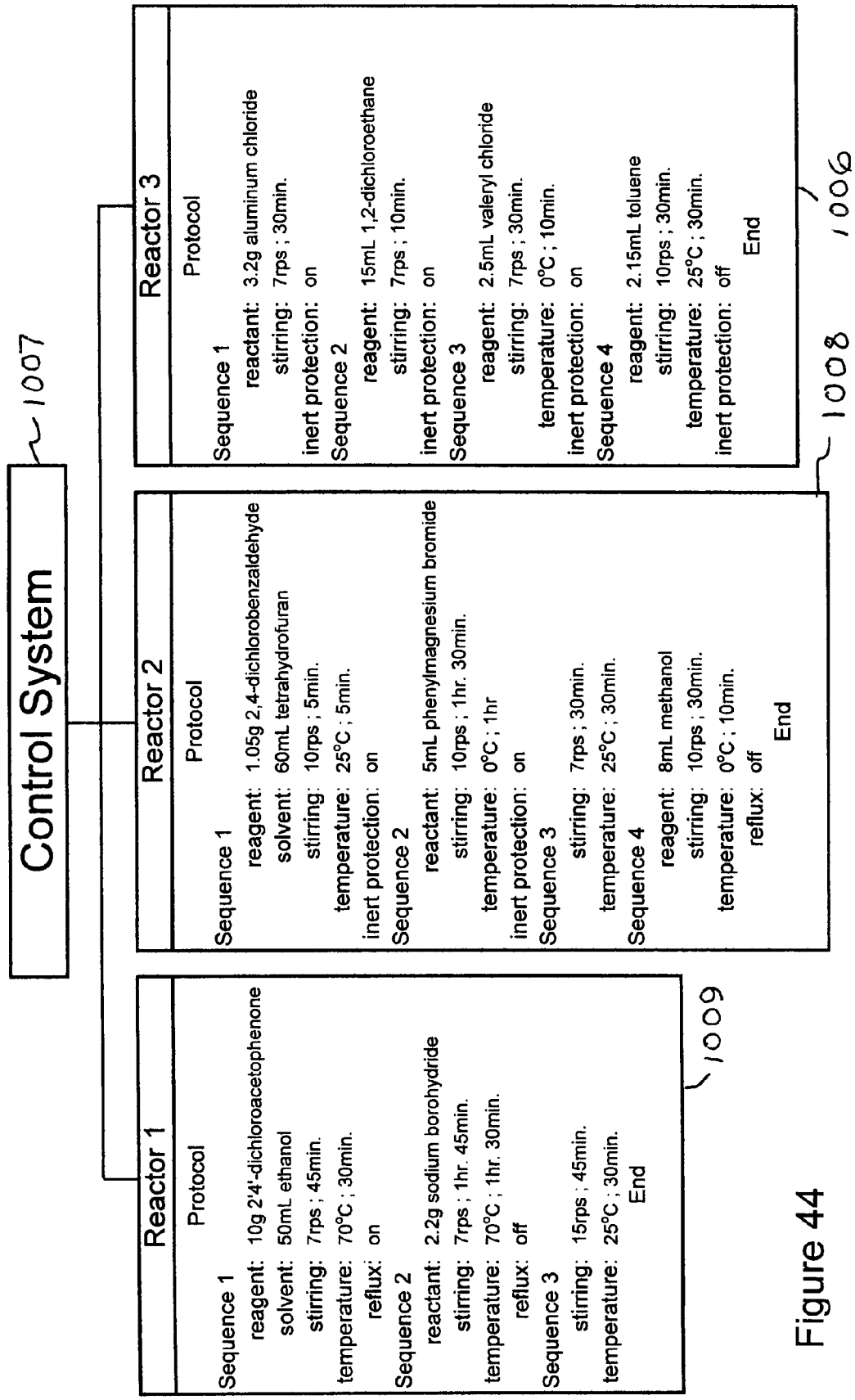
FIG. 44 shows a diagrammatic example of selections made by a user in accordance with FIG. 42, showing the sequences and parameters selected for three reactors in the instrument.

FIG. 44 shows a diagrammatic example of selections made by a user in accordance with FIG. 42, showing the sequences and parameters selected for three reactors in the instrument control system 1007 for reactors 1008, 1009 and 1006.

Figure 47:
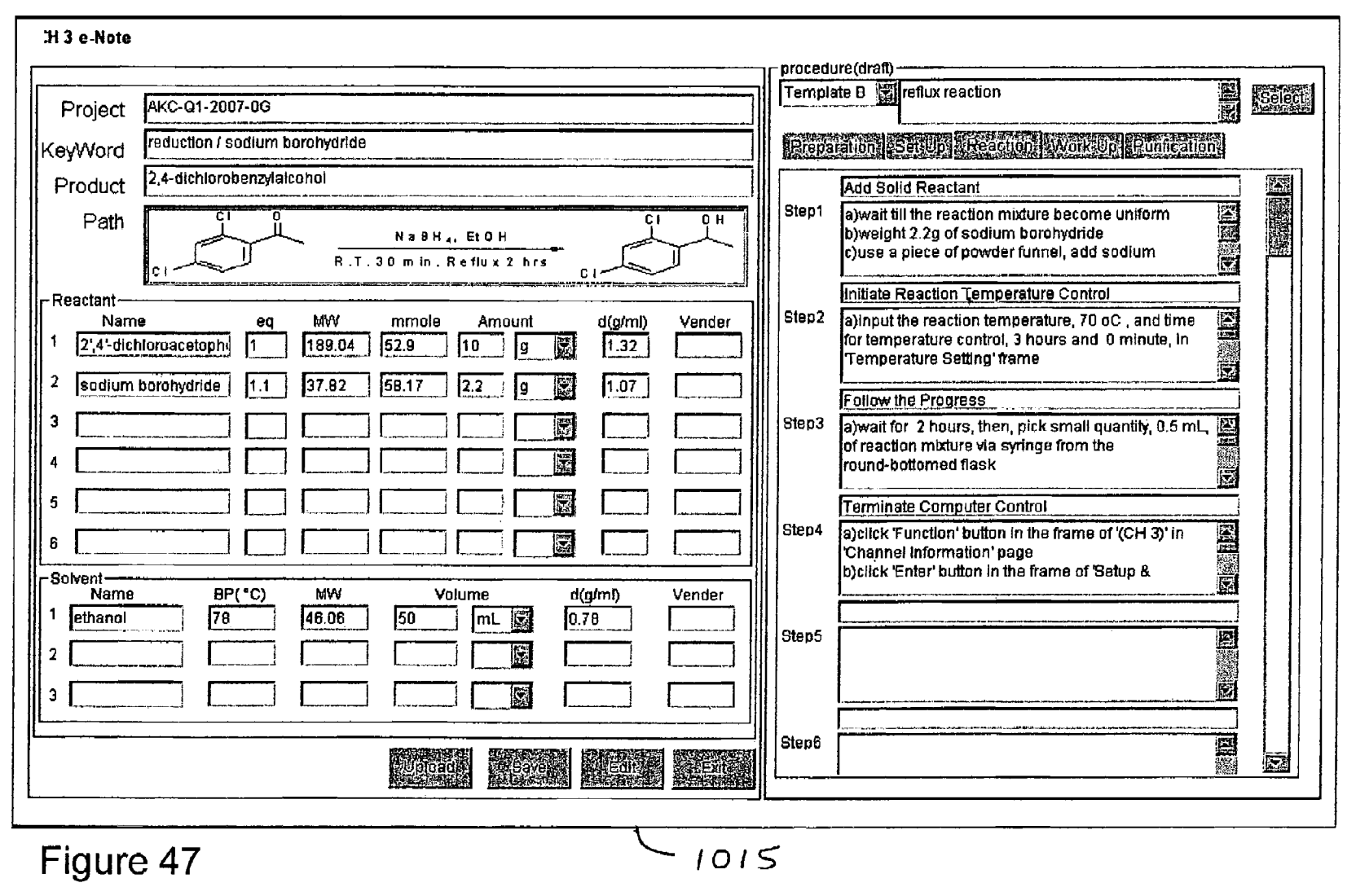

FIGS. 45, 46 and 47 show front views of present invention system and methodology monitor screen template presentations presented to a user and filled in by the user for a particular sequence and reactor. FIG. 45 shows screen 1011 illustrating real time (present value) status and other operating parameters for a given reactor vessel. FIG. 46 illustrates screen 1013 with the reactants, reagents and solvents added to a given reactor vessel. FIG. 47 illustrates screen 1015 showing an e-note format presentation with both the reactants, reagents solvents, amounts, etc on the left and a draft procedure set up on the right.

Figure 56:
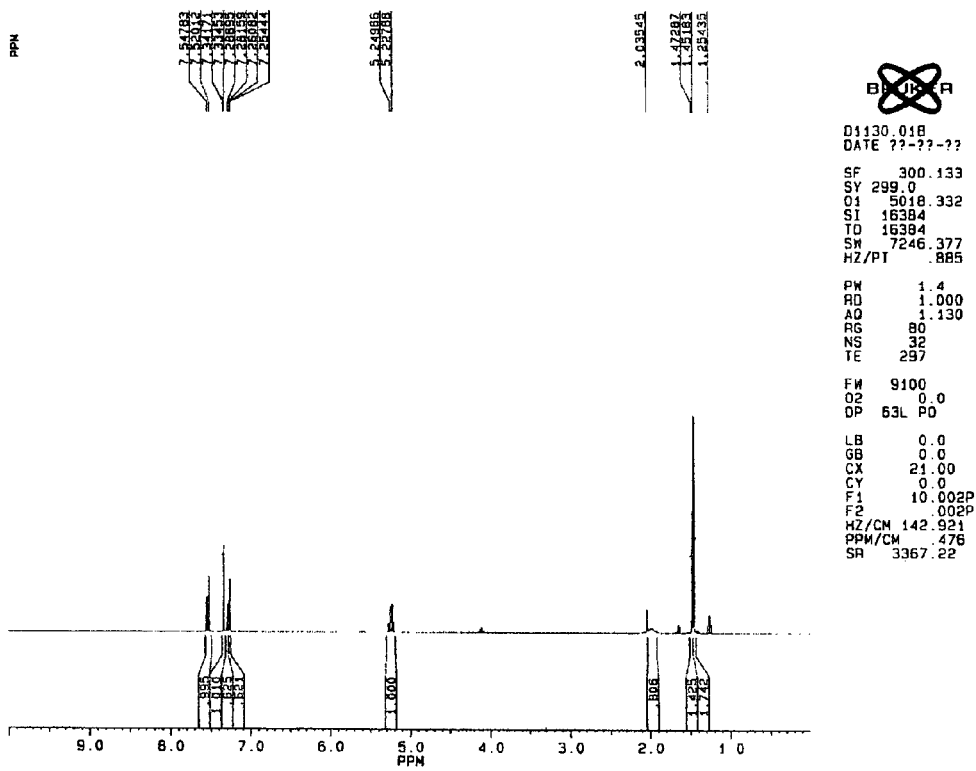

FIGS. 48, 49, 50, 51, 52, 53 and 54 show a series of user instruction monitor screen pages 1017, 1019, 1021, 1023, 1025, 1027 and 1029 that provide a multiplicity of functions. These pages are presented to a user to provide instruction on how to proceed with the sequence of operations, they present a checklist for the user, they create a record of procedures and they may optionally be incorporated into the laboratory notebooks automatically created by the present invention;

FIGS. 55 and 56 illustrate electronic lab notebook pages 1031 and 1033 created by the present invention system and methodology showing both the project components and parameters and the project results. Screen page 1033 shows chromatography results both graphically and empirically.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A multifunctional multireactor control system with dynamic multiple protocols, templates and digital notebooks for a multifunctional multireactor chemical synthesis instrument having a main housing having at least one independent multireactor work station, each work station adapted to receive a multireactor reaction vessel; having at least one cooling unit functionally connected to each of said at least one independent work station to impart controlled cooling thereto, each said cooling unit including: a cooling element in proximity to each of said at least one independent work station and having an inlet port for injection of a phase change coolant, a heat absorbent area and an outlet port for removal of said phase change coolant; and, injection means for injecting said phase change coolant in liquid form via said inlet port to said cooling element; having at least one heating unit functionally connected to each of said at least one independent work station to impart controlled heating thereto; having an inert gas blanket supply means connected to each of said at least one independent work station; having at least one stirring mechanism connected to each of said at least one independent work station; having programmable liquid transferring means for moving liquid from a liquid supply means to a reaction vessel through individual programming for each of said at least one independent work station wherein said liquid is transferred though an orifice in a stopper of said at least one independent work station; and having control means connected to each cooling unit and each heating unit and to each stirring mechanism for programmable automatic control thereof, which comprises:

said control means including at least one programmable central processing unit having input means, output means, storage means and functional software to provide separate real time modules for each of said at least one independent work station, and to provide said system with the following for each of said modules:

(a) means to separately control at least one of on/off flow and rate of flow, to separately control at least one of on/off heating and rate of heating, and to separately control said stirring mechanism, said control means including a programmable device;

(b) a plurality of working templates that present various preset operations offered to a user, said operations including heating, heating and stirring, cooling, cooling and stirring, heating with inert gas blanket, cooling with inert gas blanket, ambient and stirring;

(c) an instructional program including list of available templates to show a user how to select, customize and operate the templates and the system;

(d) input means for a user to select templates and operational step sequences and to key in parameters for each template including a plurality of reactants used, times, temperatures and other functional operations to create a work station protocol, and storage thereof;

(e) start up for user to initiate actual start up of reactor with template selected sequences in accordance with selected parameters;

(f) automatic sequencing of each independent work station in accordance with said template selected sequences and parameters;

(g) dynamic real time presentation of operating conditions and parameters, and at least one variable versus variable subpresentation selected from the group consisting of temperature versus time, pressure versus time and enthalpy versus time, said presentation being in at least one format selected from the group consisting of graphic, listing, streaming, and storage for retrieval on demand;

(h) user monitoring of all parameters and of said dynamic real time presentation;

(i) user manual override to alter, delete or extend any parameter, sequence or template; and (j) generation of a digital laboratory notebook showing all parameters, sequences and dynamic real time presentations, dates, times, and users.

2. The multifunctional multireactor control system of claim 1 wherein said reactor further includes additional operations of refluxing, degassing and vacuuming for each work station and said control system templates further include templates for at least one of said additional operations.

3. The multifunctional multireactor control system of claim 1 wherein said software further includes means to store, retrieve, reuse and amend selected templates for subsequent use.

4. The multifunctional multireactor control system of claim 1 wherein said digital laboratory notebook is set in a predetermined format and is a read only feature.

5. The multifunctional multireactor control system of claim 4 wherein said digital laboratory notebook format and said digital laboratory notebook parameters, sequences and dynamic real time presentations, dates, times, and users are secured and are read only.

6. The instrument of claim 1 wherein each of said independent work stations includes means for evaporation functions and means for vacuum pressure functions for a reactor vessel.

7. The multifunctional multireactor control system of claim 1 wherein said digital laboratory notebook is set for customized programming set up by a user.

8. The multifunctional multireactor control system of claim 7 wherein said digital laboratory notebook includes comment input areas for a user to insert observations, comments and conclusions.

9. The multifunctional multireactor control system of claim 1 wherein said system includes at least three independent multireactor work stations further and further includes cyclical, sequential presentation of each dynamic real time presentation for each work station and means to hold at any one or more of said work station dynamic real time presentations for any desired time period.

10. The multifunctional multireactor control system of claim 1 wherein said system includes a disaster alarm security subsystem that recognizes unacceptable outputs and environmental conditions, shuts down the relevant reaction vessel and signals a user to address the identified concern.

11. The multifunctional multireactor control system of claim 1 wherein said system further includes remote user monitoring and controlling capabilities selected from the group consisting of internet, intranet, wireless and combinations thereof.

12. The multifunctional multireactor control system of claim 1 wherein said system includes liquid sampling means that includes means to remove liquid from a reaction vessel to a test instrument at programmable times, transfer rates and amounts.

13. A multifunctional multireactor control system with dynamic multiple protocols, templates and digital notebooks for a multifunctional multireactor chemical synthesis instrument having a main housing having at least two independent multireactor work stations, each work station adapted to receive a multireactor reaction vessel; having at least one cooling unit functionally connected to each of said at least two independent work stations to impart controlled cooling thereto, each said cooling unit including: a cooling element in proximity to each of said at least two independent work stations and having an inlet port for injection of a phase change coolant, a heat absorbent area and an outlet port for removal of said phase change coolant; and, injection means for injecting said phase change coolant in liquid form via said inlet port to said cooling element; having at least one heating unit functionally connected to each of said at least two independent work stations to impart controlled heating thereto; having an inert gas blanket supply means connected to each of said at least two independent work stations; having at least one stirring mechanism connected to each of said at least two independent work stations wherein said at least one stirring mechanism is magnetic; and having control means connected to each cooling unit and each heating unit and to each stirring mechanism for programmable automatic control thereof, which comprises:

said control means including at least one programmable central processing unit having input means, output means, storage means and functional software to provide separate real time modules for each of said at least two independent work stations, and to provide said system with the following for each of said modules:

(a) means to separately control at least one of on/off flow and rate of flow, to separately control at least one of on/off heating and rate of heating, and to separately control said stirring mechanism, said control means including a programmable device;

(b) a plurality of working templates that present various preset operations offered to a user, said operations including heating, heating and stirring, cooling, cooling and stirring, heating with inert gas blanket, cooling with inert gas blanket, ambient and stirring;

(c) an instructional program including list of available templates to show a user how to select, customize and operate the templates and the system;

(d) input means for a user to select templates and operational step sequences and to key in parameters for each template including a plurality of reactants used, times, temperatures and other functional operations to create a work station protocol, and storage thereof;

(e) start up for user to initiate actual start up of reactor with template selected sequences in accordance with selected parameters;

(f) automatic sequencing of each independent work station in accordance with said template selected sequences and parameters;

(g) dynamic real time presentation of operating conditions and parameters, and at least one variable versus variable subpresentation selected from the group consisting of temperature versus time, pressure versus time and enthalpy versus time, said presentation being in at least one format selected from the group consisting of graphic, listing, streaming, and storage for retrieval on demand;

(h) user monitoring of all parameters and of said dynamic real time presentation;

(i) user manual override to alter, delete or extend any parameter, sequence or template; and (j) generation of a digital laboratory notebook showing all parameters, sequences and dynamic real time presentations, dates, times, and users.

14. The multifunctional multireactor control system of claim 13 wherein said system includes an automatic pause and alarm security subsystem that recognizes unacceptable inputs selected from the group consisting of reactants, solvents, parameters, template selections and sequence selections and that signals a user, identifies the unacceptable inputs and affords said user editing opportunity.

15. The multifunctional multireactor control system of claim 13 wherein said reactor further includes additional operations of refluxing, degassing and vacuuming for each work station and said control system templates further include templates for at least one of said additional operations.

16. The multifunctional multireactor control system of claim 13 wherein said software further includes means to store, retrieve, reuse and amend selected templates for subsequent use.

17. The multifunctional multireactor control system of claim 13 wherein said digital laboratory notebook is set in a predetermined format and is a read only feature.

18. The multifunctional multireactor control system of claim 17 wherein said digital laboratory notebook format and said digital laboratory notebook parameters, sequences and dynamic real time presentations, dates, times, and users are secured and are read only.

19. The instrument of claim 13 wherein each of said independent work stations includes means for evaporation functions and means for vacuum pressure functions for a reactor vessel.

20. The multifunctional multireactor control system of claim 13 wherein said digital laboratory notebook is set for customized programming set up by a user.

21. The multifunctional multireactor control system of claim 13 wherein said digital laboratory notebook includes comment input areas for a user to insert observations, comments and conclusions.

22. The multifunctional multireactor control system of claim 13 wherein said system includes at least three independent multireactor work stations and includes programmable liquid transfer means for moving liquid from one reaction vessel to another at programmable times, transfer rates and amounts.

23. A multifunctional multireactor control methodology with dynamic multiple protocols, templates and digital notebooks for a multifunctional multireactor chemical synthesis instrument having a main housing having at least two independent multireactor work stations, each work station adapted to receive a reaction vessel; having at least one cooling unit functionally connected to each of said at least two independent work stations to impart controlled cooling thereto, each said cooling unit including: a cooling element in proximity to each of said at least two independent work stations and having an inlet port for injection of a phase change coolant, a heat absorbent area and an outlet port for removal of said phase change coolant; and, injection means for injecting said phase change coolant in liquid form via said inlet port to said cooling element; having at least one heating unit functionally connected to each of said at least two independent work stations to impart controlled heating thereto; having an inert gas blanket supply means connected to each of said at least two independent work stations; having at least one stirring mechanism connected to each of said at least two independent work stations; having programmable liquid transferring means for moving liquid from a liquid supply means to a reaction vessel through individual programming for each of said at least one independent work station wherein said liquid is transferred through an orifice in a stopper of said at least one independent work station; and having control means connected to each cooling unit and each heating unit and to each stirring mechanism for programmable automatic control thereof, which comprises:

provide said control means with at least one programmable central processing unit having input means, output means, storage means and functional software to provide separate real time modules for each of said independent work stations, and providing said system with the following for each of said modules:

(a) providing means to separately control at least one of on/off flow and rate of flow, to separately control at least one of on/off heating and rate of heating, and to separately control said stirring mechanism, said control means including a programmable device;

(b) providing a plurality of working templates that present various preset operations offered to a user, said operations including heating, heating and stirring, cooling, cooling and stirring, heating with inert gas blanket, cooling with inert gas blanket, ambient and stirring;

(c) providing an instructional program including list of available templates to show a user how to select, customize and operate the templates and the system;

(d) having a user select templates and operational step sequences and to key in parameters for each template including a plurality of reactants used, times, temperatures and other functional operations to create a work station protocol, and storing said protocol;

(e) having a user start up said reactor with template selected sequences in accordance with selected parameters by initiating a start up procedure;

(f) automatically sequencing and operating each independent work station in accordance with said template selected sequences and parameters;

(g) providing a dynamic real time presentation of operating conditions and parameters, and at least one variable versus variable subpresentation selected from the group consisting of temperature versus time, pressure versus time and enthalpy versus time, said presentation being in at least one format selected from the group consisting of graphic, listing, streaming, and storage for retrieval on demand;

(h) having a user monitor all operating conditions and parameters and said dynamic real time presentation;

(i) providing user manual override to alter, delete or extend any parameter, sequence or template; and (j) generating a digital laboratory notebook showing all parameters, sequences and dynamic real time presentations, dates, times, and users.

24. The multifunctional multireactor control methodology of claim 23 wherein said reactor further includes additional operations of refluxing, degassing and vacuuming for each work station and said control methodology includes providing additional templates for at least one of said additional operations.

25. The multifunctional multireactor control methodology of claim 23 which further includes providing means to store, retrieve, reuse and amend selected templates for subsequent use.

26. The multifunctional multireactor control methodology of claim 23 wherein said digital laboratory notebook is provided in a predetermined format and is a read only feature.

27. The multifunctional multireactor control methodology of claim 26 wherein said digital laboratory notebook format and said digital laboratory notebook parameters, sequences and dynamic real time presentations, dates, times, and users are secured and are provided as read only.

28. The instrument of claim 23 wherein each of said independent work stations includes means for evaporation functions and means for vacuum pressure functions for a reactor vessel.

29. The multifunctional multireactor control methodology of claim 23 wherein said digital laboratory notebook is provided with customized programming set up by a user.

30. The multifunctional multireactor control methodology of claim 29 wherein said digital laboratory notebook is provided with comment input areas for a user to insert observations, comments and conclusions.

* * * * *